US009495395B2

(12) United States Patent
Chan et al.

(10) Patent No.: US 9,495,395 B2
(45) Date of Patent: Nov. 15, 2016

(54) PREDICTIVE DIAGNOSIS OF SLA VIOLATIONS IN CLOUD SERVICES BY SEASONAL TRENDING AND FORECASTING WITH THREAD INTENSITY ANALYTICS

(71) Applicant: Oracle International Corporation, Redwood Shores, CA (US)

(72) Inventors: Eric S. Chan, Fremont, CA (US); Rafiul Ahad, Fremont, CA (US); Adel Ghoneimy, Hillsborough, CA (US); Adriano Covello Santos, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 349 days.

(21) Appl. No.: 14/109,578

(22) Filed: Dec. 17, 2013

(65) Prior Publication Data

US 2014/0310714 A1   Oct. 16, 2014

Related U.S. Application Data

(60) Provisional application No. 61/885,424, filed on Oct. 1, 2013, provisional application No. 61/811,102, filed on Apr. 11, 2013, provisional application No. 61/811,106, filed on Apr. 11, 2013.

(51) Int. Cl.
  *G06F 9/46* (2006.01)
  *G06F 17/30* (2006.01)
  (Continued)

(52) U.S. Cl.
  CPC ....... *G06F 17/30289* (2013.01); *G06F 9/4881* (2013.01); *G06F 11/008* (2013.01);
  (Continued)

(58) Field of Classification Search
  None
  See application file for complete search history.

(56) References Cited

U.S. PATENT DOCUMENTS 6,968,557 B1 * 11/2005 Zhang .................. G06F 9/4425
  711/119

(Continued)

FOREIGN PATENT DOCUMENTS

WO   2014/168981 A1   10/2014
WO   2014/169056 A1   10/2014

OTHER PUBLICATIONS

Ignacio Laguna Peralta; Purdue University, "Probabilistic error detection and diagnosis in large-scale distributed applications", Dec. 2012 (Peralta_2012.pdf; pp. 1-197).*

(Continued)

*Primary Examiner* — Hiren Patel
(74) *Attorney, Agent, or Firm* — Kilpatrick Townsend & Stockton LLP

(57) ABSTRACT

Data can be categorized into facts, information, hypothesis, and directives. Activities that generate certain categories of data based on other categories of data through the application of knowledge which can be categorized into classifications, assessments, resolutions, and enactments. Activities can be driven by a Classification-Assessment-Resolution-Enactment (CARE) control engine. The CARE control and these categorizations can be used to enhance a multitude of systems, for example diagnostic system, such as through historical record keeping, machine learning, and automation. Such a diagnostic system can include a system that forecasts computing system failures based on the application of knowledge to system vital signs such as thread or stack segment intensity and memory heap usage. These vital signs are facts that can be classified to produce information such as memory leaks, convoy effects, or other problems. Classification can involve the automatic generation of classes, states, observations, predictions, norms, objectives, and the processing of sample intervals having irregular durations.

24 Claims, 32 Drawing Sheets

(51) Int. Cl.
  *G06F 9/48* (2006.01)
  *G06F 11/00* (2006.01)
  *G06F 11/07* (2006.01)
  *G06F 11/34* (2006.01)

(52) U.S. Cl.
  CPC ......... *G06F 11/079* (2013.01); *G06F 11/0715* (2013.01); *G06F 11/0718* (2013.01); *G06F 11/0751* (2013.01); *G06F 11/0778* (2013.01); *G06F 11/34* (2013.01); *G06F 17/30598* (2013.01)

(56) References Cited

U.S. PATENT DOCUMENTS

| | | | |
|---|---|---|---|
| 7,257,657 B2 * | 8/2007 | DeWitt, Jr. | G06F 9/30145 702/186 |
| 7,526,682 B1 * | 4/2009 | Chacko | G06F 11/366 714/38.11 |
| 7,685,575 B1 * | 3/2010 | Fareed | G06F 11/0715 714/37 |
| 7,703,087 B1 * | 4/2010 | Prakash | G06F 8/4442 717/157 |
| 8,464,255 B2 | 6/2013 | Nathuji et al. | |
| 8,719,791 B1 * | 5/2014 | MacPherson | G06F 11/3636 717/104 |
| 8,978,022 B2 * | 3/2015 | Kalogeropulos | 711/125 |
| 9,330,119 B2 * | 5/2016 | Chan | G06F 17/30289 |
| 2003/0005414 A1 * | 1/2003 | Elliott | G06F 11/0715 717/128 |
| 2006/0218543 A1 * | 9/2006 | Boger | G06F 11/3612 717/157 |
| 2007/0055914 A1 | 3/2007 | Chandwani et al. | |
| 2007/0220513 A1 * | 9/2007 | Hwang | G06F 9/524 718/1 |
| 2007/0234296 A1 | 10/2007 | Zorn et al. | |
| 2008/0301501 A1 * | 12/2008 | Grant | G06F 11/079 714/37 |
| 2009/0177692 A1 | 7/2009 | Chagoly et al. | |
| 2011/0016357 A1 | 1/2011 | Tsvetkov | |
| 2011/0067007 A1 * | 3/2011 | Zamarreno | G06F 11/3476 717/128 |
| 2011/0283266 A1 * | 11/2011 | Gallagher | G06F 9/44 717/130 |
| 2011/0320586 A1 | 12/2011 | Maltz et al. | |
| 2012/0144374 A1 * | 6/2012 | Gallagher | G06F 11/362 717/128 |
| 2012/0159449 A1 * | 6/2012 | Arnold | G06F 11/3664 717/125 |
| 2012/0185735 A1 | 7/2012 | Sambamurthy et al. | |
| 2012/0185736 A1 * | 7/2012 | Sambamurthy | G06F 11/079 714/47.3 |
| 2014/0143759 A1 * | 5/2014 | Neichev | G06F 11/3632 717/130 |
| 2014/0310235 A1 * | 10/2014 | Chan | G06F 17/30598 707/603 |

OTHER PUBLICATIONS

International Search Report for application PCT/US2012/033385 (Jul. 17, 2014).
International Search Report for application PCT/US2012/033530 (Jul. 17, 2014).
Wegiel et al. "Dynamic Prediction of Collection Yield for Managed Runtimes," Association for Computer Machinery 44:289-300 (Mar. 7, 2009).
Written Opinion mailed Apr. 10, 2015 for Patent Application No. PCT/US2014/033530, 4 pages.

* cited by examiner

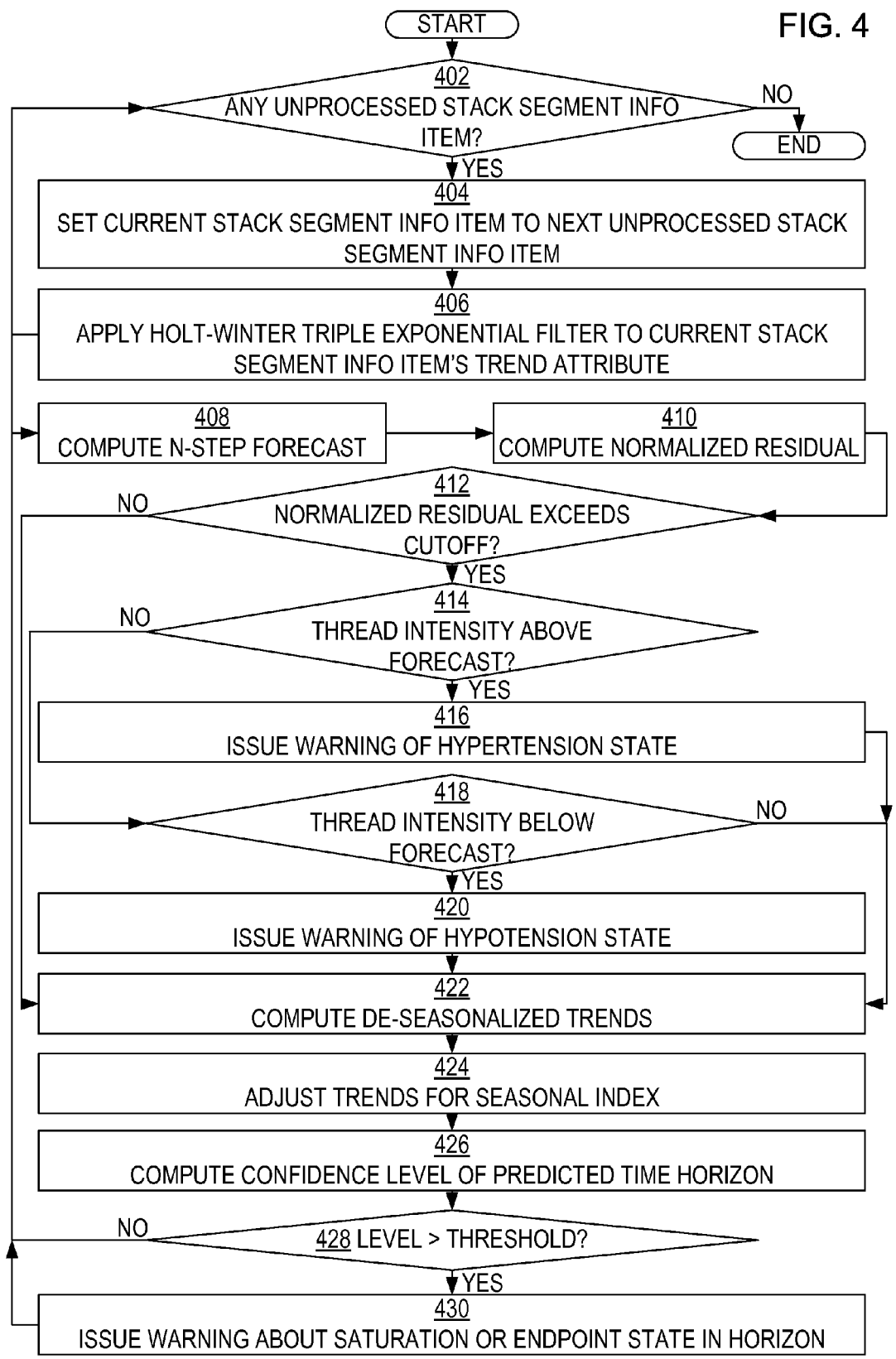

PREDICTIVE DIAGNOSIS OF SLA VIOLATIONS IN CLOUD SERVICES BY SEASONAL TRENDING AND FORECASTING WITH THREAD INTENSITY ANALYTICS

CLAIM OF PRIORITY

The present application claims priority under 35 U.S.C. §119(e) to U.S. Provisional Patent Application Ser. No. 61/885,424, filed Oct. 1, 2013, and titled "DATA DRIVEN BUSINESS PROCESS AND CASE MANAGEMENT", the contents of which are incorporated by reference herein. The present application also claims priority under 35 U.S.C. §119(e) to U.S. Provisional Patent Application Ser. No. 61/811,102, filed Apr. 11, 2013, and titled "SEASONAL TRENDING, FORECASTING, ANOMALY DETECTION, AND ENDPOINT PREDICTION OF JAVA HEAP USAGE", the contents of which are incorporated by reference herein; and U.S. Provisional Patent Application Ser. No. 61/811,106, filed Apr. 11, 2013, and titled "PREDICTIVE DIAGNOSIS OF SLA VIOLATIONS IN CLOUD SERVICES BY SEASONAL TRENDING AND FORECASTING WITH THREAD INTENSITY ANALYTICS", the contents of which are incorporated by reference herein.

BACKGROUND

Individuals and organizations are faced with rapidly increasing amounts of data. Such data may rapidly increase in complexity and urgency. The individuals and organizations often need to analyze these data in order to act upon the data in an appropriate and a timely manner. In some domains, the actions that the individuals and organizations take are governed by regulations that also tend to become increasingly complex. For example, regulations might require the maintenance of meticulous historical records that are susceptible to auditing in the event that some problem should occur. Alternatively, the service level agreement (SLA) entered into between business organizations might require that data be analyzed systematically and actionable information in the data be acted upon proactively to avoid SLA violations and also to determine whether the agreement is being satisfied. Following the regulations, service level agreements, and other requirements can be very burdensome, and can grow more burdensome with the passage of time.

Because regulatory and SLA requirements have become so vastly complex, computer software lends itself to assisting individuals and organizations in their efforts to comply with the requirements. However, inasmuch as the regulations and SLAs tend to evolve, the computer software itself is tasked with evolving in step to keep up. Unfortunately, the customary process used for developing and updating computer software is slow and cumbersome. Software development cycles are usually long. These difficulties plaguing the evolution of computer software can be partially attributed to the fact that data are often hidden in the procedural software code. Data are often separated from the knowledge that can be applied to that data.

BRIEF DESCRIPTION OF DRAWINGS

FIG. 4 is a flow diagram that illustrates an example of a technique for applying a seasonal trend filter, according to an embodiment of the invention.

DETAILED DESCRIPTION

Overview

Figure 1A:
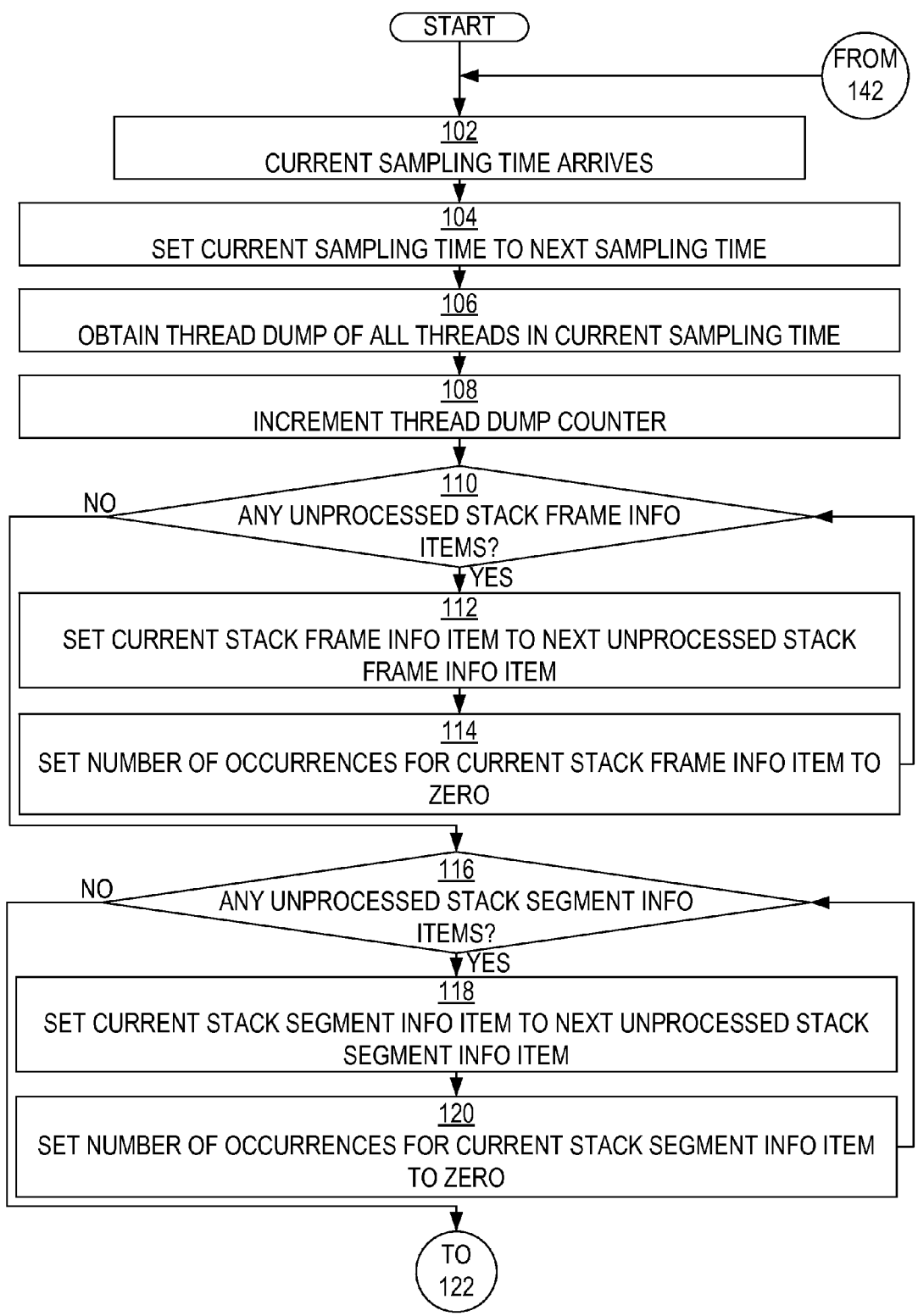
FIGS. 1A-B show a flow diagram that illustrates an example of a technique for applying thread or stack segment intensity analytics, according to an embodiment of the invention.

Data can be categorized into facts, information, hypothesis, and directives. Activities that generate certain categories of data based on other categories of data through the application of knowledge can be categorized into classifications, assessments, resolutions, and enactments. These categorizations can be used to enhance a diagnostic system, such as through historical record keeping. Such a diagnostic system can include a system that forecasts computing system failures based on the application of knowledge to system vital signs such as thread or stack segment intensity and memory heap usage by virtual machines. These vital signs are facts that can be classified to produce information such as memory leak, stuck thread, deadlock, congestion, or other problems. Classification can involve the automatic generation of classes and trending of time series data with sample intervals having irregular durations.

Maintaining Relations Between Data and Activities

According to an embodiment of the invention, techniques are disclosed for maintaining formal relations between activities and the data that motivated those activities. More specifically, data formally recognized as facts can be formally related with, or mapped to, a classification activity that derives information based on those facts. Such information is also data in a general sense, but can be formally recognized as information, as distinct from facts. An assessment activity, which derives a hypothesis based on such information, can be formally related with, or mapped to, that hypothesis. A resolution activity, which derives a directive based on such information and hypothesis, can be formally related with, or mapped to, that directive. The directive is also data, but can be formally recognized as a directive, as distinct from facts and information. An enactment activity, which derives further facts based on such a directive, can be formally related with, or mapped to, those further facts.

Thus, in an embodiment of the invention, each item of data can be labeled as a fact, as information, as a hypothesis, or as a directive. Each activity can be labeled as a classification, an assessment, a resolution, or an enactment. Raw data received from external sources to the system, such as sensors, can be labeled as facts, which are generally quantitative rather than qualitative. A knowledge-based automated process or human judgment applied to such facts can be labeled as a classification. Data that results from the classification can be labeled as information. Information generally indicates what the facts are judged or determined to mean qualitatively. A knowledge-based automated process or human judgment applied to such information can be labeled as an assessment. Data that results from the assessment can be labeled as a hypothesis. Similarly, a knowledge-based automated process or human judgment applied to such hypothesis can be labeled as a resolution. Data that results from the resolution can be labeled as a directive. A directive generally prescribes an operation that is deemed appropriate for performance in an effort to remedy or improve a state indicated by the information. A knowledge-based automated process or human operation applied to such a directive can be labeled as an enactment. An enactment generally carries out the operation prescribed by the directive. Data that results from the enactment, which may be obtained through measurements made relative to a state produced by the enactment, also can be labeled as facts. A further classification can be made relative to these facts, and so the sequence described above can be repeated iteratively. In each iteration, additional facts, information, and directives can be observed. In each iteration, additional classifications, assessments, resolutions, and enactments can be performed. Thus, embodiments of the invention can involve cyclical classifications of facts producing information, assessments of information producing hypothesis, resolutions of information producing directives, and enactments of directives producing further facts. The cycle is called the CARE (classification-assessment-resolution-enactment) loop.

In an embodiment of the invention, for each classification that occurs in a system, a mapping between that classification and the facts that motivated that classification can be generated and stored. For each assessment that is made in the system, a mapping between that assessment and the information that motivated that assessment can be generated and stored. For each resolution that is made in the system, a mapping between that resolution and the information that motivated that resolution can be generated and stored. For each enactment that is performed in the system, a mapping between that enactment and the directive that motivated that enactment can be generated and stored. Additionally, a mapping between each classification and the information resulting from that classification can be generated and stored. Additionally, a mapping between each assessment and the hypothesis resulting from that assessment can be generated and stored. Additionally, a mapping between each resolution and the directive resulting from that resolution can be generated and stored. Additionally, a mapping between each enactment and the facts resulting from that enactment can be generated and stored.

In an embodiment of the invention, a set of object-oriented classes is established to categorize instances of facts, classifications, information, assessments, hypothesis, resolutions, directives, and enactments. Domain-specific subclasses of each of these classes can be derived from these classes. For example, for a specific domain (e.g., data center health monitoring, diagnosis, and management), a domain-specific subclass of the fact class can be derived from the fact class, a domain-specific subclass of the classification class can be derived from the classification class, a domain-specific subclass of the assessment class can be derived from the assessment class, a domain-specific subclass of the hypothesis class can be derived from the hypothesis class, a domain-specific subclass of the resolution class can be derived from the resolution class, a domain-specific subclass of the directive class can be derived from the directive class, and a domain-specific subclass of the enactment class can be derived from the enactment class. Each of these domain-specific subclasses can be given labels and attributes that are appropriate to the domain to which they are applicable. For example, in a data center health monitoring, diagnosis, and management domain, a domain-specific subclass of the fact class might be a thread dump class. For another example, a domain-specific subclass of the information class might be a stuck thread class. For another example, a domain-specific subclass of the directive class might be a load balancing class.

In an embodiment of the invention, for each data item that is a fact, an object that is an instance of the domain-specific subclass of the fact class can be instantiated to store the values of attributes that pertain to that data item. For each data item that is information, an object that is an instance of the domain-specific subclass of the information class can be instantiated to store the values of attributes that pertain to that data item. For each data item that is a directive, an object that is an instance of the domain-specific subclass of the directive class can be instantiated to store the values of attributes that pertain to that data item.

In an embodiment of the invention, for each activity that is a classification, an object that is an instance of the domain-specific subclass of the classification class can be instantiated to store the values of attributes that pertain to that activity. For each activity that is an assessment, an object that is an instance of the domain-specific subclass of the assessment class can be instantiated to store the values of attributes that pertain to that activity. For each activity that is a resolution, an object that is an instance of the domain-specific subclass of the resolution class can be instantiated to store the values of attributes that pertain to that activity. For each activity that is an enactment, an object that is an instance of the domain-specific subclass of the enactment class can be instantiated to store the values of attributes that pertain to that activity.

In an embodiment of the invention, mappings between these objects can be generated and stored. Such mappings can be recalled later, potentially through the execution of queries against a database in which such mappings can be stored.

The Classification-Assessment-Resolution-Enactment Loop

In an embodiment of the invention, four separate classes of data are defined: facts, information, hypothesis, and directives. In an embodiment, four separate classes of knowledge are defined: classification, assessment, resolution, and enactment. An information instance can comprise observations and/or predictions and/or norms and/or objectives that have been distilled from facts by a classification process. A hypothesis instance can be derived from observations and/or predictions that were made by an assessment process. A directive instance can be derived from hypotheses that were made by a resolution process. An enactment process can generate new facts.

In an embodiment, facts—raw input into the system—can be reduced to observations and/or predictions and/or norms by applying classification knowledge. Facts can be mapped to discrete tag properties that represent an established terminology of observations. Observations can be used to carry out an assessment in order to derive a hypothesis. Such a hypothesis can have a probability, magnitude, and reaction urgency. Observations, predictions, norms, and/or hypotheses can be used to determine directives—action plans—for dealing with a situation. Directives can be carried out by applying enactment knowledge. As directives are enacted, emerging facts can be classified. Further assessments can be carried out to determine whether the situation has been resolved or whether further directives should be ascertained.

Techniques disclosed herein can be used to develop applications. The knowledge, information, process, and social interaction model disclosed herein can be used to develop data-driven applications. Semantics can be associated with data by distinguishing the data into facts, information, hypothesis, and directives. These data, so distinguished, can be interrelated with classification, assessment, resolution, and enactment knowledge using the CARE loop. Database technologies can be used to implement the techniques disclosed herein and to implement the model disclosed herein.

Knowledge, Information, Process, and Social Interaction Model

Using the model disclosed herein as a general design pattern, evolutionary applications can be developed. Such applications can be developed through the gradual injection of encoded knowledge processes. Such encoded knowledge processes can be used to automate manual processes. Directive class can be associated to a profile of necessary tacit knowledge to carry out the directive. Actor class can be associated with a tacit knowledge profile. By matching the tacit knowledge requirement of a directive and tacit knowledge profile of actors, optimal human resources can be selected and assigned to each task. The CARE loop can be used as an engine to build dynamic reactive systems.

Knowledge, Data, and Actors

In an embodiment of the invention, three object-oriented classes can be defined: the data class, the knowledge class, and the actor class. Objects can be instantiated from these classes. These objects can be stored in a database for an application. Multiple versions of each object can be maintained in the temporal database so that a history of each object can be obtained if desired.

Data objects—instances of the data class—can represent structured, semi-structured, and unstructured raw contents such as facts, event streams, relations, Extensible Markup Language (XML) documents, text, etc. Data objects also can represent metadata such as categories, tags, relationships, and containers. Data objects also can represent contents captured through acquisition processes such as user interface forms, prescription forms, and notification templates.

Knowledge objects—instances of the knowledge class—can represent algorithms, scripts, processes, queries, Resource Description Framework (RDF) axioms, production rules, decision trees, Support Vector Machines, Neural networks, Bayesian networks, hidden Markov models, Hopfield models, tacit human knowledge, and others. Knowledge can be applied to data objects as those data objects are added, changed, or deleted. The upgrading of a knowledge object can trigger the retroactive processing of data objects to which the knowledge in that knowledge object has already been applied. The knowledge in knowledge objects can be applied as soon as those knowledge objects are deployed.

Actor objects—instances of the actor class—can represent individuals, groups of individuals, or organizations. Actor objects can have attributes such as an organizational context, a skill profile, a knowledge profile, an interest profile, and a preference profile. Such a knowledge profile can indicate tacit knowledge that the actor object possesses but which the system might not possess in an encoded manner. When the actor object represents an individual, then the actor object can specify a real-time presence for the actor represented by the object. When the actor object represents an individual, then the actor object can specify a real-time activity for the actor represented by the object. Actor objects can be assigned to pending directive optimally based on the attributes of those actor objects.

In one embodiment of the invention, the data, knowledge, and actor classes all can be derived from the same base class.

Facts, Information, Hypothesis, and Directives

In an embodiment of the invention, three separate object-oriented classes can be derived from the data class discussed above: the fact class, the information class, the hypothesis class, and the directive class. Objects can be instantiated from these classes. The objects can be stored in a database for an application.

Fact objects—instances of the fact class—can represent input into a system. Such input can include, for example, a data stream from garbage collector in JVM, stack traces from periodic thread dumps, a memory heap dump, a databse AWR report, etc. Fact objects can represent unstructured conversations, form inputs, or quantitative measurements collected from a device.

Information objects—instances of the information class—can represent qualitative interpretations of observations or predictions from facts. In an embodiment of the invention, three separate object-oriented classes can be derived from the information class: the observation class, the prediction class, the norm class, and the objective class. Objects of each class can be instantiated. Observation objects can represent individuations of facts into discrete values. For example, an intensity of threads blocking for database connections fact (a number) could be individuated into an observation object having a qualitative value such as normal, guarded, severe, or critical. Prediction objects can represent qualitative values forecasted from changing conditions. Prediction objects can represent qualitative values interpolated or extrapolated by a model of observations, potentially through simulation. Norm objects can represent qualitative values of a historical baseline. Objective objects can represent target qualitative values whose attainment should be sought for the observation and prediction objects in order to achieve an overall objective and resolution. The difference between an objective and an observation can be classified. The degree of the difference between an objective and an observation can influence the determination of the directive.

Hypothesis objects—instances of the hypothesis class—can represent diagnoses or causes of the observations and/or predictions. For example, a failure of a load balancer that causes thread intensities of a class of threads to be classified as in hypertension state (intensity significant higher than the norm) in a first server and in hypotension state (intensity significant lower than the norm) in a second server in a cluster of two servers is a domain-specific example of a hypothesis.

Directive objects—instances of the directive class—can represent activities that are to be performed. An instruction for taking heap dumps or configure a memory management policy is a domain-specific example of a directive.

Classifications, Assessments, Resolution, and Enactments

In an embodiment of the invention, four separate object-oriented classes can be derived from the knowledge class discussed above: the classification class, the assessment class, the resolution class, and the enactment class. Objects can be instantiated from these classes. The objects can be stored in a database for an application. These objects collectively can represent abstractions of institutional knowledge. Such knowledge can be encoded in an automated software program, for example, or such knowledge can be human knowledge. Knowledge can take the form of an algorithm, technique, process, or method. Knowledge can be applied to data to derive other kinds of data.

Classification objects—instances of the classification class—can represent techniques for reducing quantitative facts into qualitative observations. The application of a classification technique can generate a compact representation of important facts taken from a pool of facts.

Assessment objects—instances of the assessment class—can represent techniques for generating a hypothesis about a cause of observations. These techniques can be manual, computer-guided, or fully automated.

Resolution objects—instances of the resolution class—can represent techniques for generating a set of directive to handle the hypothesis. These techniques can be manual, computer-guided, or fully automated. Resolutions can seek to develop directives based on how much the observations or predictions are deviating from the norms.

Enactment objects—instances of the enactment class—can represent techniques for interpreting the intent of a directive and for executing that intent. Enactments can seek to respond to a hypothesis. Enactments can seek to capture additional facts.

Actors

Actor objects—instances of the actor class—can represent people, groups, communities, and automated agents. Actor objects can possess attributes such as profiles and presence contexts. A person can be an individual that interacts with the system. A person's profiles can represent that person's disciplines, roles, and responsibilities. A person's tacit knowledge profile can be extracted automatically from messages, reports, and publications contributed or authored by that person. A group can be a team of individuals. A group's profiles can represent that group's disciplines, roles, and responsibilities. A group's tacit knowledge profile can be extracted automatically from messages, reports, and publications contributed or authored by members of the group. A community can be an organization, forum, conference, journal, etc. A community's tacit knowledge profile can be automatically generated based on the community's discourse. An automated agent can be software that encapsulates algorithmic processes such as workflows, simulations, support vector machines, neural networks, and Bayesian networks to name a few. An automated agent can possess a profile that indicates that agent's capabilities.

In an embodiment, knowledge activities, such as those represented by classification objects, assessment objects, resolution objects, and enactment objects, can be assigned to an actor object based at least in part on the attributes possessed by that actor object. Thus, each activity to be performed can be assigned to the actor who is most capable of performing that activity most efficiently.

In an embodiment, at least some attributes of actor objects can be captured either directly or indirectly. These attributes can include profiles. An actor object can possess preferences. Using natural language processing, an expertise-finding tool can extract an actor's expertise and interests from that actor's contributions, such as messages, reports, and publications. Such expertise and interests can be indicated through nouns and topics. The tool can classify each noun phrase or topic as being an expertise, an interest, a like, a dislike, a recommendation, etc. In an embodiment, event subscriptions can be automatically created for actors based on those actors' profiles.

In one embodiment, actors' profiles can change over time. Different versions of these profiles over time can be maintained for each actor. Re-evaluation of an actor's contributions can cause that actor's expertise to change over time. An actor's history of profiles can be stored and queried in a bi-temporal database.

In an embodiment, profiles for an actor can be constructed automatically based on the contents of social interactions in which that actor engaged. These social interactions can include conversational threads, for example. Social interactions can be represented as container objects. Such social interaction container objects can represent conferences, chat rooms, e-mail inboxes, e-mail outboxes, calendars, task lists, and forums. Actors's content contributions in these container objects can be profiled in context. The knowledge functions such as classification, assessment, resolution, and enactment can be parameterized such that the parameters are personalizeable to the expertise, preference, and social network profiles of each actor to an extent possible while still observing the organization's constraints. In certain embodiments, the actors can select the best team members based on the situation, their own preferences, and limiting organizational factors.

Application Evolution

According to an embodiment of the invention, applications can evolve constantly due to the separation of knowledge from user interface applications. In an embodiment, knowledge can be maintained separately and an execution engine can apply the knowledge appropriately. Some kinds of knowledge, such as the tacit knowledge that is possessed by human beings, are not pre-known within a computing system. In one embodiment, in order to enable the acquisition of these kinds of knowledge, the system can present a user environment that encourages and motivates users of that environment to express such kinds of knowledge. The system can present a user environment that rewards users of that environment for expressing such kinds of knowledge. The system can then capture the knowledge and use it for supervised learning of machines for classification, assessment, resolution, and enactment purposes, for example.

According to an embodiment of the invention, user interfaces are provided through which human users can enter data that can be used to describe why those users made the decisions that they did. The system can store such descriptions in association with data that indicates the actions that the users performs or caused to be performed. Thereafter, stored records can be queried in order to ascertain, for any actions, the reasons why those actions were performed. Additionally, such records can reflect the facts at the time upon which the decisions to perform the actions were based. Thus, processes can be documented in the system.

Some classification activities can be performed by human beings rather than by automated processes. In one embodiment of the invention, in response to a human being's performance of a classification activity, the system can ask the human being to provide a description of the situation relative to which the activity is being performed. The system can then store this description in association with a classification object that represents the classification activity. In one embodiment, the system can ask the human being to provide annotations using a repertoire of vocabulary, potentially through guided social tagging. The system can then store these annotations in association with the classification object. In one embodiment of the invention, the system can ask the user to identify a minimum set of facts upon which the classification activity was based. The system can then store this set of facts in association with the classification object.

Some assessment activities can be performed by human being rather than by automated processes. In one embodiment of the invention, in response to a human being's performance of an assessment activity, the system can ask the human being to declare an assessment that will be conducted based on a classification in order to arrive at a hypothesis. The system can ask the human being to annotate the assessment using a repertoire of vocabulary through guided social tagging. The system can ask the human being to indicate which observations, predictions, norms, and objectives, in a set of classifications, are relevant to the assessment, potentially through guided social tagging. The system can ask the human being to declare an assessment result in the form of a hypothesis by providing a repertoire of vocabulary, potentially using guided social tagging. The system can ask the human being to declare a resolution that will be conducted based on the assessment of a hypothesis. The system can ask the human being to annotate the resolution using a repertoire of vocabulary through guided social tagging. The system can ask the human being to specify an action plan in the form of one or more directives. The system can ask the human being to annotate the action plan as a whole and each of the directives within the action plan. The system can store the inputs along with annotations in association with the assessment and resolution objects.

In an embodiment of the invention, when the system asks a human being to provide an annotation, the system can recommend a repertoire of vocabulary to the human being based at least in part on profiles that are associated with the human being's actor object. In one embodiment of the invention, the system can recommend tags to the human being based on similarities of knowledge items associated with actor objects that belong to the same community to which an actor object associated with the human being belongs. In one embodiment of the invention, the system can recommend tags to the human being based on the frequency of usage of those tags by other actors in a community of actors. In certain embodiments, the system can employ guided social tagging experience similar to the popular social networking experience. Guided social tagging can lead to more standardized vocabularies, more identifiable cases, and more repeatable processes. It lets the processes evolve from ad hoc practices to well defined and optimized practices (e.g. standard of care practices). Furthermore, user annotations can be used as patterns for pattern recognition algorithms and positive and negative examples for supervised machine learning algorithms to enable the application to evolve with automation.

Application of the Data-Driven Framework to Specific Domains

In some application domains, such as an application to monitor the health and respond to issues in different parts of a large data center, the desired application behavior may not be completely specified, designed, and programmed ahead of time. For these systems, the application behavior needs to be implemented in a timely fashion in response to the convergence of evolving data and knowledge. After the application is implemented, the application behavior needs to continuously adapt to changing information represented in the data and knowledge. In such a domain the application development process must be data driven, where application behavior is composed of functional elements that encapsulate knowledge derived from data. For the application to evolve effectively with changing data and knowledge, the knowledge elements need to be managed as a form of data together with other types of data in a system that supports provenance tracking. With provenance support, when fact changes the system can re-characterize the knowledge which is derived from the facts and when knowledge changes the system can re-assess the information in the facts. In one embodiment of the inventions disclosed herein, the knowledge elements are categorized by classification, assessment, resolution, and enactment types. Not all of the knowledge elements are encoded as automated functions or processes. The interactions through tacit knowledge of actors are also captured as instances of the application of classification, assessment, resolution, and enactment knowledge in a provenance database. The data-driven process control tracks each classification action performed by either encoded knowledge or actor's tacit knowledge as a triple (fact, classification, information) in the provenance database. Each assessment action performed by either encoded knowledge or actor's tacit knowledge is captured as a triple (information, assessment, hypothesis). Each resolution action performed by either encoded knowledge or actor's tacit knowledge is captured as a triple (hypothesis, resolution, directive). Similarly each enactment action performed by either encoded knowledge or actor's tacit knowledge is captured as a triple (directive, enactment, fact). In certain embodiment of the invention, these instances of triples are represented as Resource Description Framework (RDF) triples and Reification triples in the database.

In one embodiment of the inventions, the system serves as a Classification-Assessment-Resolution-Enactment (CARE) process control engine, named after the four types of activities that drive the engine. The engine actively initiates the interactions between actors and automated classification, assessment, resolution, and enactment processes. The engine cycles through classification, assessment, resolution, and enactment stages to produce the fact, information, hypothesis, and directive data at each stage of the process cycle. In an embodiment, functions such as classification, assessment, resolution, enactment provide a process aspect, while facts, information, hypothesis, and directive provide a data aspect. The functions are transformational in nature. In a certain embodiment, a CARE control engine is empowered with complete control to generate and maintain the fact, information, hypothesis, directive data, as well as the provenance data. In doing so, the CARE control engine can anticipate what data will be available and when. The engine can also anticipate a time when enough data will be available to apply the right knowledge function of any knowledge category. The engine can also enforce deadlines.

A CARE control engine is empowered with complete control to generate and maintain tacit knowledge profiles of the actors, and capability profiles of the encoded classification, assessment, resolution, and enactment functions. A CARE control engine can be empowered to profile the tacit knowledge and preferences of actors, select the most qualified actors for each directive, and assign tasks to the selected actors. Such an execution model is amenable to evolutionary development of a decision support automation system. In certain embodiments, reification of the classification actions performed by actors with associated input fact and output information in the provenance database can be used as training samples for supervised learning of support vector machines or neural networks for automatic classification. Reification of assessment actions performed in the system can be used as cases to derive the conditional probabilities in Bayesian networks as well as identify new associations and causal dependencies to extend the Bayesian networks for automatic assessment.

Disclosed herein is a framework in which the classification of facts is one of several operations that can be performed by actors or classification machines or in conjunction with each other. The information classified from fact is a summary of raw data and can include trend, prediction, norm, objective, and state vector. In addition to classification, the framework can involve assessment. Like classification, assessment is a kind of application of knowledge to information derived from facts. Assessment can be performed by actors or assessment machines or in conjunction with each other. In addition to classification and assessment, the framework can involve resolution. Like classification and assessment, resolution is a kind of application of knowledge to a hypothesis derived from information. Resolution can be performed by actors or resolution machines or in conjunction with each other. In addition to classification, assessment, and resolution, the framework can involve enactment. Like classification, assessment, and resolution, enactment is a kind of application of knowledge according to a directive. Enactment can be performed by actors or enactment machines or in conjunction with each other.

Figure 12:
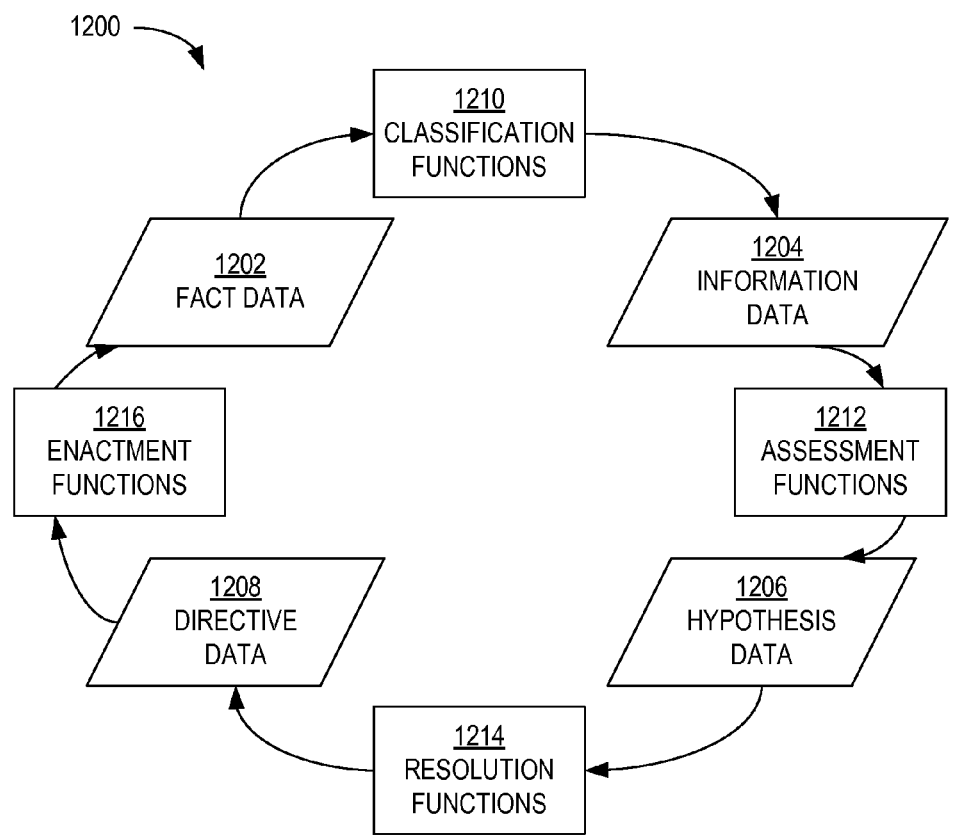
FIG. 12 is a block diagram of a framework that transforms various states of data using various functions, according to an embodiment of the invention.

FIG. 12 is a block diagram of a framework that transforms various states of data using various functions, according to an embodiment of the invention. Framework 1200 includes fact data 1202, information data 1204, hypothesis data 1206, and directive data 1208. Framework 1200 also includes classification functions 1210 which transform fact data 1202 into information data 1204, assessment functions 1212 which transform information data 1204 into hypothesis data 1206, resolution functions which transform hypothesis data 1206 into directive data 1208, and enactment functions which transform directive data 1208 into fact data 1202.

The techniques to monitor the health and to respond to the health issues of a computer system need to define the "vital signs" of the system. The techniques can involve monitoring of vital signs within time series data. The time series data can originate from various sensors. Information contained within time series data is a specific type of fact. Such vital signs can include, for example, memory usage and thread or stack segment intensity. Seasonal trending techniques can make use of time series data for "vital signs" of a computer system to perform classification of trends.

Seasonal trending and the classification of heap usage and thread or stack segment intensity are just some of many different possible applications of the framework disclosed herein. Using the framework, high-level information can be derived from low-level facts. Such low-level facts can be raw data such as JVM verbose GC logs and stack traces, for example. The raw data can undergo transformations to extract increasingly higher levels of classification information. For example, the thread segments in the stack traces can be classified into more concise information. After classifying the stack segments and threads, the technique can extract dependency relations among classes of threads and drill-down composition of threads and stack segments, which are higher forms of classification information. The time-series data for periodic thread dumps contains trending information for each class of threads and stack segments. Seasonal trending transforms time series data into higher forms of information, such as periodic seasonal cycles, linear trends, variance changes, level changes, level drifts, outliers, and endpoint predictions. The trend data can reduce a large volume of time series data into a more concise sequence of events, with the number of events proportional to the number of substantive trend changes over the time window of observations.

In one embodiment, the system states can be identified by a vector of features extracted from the trend data, and system state changes can be demarcated by events that represent substantive changes in the trend. In a certain embodiment, a feature vector will be comprised of the qualitative state of each of the trend information, including seasonal factors, linear trends, variance changes, level changes, level drifts, outliers, and endpoint predictions. Each type of quantitative data types can be classified into as few as 2 or 3 discrete levels such as low, normal, or high. For example, intensity of a class of threads or stack segments will be deemed normal if it is within 1-sigma band of the seasonally adjusted expected intensity. In this example, the value of high or low over a time window of observation provides qualitative information about the hypertension or hypotension state of this class of threads. In another example, the seasonal factors may exhibit discontinuity in the transition from weekend to weekday or from weekday to weekend. The shapes of trends in seasonal factors (such as a monotonic pattern) within each season and the degree of discontinuity (such as a sawtooth pattern) connecting different seasons can be described in qualitative form in a feature vector.

A feature vector, for example (high linear trend, high level drift, high variance change, near endpoint) in a feature vector subspace (linear trend, level drift, variance change, endpoint prediction), can be extracted from time series data in the JVM verbose GC log files. In one embodiment, by observing the feature vector (high linear trend, high level drift, high variance change, near endpoint) that persists in a JVM for a certain time window, the memory state of the JVM can be classified as Memory Leak. A state is valid only for a certain time interval demarcated by a start time t1 and an end time t2 of a time window when the feature vector persists in the JVM. The feature vector of the JVM may change when a memory leak site is identified and fixed. Due to the application of a bug fix, subsequent observed state of the JVM may be described by a new feature vector, for example (low linear trend, low level drift, low variance change, no endpoint) that is classified as Normal Memory state, that may persist for the duration from start time t2 to end time t3. Hence the information may indicate that the system health progressed from Memory Leak state to Normal Memory state. In one embodiment, this state transition can be classified as an improvement trend. Alternatively, after fixing the memory leak, a memory management problem may be manifested as high variance change in the feature vector (low linear trend, low level drift, high variance change, no endpoint). This may involve one more CARE control cycle to resolve during which time the system may undergo state transitions from Memory Leak state to Memory Management Problem state to Normal Memory state. If instead the observed feature vectors were to change from Normal Memory state to Memory Leak state, in one embodiment the CARE control can classify the information as a regression trend and invoke an actor for assessment of the regression. The state of the memory feature space can be joined with the state of other feature spaces such as thread or stack segment intensity trends to form a composite state (Normal Memory state, Normal Thread Intensity state) of the JVM. In a certain embodiment, the valid times of the feature vector states can be managed using the valid time columns of a multi-temporal database schema (which is also known as bi-temporal database schema).

In one embodiment a first CARE control cycle may, in response to the information changes in an example scenario, classify a Memory Leak state and invoke an assessment operation that derives a hypothesis. In response to chain-reaction of information changes, the first CARE control cycle may invoke a resolution that issues a directive to collect two heap dumps from the target JVM with a specified time lapse between the dumps. This directive may be enacted by an actor and result in two heap dump files among the new facts. A second CARE control cycle may invoke a classification operation to identify the memory leak site by comparing the histograms of objects in the two heap dumps. A hypothesis about a code bug may be issued after the assessment of a memory leak site. A directive to fix and patch the bug may be issued after the resolution of a code bug. After the enactment of the directive to fix and patch the bug, a third CARE control cycle may classify the new facts as Memory Management Problem state and invoke an assessment operation. The assessment by an actor may then result in a hypothesis about a mis-configuration of a memory management policy (e.g. soft reference LRU policy). The third CARE control cycle may invoke a resolution operation that results in a directive to tune the soft reference LRU policy. This directive to tune the memory management policy may be enacted by an actor. A fourth CARE control cycle may classify a Normal Memory state based on the new facts collected by the last enactment. The fourth CARE control cycle may then classify an Improving Trend by observing the state transitions from Memory Leak state to Memory Management Problem state to Normal Memory state.

In one embodiment, the CARE control will invoke actors to classify every new facts in the feature vector space, for example a subspace (linear trend, level drift, variance change, endpoint prediction), for each out of memory incidence in JVM's. When a sufficient number of positive and negative samples are collected, the CARE control can apply supervised learning to construct a support vector machine to classify Memory Leak problem. For example, a feature vector (high linear trend, high level drift, high variance change, near endpoint) can be classified as Memory Leak by a support vector machine.

In one embodiment, the CARE control can register queries in the database for changes in information in the facts and in the knowledge elements, all of which are represented as data. Changes in the facts can be induced by enactments. Changes in the information in the facts can be induced by enactments as well as changes in knowledge elements that extract or interpret the information. Changes in the knowledge elements can be induced by online or offline machine learning processes, which in certain embodiments, are modeled as enactment processes. The CARE control can initiate classification, assessment, resolution, and enactment actions in response to changes in the data. In certain embodiments, the CARE control engine can be implemented using the database triggers, real-time journal analysis, and registered queries on top of a bi-temporal database. In certain embodiments, CARE control engine can register queries in the database for either object change notification or query result change notification. An object referenced by a registered query is a registered object. Hence each object among fact, information, hypothesis, and directive data can be a registered object. Similarly, each object among classification, assessment, resolution, and enactment knowledge elements can be a registered object.

The framework can enable the evolution of specialized algorithms that can be used to perform actions like classification, assessment, resolution, and enactment. Specialized algorithms might not necessarily work together directly. Algorithms that monitor seasonal trends in thread or stack segment intensity do not necessarily work directly with algorithms involving the determination of heap usage trends. The CARE control allows these diverse algorithms to be developed independently and be integrated into a single system which is capable of evolving as a common application, by encapsulating these algorithms as classification, assessment, resolution, and enactment components that interact via normalized fact, information, hypothesis, and directive data model. The addition of new algorithms to a system can produce an additive effect. The algorithms within the system can complement and reinforce each other. The algorithms can correlate with each other in order to achieve better diagnosis. The CARE control execution model drives the interactions by continuously querying the changes in the data and initiating the execution of dependent components. Some of these components may involve user interface and messaging systems that interact with the human actors.

Domain-specific algorithms applied to domains such as seasonal trending based on various vital signs initially can be characterized as classification elements within the framework. However, using the framework, such algorithms can be further refined and understood. This increased refinement and understanding can produce the ability to capture patterns that can be even more specialized for the particular environment in which they are being applied. This is a further degree of classification. This further degree of classification comes from the relating of diverse items of information to each other. For example, in a specific domain, thread or stack segment intensity information can be related to memory usage information. Such information can be related to directives that were issued within a system. A system can capture such issued directives and formally relate them to information items to show a connection between them. As these relationships are built up within the system, patterns of relationships can become recognizable. The kinds of patterns that the system can recognize can evolve over time.

CARE control also serves as a model for visualization of the evolution of data, knowledge, and state of the target systems being monitored. For example, raw data concerning a JAVA virtual machine's (JVM's) heap usage can be monitored over time. Such raw data, in the framework, are facts that can be classified through the application of knowledge. The knowledge can take the form of a seasonal trending algorithm, signal processing algorithm, support vector machine, neural network, and Bayesian network, to name a few. Information can be derived from the raw data and represented in feature vectors. Higher level information can take the form of a state identified with a classification of feature vector by a support vector machine. Such classification information might indicate a time interval when an aspect of the system is persistently observed in a state. Such state information might be composed to indicate, for example, points in time at which an aspect of the system is observed to transition from one state to another state, for example a point in time when a bug fix is applied on a JVM. These points in time can become apparent through a determination of the points in the time series plot at which the pattern of information changes. Sometimes the points in time when the information changes are not apparent in the raw data (they are not visible through naked eyes) are made apparent only by the information extraction or signal detection from the raw data. In an example scenario, the raw data or the trend information in a time series might show that during a first interval of time, baseline JVM heap usage steadily drifts higher even in the presence of high variance in heap usage. Such steady level drift in JVM heap usage can be the result of a memory leak. The raw data might then show that during a successive second interval of time, the baseline JVM heap usage, in the continuing presence of high variance, flattened out. The information change in the raw data at the point in between the first interval and the second interval can indicate that the memory leak was fixed by some change made to the system. During the second interval, the high variance in heap usage might continue. Then, during a third interval the information change in the raw data following the second interval, the variance in heap usage might decrease significantly, indicating that yet another change was made to the system in between the second and third intervals of time. The change between the second and third intervals can be associated with a tuning action on a memory LRU policy.

In this example, multiple items of information can be derived from the raw data. First, information about the drift in the baseline heap usage can be derived. Second, information about the change in the variance of the heap usage can be derived. An algorithm can derive such information from the raw data. By filtering and transforming the raw data, noise and extraneous irrelevant information can be removed from the raw data, leaving only information that is of interest. The filtering can involve the removal of seasonal trends in the data, for example. Within such filtered data, patterns can become more apparent to an automated system that attempts to find such patterns. Forecasting also may be performed based on the data and the information derived there from. For example, based on the data and derived information, a prediction can be made that in the absence of a system re-start, which counteracts the effects of a memory leak, the system will run out of memory and crash at a specific date and time in the future. Such a forecast can be adjusted for seasonal (e.g., daily, weekly, quarterly) trends that occur in the data.

Each time that the raw data show a change in the system, producing the distinctive first, second, and third intervals discussed above, that change can be the result of the issuance of some directive which is the output of a resolution action. Application of the CARE control framework disclosed herein can also generate directives without invoking assessment actions. Associated with the seasonal trending of time series is the information based on the seasonal trend and deseasonalized linear and non-linear trends that can predict with a certain confidence level that, using the same example scenario for a JVM, the target JVM will crash within a known period of time from the present if the system is not restarted before the end of that time. Such a prediction may suggest to a system administrator that he ought to perform system maintenance involving a restart of the JVM during some convenient time (e.g., a weekend) preceding the moment at which the predicted crash will occur. The CARE control may issue an urgent steering directive, such as to restart the JVM, after classifying an endpoint predicted in the near term. Also after a few days or weeks of monitoring the trends within the first interval of operating the JVM with memory leak condition, the CARE control can invoke an assessment and a resolution that will entail a directive for an actor to collect heap dumps to identify the memory leak site and to assess a bug fix. The enactment of a bug fix for memory leak may take a few weeks. In the mean time until the bug fix is ready to apply to the target JVM, the JVM may operate with the memory leak condition. The CARE control will continue to issue restart directives as needed to steer the memory state of the JVM within an operating range while the pending directive for a bug fix is being enacted. These near term steering directives are issued by classification using the information about the endpoint prediction and may not involve assessment actions. When such restarts are enacted, information changes in the raw data collected before and after those restarts can indicate the effects that those restarts had upon heap usage. The information changes induced by JVM restarts can be monitored as short term trends and can be formally labeled in the CARE control model as instances of steering directives that have no long term effect on the system. For example, despite the weekly restart of the JVM's, the feature vector, discussed above, will persist in (high linear trend, high level drift, high variance change, near endpoint), which is identified as Memory Leak state. In contrast, the directive that apply the fix for the memory leak bug will have a lasting effect indicated by the transition from the Memory Leak state in the first interval to the Memory Management Problem state in the second interval. Likewise a directive to tune the memory LRU policy discussed above will have a lasting effect indicated by the transition from the Memory Management Problem state in the second interval to the Normal Memory state in the third interval.

In the following formal notations, an n-tuple A can be regarded as a function F whose domain is the tuple's implicit set of element indices X, and whose codomain Y is the tuple's set of elements. Formally, an n-tuple $(a_1, a_2, \ldots, a_n)$ is a system (X, Y, F) where $X=\{1, 2, \ldots, n\}$, $Y=\{a_1, a_2, \ldots, a_n\}$, and $F=\{(1, a_1), (2, a_2), \ldots, (n, a_n)\}$. An ordered pair is a 2-tuple and a triple is a 3-tuple. A projection of an n-tuple, denoted by $\pi_i$, is a function $\pi_i((a_1, a_2, \ldots, a_n))=F(i)=a_i$.

An n-ary relation R is a set of n-tuples. The attributes of a relation are atoms in an n-tuple $(\alpha_1, \alpha_2, \ldots, \alpha_n)$ which is a system (X, Z, G), $X=\{1, 2, \ldots, n\}$, $Z=\{\alpha_1, \alpha_2, \ldots, \alpha_n\}$, and $G=\{(1, \alpha_1), (2, \alpha_2), \ldots (n, \alpha_n)\}$ such that the codomain of the function G is the relation's set of attributes. A projection of an n-tuple, denoted by $\pi_{\alpha_i}$, is a function $\alpha_{\alpha_i}((a_1, a_2, \ldots, a_n))=F(G^{-1}(\alpha_i))=a_i$. A projection $\pi_{\alpha_i}(R)$ of an n-ary relation R is a set obtained by restricting all the tuples in R to the attribute $\alpha_i$. For example, $\pi_{FeatureVector}$: FeatureVector×ValidTime×FigureOfMerit →FeatureVector. The projection $\pi_{FeatureVector}$(Observation) is a set obtained by restricting all tuples in Observation to the attribute FeatureVector. Each n-tuple in an n-nary relation is implicitly associated with a system change number (SCN) that represents the transaction time when the n-tuple becomes persistent or recoverable. There is a projection function $\pi_{SCN}$ whose domain is a set of n-tuples and whose codomain is a set of system change numbers (SCN). There is a function: SCN→DateTime that computes a DateTime for an SCN.

The selection $\sigma_{proposition}(R)$, where R is a relation and proposition is a Boolean expression, selects the tuples in R that satisfy the proposition. For example, given that AssessmentInput is a relation in FeatureType×Assessment, the selection $\sigma_{FeatureType=MemoryState}$(AssessmentInput) is a set of tuples in AssessmentInput relation whose FeatureType matches MemoryState. The query $\pi_{Assessment}$ ($\sigma_{FeatureType=MemoryState}$(AssessmentInput)) is a set of Assessment functions that take a MemoryState Feature as an input.

In an embodiment of the invention, a KIDS system is a 6-tuple of Actor, Agent, Entity, CARE, Metadata, and Reification.

KIDS=(Actor, Agent, Entity, CARE, Metadata, Reification)

Actor is a set of actors who can interact with the system to perform classification, assessment, resolution, and enactment actions.

TacitKnowledgeProfile, SocialNetworkProfile, and PreferenceProfile are 3 different functions each of which maps a member of Actor to a ProfileVector.

TacitKnowledgeProfile: Actor→ProfileVector
SocialNetworkProfile: Actor→ProfileVector
PreferenceProfile: Actor→ProfileVector ProfileVector is a set of n-tuples of Profile, n=1, 2, 3, . . .

ProfileVector=Profile$^n$

Profile is a relation among a Value, a ValidTime, a FigureOfMerit, and a ProfileType.

Profile=Value×ValidTime×FigureOfMerit×ProfileType

Personalization is a curry operation that applies a profile vector to a parameterized function template to produce a personalized function:

Personalization: FunctionTemplate×ProfileVector→Function

For example knowledge functions such as Classification, Assessment, Resolution, and Enactment functions can be personalized by applying a ProfileVector derived from an Actor's tacit knowledge or preference Profile's:

Personalization(ClassificationTemplate)(ProfileVector)=Classification
Personalization(AssessmentTemplate)(ProfileVector)=Assessment
Personalization(ResolutionTemplate)(ProfileVector)=Resolution
Personalization(EnactmentTemplate)(ProfileVector)=Enactment Agent is a set of computer programs or hardware devices that act for User's.

Entity is a set of entities being monitored. Entity can include Java VM's, Oracle VM's, databases, servers, server clusters, domains, pods, network switches, firewalls, individual classes of threads and thread segments in a server, etc.

A CARE is an ordered pair of Data and Knowledge.
CARE=(Data, Knowledge)
Data is a 4-tuple of Fact, Information, Hypothesis, and Directive.
Data=(Fact, Information, Hypothesis, Directive)
Fact is an ordered pair of FSD and Feature.
Fact=(FSD, Feature)
FSD (Flexible Schema Data) is a relation among an n-tuple of Value, a ValidTime, an Entity, and a FSDType.
FSD=Value$^n$×ValidTime×Entity×FSDType An example of a FSD object is a thread-dump-file containing a series of thread dumps from a Sales-Server in a CRM-Domain in an XYZ-Pod, where Sales-Server, CRM-Domain, and XYZ-Pod are members of Entity, and thread-dump-file is a member of FSDType.

Feature is a relation among a Value, a ValidTime, a FigureOfMerit, an Entity, and a FeatureType. A Feature represents a categorical value, such as low, normal, high, in a range of observations of data.

Feature=Value×ValidTime×FigureOfMerit×Entity×FeatureType

An example of a Feature object is a hypertension-state of a submit-order-thread in an OrderCapture-Server in a CRM-Domain in an XYZ-Pod, where submit-order-thread, OrderCapture-Server, CRM-Domain, and XYZ-Pod are members of Entity, and hypertension-state is a value in the range specified by a thread-intensity or stack-segment-intensity FeatureType.

FeatureVector is a set of n-tuples of Feature, n=1, 2, 3, . . .

FeatureVector=Feature$^n$

In one embodiment, a FeatureVector is an array of Features that have a common ValidTime.

ValidTime is a set of ordered pairs of DateTime. A time interval denoted by [t1, t2) is a set {t|t1<t2 and t>=t1 and t<t2, where t, t1, t2∈DateTime}. For example, two ValidTime's [2013-08-31 12:00 AM PST, 2013-09-01 9:00 AM PST) and [2013-09-01 9:00 AM PST, ∞) can be joined into one ValidTime [2013-08-31 12:00 AM PST, ∞). A time instance t1 can be denoted by [t1, NA).

ValidTime=[DateTime, DateTime∪{∞. NA})

FigureOfMerit is a quantitative or qualitative value representing confidence level, confidence interval, probability, score, root mean square error, etc. The FigureOfMerit is discussed further below in connection with FIG. 13.

Information is a 4-tuple of Observation, Prediction, Norm, and Objective.

Information=(Observation, Prediction, Norm, Objective)
Observation is a relation among a FeatureVector, a ValidTime, and a FigureOfMerit.
Observation=FeatureVector×ValidTime×FigureOfMerit
Prediction is a relation among a FeatureVector, a ValidTime, and a FigureOfMerit.
Prediction=FeatureVector×ValidTime×FigureOfMerit
Norm is a relation among a FeatureVector, a ValidTime, and a FigureOfMerit.
Norm=FeatureVector×ValidTime×FigureOfMerit
Objective is a relation among a FeatureVector, a ValidTime, and a FigureOfMerit that optimizes an objective function.
Objective=FeatureVector×ValidTime×FigureOfMerit
Hypothesis is a relation among a FeatureVector, a ValidTime, and a FigureOfMerit.
Hypothesis=FeatureVector×ValidTime×FigureOfMerit
Directive is a relation among a FeatureVector, a ValidTime, and a FigureOfMerit.
Directive=FeatureVector×ValidTime×FigureOfMerit
Knowledge is a 4-tuple of Classification, Assessment, Resolution, and Enactment.
Knowledge=(Classification, Assessment, Resolution, Enactment)
Classification is a set of functions each of which maps an n-tuple of FSD or an m-tuple of FeatureVector to an Observation, a Prediction, a Norm, or an Objective.
Classification={f|f: (FSD$^n$∪FeatureVector$^m$)→(Observation∪Prediction∪Norm∪Objective), for some integer n, m}
Assessment is a set of functions each of which maps a FeatureVector to a Hypothesis.
Assessment={f|f: FeatureVector→Hypothesis}

Resolution is a set of functions each of which maps a FeatureVector to a Directive.

Resolution={f|f: FeatureVector→Directive}

SymptomResolution is a subset of Resolution functions whose domains are restricted to the FeatureVector among Fact or Information.

SymptomResolution={f|f: FeatureVector→Directive, such that FeatureVector=$\pi_{FeatureVector}$(codomain(g)) where function g is a member of Enactment or Classification}

ClassificationResolution is a subset of Resolution functions whose domains are restricted to the FeatureVector among Observation, Prediction, Norm, and Objective in the Information.

ClassificationResolution={f|f: FeatureVector→Directive, such that FeatureVector=$\pi_{FeatureVector}$(codomain (g)) where function g is a member of Classification}

AssessmentResolution is a subset of Resolution functions whose domains are restricted to the FeatureVector among Hypothesis.

AssessmentResolution={f|f: FeatureVector→Directive, such that FeatureVector=$\pi_{FeatureVector}$(codomain(g)) where function g is a member of Assessment}

ExpertResolution is a subset of Resolution functions which is a composition of Classification, Assessment, and Resolution functions:

ExpertResolution=Classification·Assessment·Resolution

ExpertResolution: (FSD∪FeatureVector)→(Observation∪Prediction∪Norm)×Hypothesis×Directive Enactment is a set of functions each of which maps a Directive to a collection of FSD or a collection of FeatureVector.

Enactment={f|f: Directive→(FSD$^n$∪FeatureVector$^m$), for some integer n, m}

MetaData is a 4-tuple of ProfileType, FSDType, FeatureType, and Influence.

MetaData=(ProfileType, FSDType, FeatureType, Influence)

ProfileType is a set of objects, each of which defines a Name, a data Type, and a Range of values for a Profile. A ProfileType can specify a Name such as "Role" and value Range such as (Foreman, Supervisor, Superintendant, Manager). In another example, a ProfileType can specify a Name such as "Responsibility" and a value Range such as (WebLogic Admin, Database Admin, Linux Admin, Network Admin). For another example, for a ProfileType having a Name "Memory Tuning Expertise," the Range could include qualitative values such as "expert," "intermediate," and "apprentice." For another example, for a ProfileType having a Name "Application Source Code Knowledge" the Range could include qualitative values such as "developer," "architect," and "tester." Such values can be used to define a Profile.

ProfileType=Name×Type×Range×DefaultValue

FSDType is a set comprised of categorical values defining the type of files, such as verbose GC logs, periodic thread dumps, heap dumps, OS Watcher logs, database AWR snapshots, database trace files, click streams, REUI records, access logs, and regular or irregular time series data filtered into aggregates such as seasonal factors, level drifts, level shifts, level spikes, variance changes, outliers, endpoint predictions, restarts, out of memory events, stuck thread events, etc.

FSDType=Name×{Binary, Text}×Encoding×Language

FeatureType is a set of objects, each of which defines a Name, a data Type, and a Range of values for a Feature. A FeatureType can specify a Name such as "Memory State" and value Range such as (Memory Leak, Memory Management Problem, Normal Memory). In another example, a FeatureType can specify a Name such as "Thread Intensity State" and a value Range such as (Hypertension, Hypotension, Convoy Effect). For another example, for a FeatureType having a Name "variance," the Range could include qualitative values such as "high," "normal," and "low." For another example, for a FeatureType having a Name "endpoint," the Range could include qualitative values such as "near," "far," and "no endpoint." Such values can be used to define a Feature.

FeatureType=Name×Type×Range×DefaultValue

A Feature can be extracted from data. The Type can be categorical rather than quantitative. Together, Feature and FeatureType define a name-value pair which can be constrained to a set of allowed values. When these values are extracted from data, a valid time for those values can be propagated along with the Feature. A discussion of valid time is provided below.

Figure 13:
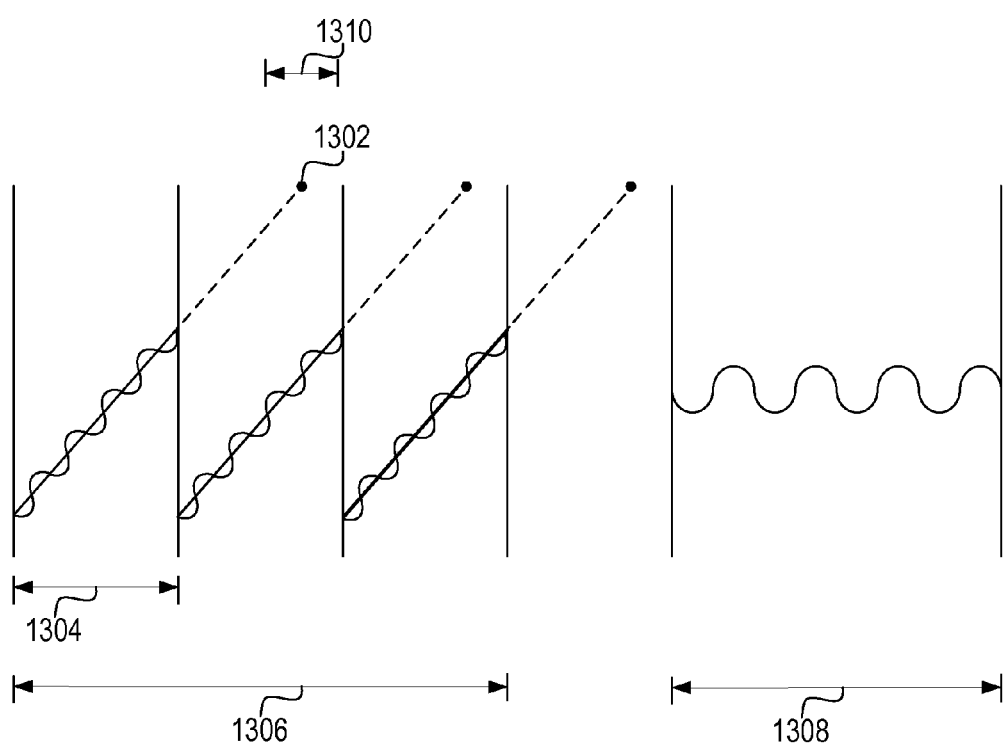
FIG. 13 is a diagram that shows a trend, according to an embodiment of the invention.

FIG. 13 is a diagram that shows a trend, according to an embodiment of the invention. Using techniques described herein, based on the trend, an endpoint 1302 can be predicted at a certain time and date. A valid time 1304 is associated with the trend data that have been used to predict endpoint 1302. In this case, the endpoint is predicted to occur within a few hours of valid time 1304. The data used to predict endpoint 1302 are part of valid time 1304. Such data might be used, for example, to restart a JVM before endpoint 1302 is reached.

In an embodiment, a valid time 1306 can span multiple intervals, where the boundaries of each interval are defined by some event, such as a restart of a JVM. Each time interval, or segment, can show that it is temporally close to some endpoint. The closeness of the endpoint is an example of a feature. In this case, the valid time may be delimited by the life cycle of the JVM. In another example, a valid time might be delimited by the life cycle of a database. After repeated patterns such as those shown in FIG. 13, it is expected that some state may change. For example, a bug fix might cause state to change. During a valid time 1308 subsequent to such an event, the trend might not be increasing.

As is discussed above, a figure of merit may represent a confidence interval or a probability. For example, if the figure of merit represents a confidence interval 1310 in FIG. 13, then the figure of merit might indicate that confidence interval 1310 for the prediction of endpoint 1302 is plus or minus 5 hours. Although in some embodiments a figure of merit can be represented quantitatively, in other embodiments, a figure of merit can be represented qualitatively. For example, rather than confidence interval 1310 being a quantitative measure such as plus or minus 5 hours, confidence interval 1310 may be a qualitative measure such as "fairly accurate." Such a qualitative measure may be a subjective, rather than an objective, notion.

Multiple statistical parameters may be observed from the same machine. In addition to a steady trend, an observation might be made of heavily fluctuating variances that approximate the steady trend. A feature representing the heavily fluctuating variances may be represented by a different feature type than the feature type that represents the endpoints. The feature type for the variances might include a range of qualitative values such as "high," "normal," or "low," for example. The valid times for the features may overlap, however. The features may represent different aspects of the same system. The valid time for each feature may be propagated through the system along with that feature. In one embodiment, the valid time for a feature vector that includes multiple features is the intersection of the valid times for all of those features.

An observation of fact data may reveal that multiple different features are correlated. Such a correlation may be revealed, for example, when the span at which the features' valid times overlap is smaller than the valid time of the entire data set.

Influence is a 8-tuple of input and output relations between FSDType, FeatureType, and elements of Knowledge.

Influence=(ClassificationInput, ClassificationOutput, AssessmentInput, AssessmentOutput, ResolutionInput, ResolutionOutput, EnactmentInput, EnactmentOutput)

ClassificationInput is a relation among a FSDType or a FeatureType and a Classification.

ClassificationInput=(FSDType∪FeatureType)×Classification×Mandatory

ClassificationOutput is a relation among a Classification and a FeatureType.

ClassificationOutput=Classification×FeatureType

AssessmentInput is a relation among a FeatureType and an Assessment.

AssessmentInput=FeatureType×Assessment×Mandatory

AssessmentOutput is a relation among an Assessment and a FeatureType.

AssessmentOutput=Assessment×FeatureType

ResolutionInput is a relation among a FeatureType and a Resolution.

ResolutionInput=FeatureType×Resolution×Mandatory

ResolutionOutput is a relation among a Resolution and a FeatureType.

ResolutionOutput=Resolution×FeatureType

EnactmentInput is a relation among a FeatureType and an Enactment.

EnactmentInput=FeatureType×Enactment×Mandatory

EnactmentOutput is a relation among an Enactment and a FSDType or a FeatureType.

EnactmentOutput=Enactment×(FSDType∪FeatureType)

Mandatory is a Boolean that indicates whether an input FeatureType is mandatory to invoke a function.

Reification is a 5-tuple of (CARELoop, Classified, Assessed, Resolved, Enacted).

CARELoop=Classified×Assessed×Resolved×Enacted

Classified=(FSD∪FeatureVector)×Classification×(Observation∪Prediction∪Norm)×(Actor∪Agent)×TransactionTime Assessed=FeatureVector×Assessment×Hypothesis×(Actor∪Agent)×TransactionTime Resolved=SymptomResolved∪ClassificationResolved∪AssessmentResolved∪ExpertResolved SymptomResolved=FeatureVector×SymptomResolution×Directive×(Actor∪Agent)×TransactionTime ClassificationResolved=FeatureVector×ClassificationResolution×Directive×(Actor∪Agent)×TransactionTime AssessmentResolved=FeatureVector×AssessmentResolution×Directive×(Actor∪Agent)×TransactionTime ExpertResolved=FeatureVector×ExpertResolution×Observation×Prediction×Norm×Hypothesis×Directive×(Actor∪Agent)×TransactionTime Enacted=Directive×Enactment×(FSD∪FeatureVector)×(Actor∪Agent)×TransactionTime TransactionTime is a set of ordered pairs of DateTime. A time interval denoted by [t1, t2) is a set {t|t1<t2 and t>=t1 and t<t2, where t, t1, t2∈DateTime}. For example, two TransactionTime's [2013-08-31 12:00 AM PST, 2013-09-01 9:00 AM PST) and [2013-09-01 9:00 AM PST, ∞) can be joined into one TransactionTime [2013-08-31 12:00 AM PST, ∞). A time instance t1 can be denoted by [t1, NA). TransactionTime records the time period during which an information becomes persistent or becomes recoverable and visible to other recoverable transactions.

TransactionTime=[DateTime, DateTime∪{∞. NA})

When there is a change in a FSD, for example when the GC logs for a JVM are updated, the CARE control can determine the FSDType. The CARE control can use the FSDType to select the Classification function influenced by FSD's of that FSDType from among the ClassificationInput relations. CARE control can also query a closure of FeatureType's comprising the input for the Classification function. CARE control can then compose the required FSD and FeatureVector to invoke the Classification. If the Classification function is represented by a Seasonal Filter, a Decision Rule, a Support Vector Machine, etc., the CARE control will initiate the execution of the function. If the Classification function is represented by a tacit knowledge profile, the CARE control will identify one or more actors whose tacit knowledge profile best matches the tacit knowledge profile of the Classification function and initiate the interactions with the actors to perform the classification action. In both cases of machine and tacit knowledge classification, the result of this Classification function is an Observation, Prediction, or Norm. After this step, the CARE control can reify a relation among a collection of input FSD, a collection of input FeatureVector, a Classification function, and an Observation or a Prediction or a Norm. The CARE control can include any number of Actor's, any number of Entity's, a version of the program implementing the Classification function, parameters applied to the Classification function, and other contextual information in the reification.

In certain embodiments, a ValidTime of a FSD can be derived from the ValidTime's of segments of the time series data. Similarly a ValidTime of a FeatureVector can be derived from the intersection of the ValidTime's of each of the Feature's in the FeatureVector. After the invocation of a Classification function, a new FeatureVector will be produced which will trigger information change notifications. The CARE control can select any Classification, Assessment, and Resolution functions influenced by any of the Feature's in the new FeatureVector, respectively, from among the ClassificationInput, AssessmentInput, and ResolutionInput relations. After taking a closure of all required Feature's corresponding to the FeatureType's influencing the Classification, Assessment, and Resolution functions, the CARE control can invoke these selected functions in sequence or parallel. In an example scenario, upon a change notification of a new FeatureVector, e.g. (high level drift, high variance change, near endpoint prediction), the CARE control can select a higher level Classification function to classify this FeatureVector. A higher level Classification function, such as a support vector machine, can map a FeatureVector in a Feature space (seasonal factors, level drifts, level shifts, variance changes, outliers, endpoint predictions, restarts, out-of memory events) to a categorical Feature such as Memory Leak, Memory Management Problem, Normal Memory, Hypertension, Hypotension, Convoy Effect, Deadlock, etc. After classifying a Memory Leak state, the CARE control can receive another notification of information change.

Figure 14:
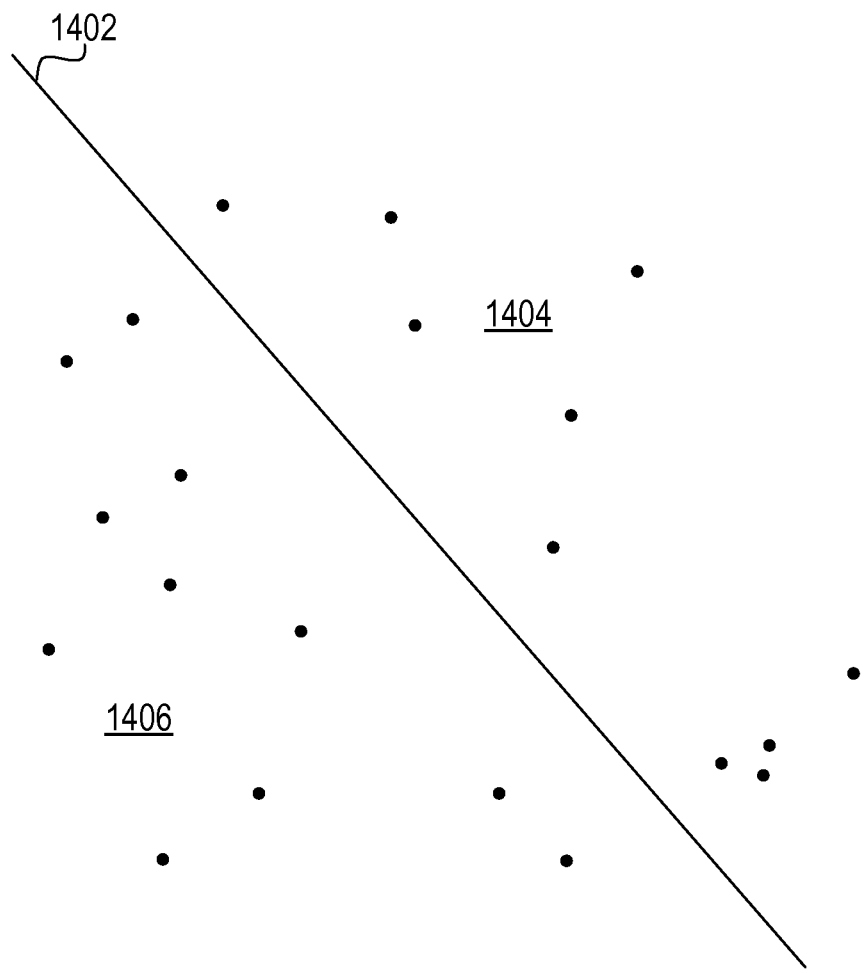
FIG. 14 is a diagram that shows an example of a set of data points that have been automatically classified, according to an embodiment of the invention.

Machine learning techniques, such as those supervised learning techniques that learn support vector machines, can receive a set of feature vectors with associated classifications as input and can automatically learn to classify new data points therein as belonging to separate distinct classifications. FIG. 14 is a diagram that shows an example of a set of data points that have been automatically classified, according to an embodiment of the invention. Points on one side of class divider 1402 are deemed to belong to a class 1404, while points on the other side of class divider 1402 are deemed to belong to a class 1406. For example, class 1404 might contain data items that are "true," while class 1406 might contain data items that are "false." In this example, the classification is binary. In various embodiments of the invention, the classification can be N-way, where N is the number of classes. Thus, a support vector machine can receive a feature vector and, using one or more class dividers such as class divider 1402 that was previously learned in supervised manner from a set of classified sample data, can determine the class of the feature vector based on data contained within that feature vector. Data points in one class might indicate that a memory leak exists in a system, while data points in the other class might indicate that there is no memory leak in the system.

After invoking a Classification function, if the CARE control selects a Resolution function, it can execute the Resolution function to produce a Directive. Such a Directive produced after a Classification function without an Assessment function can be used to steer the system along a desired trajectory, to collect a new component of Fact, or to quickly avert a catastrophic failure. For example, if a Feature vector indicates that a JVM is about to run out of memory, a Directive may be issued to restart the JVM in a weekend to avoid a crash during the seasonal peak time in the following weekdays. In embodiments of the intervention, the CARE process cycle can iterate to maintain all Observation's and Prediction's within some tolerance of the Norm or the Objective by issuing Directive's.

In another example scenario, the CARE control can select an Assessment function that is influenced by the new set of Feature's in a new FeatureVector. The CARE control can query the required FeatureType influencing the Assessment function from among the AssessmentInput relations. The CARE control can then query a closure of the Feature's required to satisfy the Assessment function. In one situation, an Assessment function may be assigned to an Actor whose tacit knowledge profile matches the expertise profile of the Assessment function. In another situation, an Assessment function can be represented by a Bayesian network. The CARE control can compose a FeatureVector over the Feature space required to satisfy the Bayesian network. The ValidTime of the input FeatureVector for the Bayesian network can be derived from the ValidTime of each of the component Feature's as discussed above. The CARE control can then initiate the execution of the Bayesian network. After the execution of the Bayesian network, CARE control can reify a relation among a FeatureVector, a Bayesian network representing an Assessment function, and a Hypothesis.

Upon a change notification of a new FeatureVector associated with a Hypothesis of a Bayesian network, the CARE control can select any Resolution functions that are influenced by the Feature's in the new FeatureVector from among the ResolutionInput relations. After taking a closure of the Feature's corresponding to the FeatureType's required for a Resolution function, the CARE control can invoke the Resolution function to produce a Directive. If the Resolution function is represented by a tacit knowledge profile, the CARE control will identify one or more actors whose tacit knowledge profile best matches the tacit knowledge profile of the Resolution function and initiate the interactions with the actors to perform the resolution action. The CARE control can reify a relation among a FeatureVector, a Resolution function, and a Directive.

In certain embodiments, the CARE control process can select a SymptomResolution or ClassificationResolution function upon a change notification of a new FeatureVector produced by an Enactment or Classification function. The CARE control process can wrap the selected SymptomResolution or ClassificationResolution function with an AssessmentResolution function whose purpose is to produce a Hypothesis. If the SymptomResolution or ClassificationResolution function so selected is associated with a tacit knowledge profile, the CARE control process will select one or more Actor's whose tacit knowledge profiles match the tacit knowledge profile associated with the SymptomResolution or ClassificationResolution function. The CARE control process will select an AssessmentResolution function which supplies the vocabulary to compose an appropriate Hypothesis (described as guided social tagging). The CARE control can ask the Actor to declare a Hypothesis by providing a repertoire of vocabulary, potentially using guided social tagging. The CARE control can reify a relation among a FeatureVector, a SymptomResolution or ClassificationResolution function, a Hypothesis, a Directive. The CARE control can include an Actor and an AssessmentResolution function in the reification. This reification relation between a FeatureVector and a Hypothesis and between a Hypothesis and a Directive can be used as sample cases to develop automatic Assessment and AssessmentResolution functions by machine learning techniques.

In certain embodiments, the CARE control process can select an ExpertResolution function upon a change notification of a new FeatureVector produced by an Enactment function. An ExpertResolution function is typically associated with a tacit knowledge profile. The CARE control will select one or more Actor's whose tacit knowledge profiles match the tacit knowledge profile associated with the ExpertResolution function. The CARE control will assign the Actor's to perform the ExpertResolution function. The Actor's can supply all the necessary outputs of the ExpertResolution function, including Observation, Prediction, Norm, Objective, Hypothesis, and Directive, potentially using guided social tagging. The CARE control can then reify a relation among a FeatureVector, an ExpertResolution function, an Observation, a Prediction, a Norm, an Objective, a Hypothesis, and a Directive. The CARE control can include one or more Actor's in the reification. In this scenario the Actor's can fulfill the roles of Classification, Assessment, and Resolution in a single step.

Upon a change notification of a new Directive entailed by a Resolution function, the CARE control can select an Enactment function that is influenced by the new set of Feature's in the new Directive's FeatureVector. The CARE control can query the required FeatureType influencing the Enactment function from among the EnactmentInput relations. The CARE control can then query a closure of the Feature's required to satisfy the Enactment function. The CARE control can then invoke the Enactment function influenced by the Directive. A Directive such as an instruction to collect heap dumps of the target JVM can be assigned to an Actor whose profile includes JVM expertise.

Systems that support customer service requests, bug reports, or online help forums typically let a user post the problem in natural language texts and submit a set of files relevant to the problem. These unstructured data that includes natural language texts and log files can comprise part of the Fact and Information data in CARE. Typically analysts or other participants will suggest problem resolutions by responding in natural language texts to the user's posts. In certain embodiments, Natural Language Processing (NLP) tools can be used to extract the FeatureVector's in the user's problem description texts and the Directive's in the analysts' response texts. In an embodiment of the invention, the CARE control can designate a SymptomResolution function for the purpose of reifying the FeatureVector's and Directive's extracted from the unstructured content in external repositories. The CARE control can import sample cases from the external bug report, service request, help forum repositories by reifying a relation among a FeatureVector, a SymptomResolution function, and a Directive for each case in the service requests, bug reports, or online help forums. The CARE control can use the FSD and FeatureVector extracted from the cases in external repositories to simulate the CARELoop by invoking the Classification, Assessment, and Resolution functions in the system.

After several CARE control cycles in an example scenario, the Reification can include (1) a set of FSD's for GC logs, that is related to (2) a FSD comprised of regular time series data for heap trends, that is related to (3) a Classification function, that is related to (4) a FeatureVector derived from aggregates such as seasonal factors, level drifts, level shifts, level spikes, variance changes, outliers, that is related to (5) another Classification function, that is related to (6) a FeatureVector representing a Memory Leak state, that is related to (7) an Assessment function represented by a Bayesian network, that is related to (8) a FeatureVector representing a Memory Leak code bug as part of a Hypothesis, that is related to (9) a Resolution function, that is related to (10) a Directive to take heap dumps, that is related to (11) an Enactment function involving an Actor, that is related to (12) a set of FSD's for heap dumps of the target JVM, that is related to (13) a Classification function, that is related to (14) a FeatureVector derived from the histogram of objects in the heap, that is related to (15) an Assessment function involving an Actor, that is related to (16) a Hypothesis FeatureVector representing the site of the code causing memory leak. The versions of the seasonal trend filter and filter parameters can be also directly or indirectly related. These relations can be time stamped with TransactionTime's when they become persistent or become recoverable and visible to other recoverable transactions and recalled later using bi-temporal ValidTime and TransactionTime queries. Based on these Reification relations, a user can determine, for any event manifested in the data, such as an information change that occurred in between two intervals, what the cause of that change was. The relation can show, for example, that Fact's during a particular interval were classified as a memory leak, and that a bug fix was issued as a Directive to repair the memory leak. In an embodiment, a user can instruct the system to show all Directive's that were issued, in order to make sense of why changes in the data occurred.

The framework disclosed tracks the ValidTime of each Information item and TransactionTime when the item becomes persistent or becomes recoverable and visible to other recoverable transactions. Both ValidTime and TransactionTime can allow the Directive's, and the reasons for them, to be well-documented. For each Directive, the Information upon which that Directive was based can be formally related to that Directive. As a result, a user can retroactively determine, for each Directive, the Information that was available as of the moment that the Directive was issued. Over time, new Information might become available, potentially as a result of previously issued Directive's and may be applied retroactively to the states as of a ValidTime in the past at different TransactionTime's when the Information becomes available (e.g. becomes recoverable and visible to other recoverable transactions). However, because Information changes occurring after the issuance of a Directive is clearly separated as non-causal to the Directive and is delineated using the TransactionTime of the changes though the changes may be applied retroactively as of the ValidTime attributes that are formally related to that Directive. Later-acquired Information that might have influenced the choice of Directive, if that Information had then been available, can be clearly identified as non-causal to the Directive and can be filtered from view using the TransactionTime, so that the user is not confused by Information that potentially should have caused a different Directive to be issued. At any moment in time, the system can inform the user why a particular Directive is issued, and the Information that was available at that Directive's ValidTime to support the choice of that particular Directive, by recalling the Information as of an earlier TransactionTime before any new Information is amended at later TransactionTime's. In certain embodiments, this bi-temporal provenance capability is used to meet certain regulatory requirements.

System Trending and Forecasting of Vital Signs

The framework discussed above can be used in a technique for determining trends and forecasting the future behavior of a computing system's "vital signs." Such vital signs can include, for example, the memory heap usage of a JAVA virtual machine (JVM) and the intensity of programmatic threads or stack segments. By determining the trends of these vital signs, a determination can be made of whether a computing system is likely to crash. Based on such trends, a forecast can be made regarding when the computing system is likely to crash. In response to such a forecast, a system administrator can schedule a system restart or maintenance prior to the predicted crash, so that the crash can be avoided.

The task of determining trends can be conceptualized as the classification of facts in order to produce information. The framework discussed above can systematically support such a classification function. In this particular domain, the facts can involve facts about how much memory the JVM uses at various points in time and/or the intensities with which various blocks of program code are executed. Classification can involve the application of an automated process that takes these facts and produces conclusive information such as that a memory leak apparently exists or that a particular block of program code is an excessive "hotspot."

Continuous monitoring of performance metrics for conformance to service level agreements (SLA) is one of the critical operational requirements for cloud service providers. It needs predictive diagnosis capability to detect impending SLA violations to enable the operations to circumvent most of the SLA violations and provide quicker resolution of the issues when violations occur to minimize the impact on the customer experience. The key to the efficacy of predictive diagnosis solutions lies in the representation of a relatively high-level state space model of the system, that is amenable to estimation and update of the states from low-level events and measurements, and that can effectively predict the trajectories of key performance indicators. The system state variables should include measurements of various system statistics that constitute the vital signs of the system functions. One can draw an analogy to the measurements of various physiological statistics such as heart rate, blood pressure, body temperature, and respiratory rate that represent the vital signs of basic body functions, which are characterized by normal and abnormal ranges of measurements depending on the age, activities, and environmental context of a patient.

A vital sign for the cloud services functions can be defined based on the measurements of intensity statistics for various classes of threads and stack segments from a series of thread dump samples taken at regular time intervals. The interpretation of this vital sign can be informed by an analytical model of thread or stack segment intensity statistics formulated in the mathematical frameworks of the Poisson Process and Queuing Theory. An intensity-driven classification technique can be applied to incrementally classify the threads and stack segments. A state model of a system can be represented in terms of the seasonal trends, linear trends, and first-order non-linear trends of the intensities of each class of threads and thread segments using the Holt-Winter exponential moving average filter. The state model characterizes the regular operating ranges of the system that form the baselines to detect measurement outliers. A cluster of outliers may represent a hypertension or hypotension state of the system that may be correlated with system faults and may be observable by customers as SLA violations. The model supports dynamic classification of thread segments and an ability to drill-down the classification hierarchy to observe the intensity of specific subclasses of thread segments, thereby improving the observability and sensitivity for small performance glitches which are leading indicators of SLA issues. The model also supports seasonally adjusted long term performance trend forecasts. Thread or stack segment intensity can be used as a vital sign of the system functions. The observability, sensitivity, and forecasting of a vital sign for system functions all enable an effective predictive diagnosis capability. Furthermore, the model supports dependency information between classes of threads to capture the inter-thread and inter-process communication between threads, providing observability to the traffic intensity of the queues in the communication channels or resource pools between threads.

A thread dump from a WebLogic server in the mid-tier of a Fusion Application in Oracle Public Cloud can exhibit patterns that are correlated with system faults in the mid-tier, operating system (OS), network, and databases. The WebLogic server can be instrumented to detect threads that are stuck for longer than a specified time, which is 10 minutes by default. An embodiment of the invention can employ the state model of seasonal and long-term trends of thread intensities that offers an adaptive method to detect threads that are stuck for longer than their expected response time. A large cluster of stuck threads indicates the hypertension state of the system due to congestions downstream towards the backend servers and databases. The model can also detect hypotension states of the system due to congestions upstream of the system that leaves many threads idle. A high intensity of idle threads is the converse of a high intensity of stuck threads.

Thread segments classification signatures can be learned from the thread dump archives collected from all customer pods across the cloud as well as the thread dump archives from stress test systems which can amplify the intensities of each class of threads. The thread classification signatures can be extracted by a MapReduce algorithm from a large amount of thread dumps stored in Hadoop Distributed File System (HDFS) clusters. These classification signatures can be bootstrapped onto the predictive diagnostic monitor in the production system.

Thread Intensity or Stack Segment Intensity

Thread or stack segment intensity provides a statistical measure of the "hotness" of a performance hotspot in the system functions. The hotness of a code block can be quantified by the number of invocations of the code block times the execution time of the code block. Tools can measure the invocation count and response time of low-level events, such as the execution of an instruction at an instruction pointer, a method, a system call, a synchronization wait, a hardware counter overflow, etc. One can instrument the application programs to collect the exact measurements of the events, but in such an approach, the instrumentation can affect the measurements. This problem can be more pronounced when the execution time of the instrumentation code around a method dominates the execution time of the method itself as the invocation count increases. Estimation of hotness measures by statistical sampling of events is more effective than exact measurements in this respect. The performance analysis tools provided by CPU vendors, including Oracle, Intel, and AMD, harness the hardware counters provided in the CPU's to sample the events. These tools offer time-based or event-based statistical sampling of the events. In time-based sampling, the tool records the event attributes such as the timestamp, instruction pointer, kernel microstate, thread id, process id, CPU core id, and call stack at each timer interrupt event. In event-based sampling, the tool records a similar set of event attributes at a hardware counter overflow event. Oracle, Intel, and AMD CPU's provide a set of hardware counters to sample the L1/L2 cache misses, branch mispredictions, floating point operations, etc. A histogram for the sample counts of instruction pointers in the program typically conveys a qualitative profile of hotspots in the program. GNU gprof samples the execution time of subroutines but uses code instrumentation to measure the call counts. The sampling error is usually more than one sampling period. If the expected execution time of a subroutine is n sampling periods, the expected error of the execution time estimate is square root of n sampling periods.

The hotspot profiles of different parts of the program can be presented in call graph, call tree, and call stack perspectives. In each perspective, the call count statistics can be combined with basic execution time statistics to attribute the execution times to the caller and called methods for roll-up and drill-down perspectives. A histogram for the sample counts of instruction pointers in the program typically conveys a qualitative profile of hotspots in the program.

The analytical model of thread or stack segment intensity statistics shows that the time-based and event-based sampling of the sites, either instruction pointers or stack traces, provides a counter which should not be interpreted as an approximation to the exact counting of the number of executions as measured by the instrumentation techniques. The counter value derived by statistical sampling is factoring in both the frequency of the execution of the site and the response time of the execution of the site. The exact counting of the number of executions of a site does not factor in the execution time. The execution time of an instruction at a given instruction pointer site depends on the number of CPU clock cycles needed by the instruction. The extra factor accounted by the statistical sampling technique is a significant factor in the observed discrepancy of the normalized root mean square error, sample coverage, and order deviation metrics between the exact execution count and statistical sampling of instruction pointer sites. The statistical sampling of sites can be treated as an intensity measure in an analytical model.

Extending these analysis techniques, embodiments of the invention can use the intensity statistics for automatic classification of call stacks and for a state space representation base lining the seasonal, linear, and first-order non-linear trends of the system vital signs. Embodiments of the invention can extend the call stack model of a single class of threads to capture the dependency between classes of threads for inter-thread and inter-process communication. This model can represent a chain of call stacks involved in client-server invocations via remote method invocation (RMI), Web Services, JAVA Database Connectivity (JDBC) connections, JAVA Naming and Directory Interface (JNDI) connections, etc. It can also represent the interaction of two or more call stacks threads to enter a critical section or to acquire a resource from a resource pool (such as a JDBC connection pool). The discrepancies between the intensity statistics of two interacting call stacks can reveal congestions in the communication channels or resource pools between them. Furthermore, the call stack dependency model enables the operators to correlate the incidence reports from multiple servers. An Execution Context ID (ECID) propagated along an invocation chain by a diagnosability framework can be used to correlate the exception traces across the middleware and database tiers to aid in root cause analysis of problems in individual execution contexts. For diagnosing systemic problems using a system vital sign, such as the thread or stack segment intensity statistics, the dependency information between classes of threads or stack segments can be used to correlate incidences across the middleware and database tiers to aid in root cause analysis.

To drill down the database tier threads, the system can collect statistics for high level Structured Query Language (SQL) statement execution status reports, such as SQL Automatic Workload Responsibility (AWR) reports, as well the low level thread dump of database server OS processes. Each thread class that is blocking for database operation via JDBC connections can be correlated with a SQL statement execution plan in the database server. The statistics such as the execution count and execution time of a SQL statement execution plan in the interval between two SQL AWR snapshots can be sampled periodically. The execution intensity of a SQL statement execution plan can be derived as a product of the execution count and the average execution time. From a high-intensity database operation thread in the mid-tier, an embodiment can drill down to a high-intensity SQL statement in the database tier to diagnose a problem. For example, a suboptimal execution plan can drill down to an improper database schema design or a lack of proper index for predicate evaluations. Thus, a thread dependency information model enables a monitor to correlate the intensity of mid-tier and database tier threads to provide a complete end-to-end picture.

Classification of Middleware and Database Services

Fusion Applications (FA) include Financial Management, Customer Relationship Management (CRM), Human Capital Management (HCM), Supply Chain Management (SCM), Project Portfolio Management (PPM), Procurement, and Governance Risk Compliance. Fusion Applications are organized in logical pillars that represent a subset of Fusion Applications; for example a tenant system can be comprised of three pillars, one pillar that includes Financial, SCM, PPM, and Procurement services, a second pillar that includes HCM services, and a third pillar that includes CRM services. The pillar structure enables granular maintenance, patch, and upgrade of a large system. The pillars may share the same FA database, but to enable granular maintenance, patch, and upgrade of applications and data schemas, each pillar should have a separate database with table replications between the databases. Oracle Data Integrator (ODI) can perform the data transformations between the databases for two or more pillars if they are using different versions of a table. An FA tenant pod in Oracle Public Cloud (OPC) is classified by the set of families of FA services that comprise the pillar; for example, the three FA pods in the earlier example will be classified, respectively, by (Financial, SCM, PPM, and Procurement Pillar), (HCM Pillar), and (CRM Pillar) classes.

Oracle Fusion Application architecture is defined on top of the Fusion Middleware architecture which supports load balancing and high availability of application services by organizing the applications into a logical topology of servers and domains that can be mapped to several possible Oracle Virtual Machine (OVM) topologies (by editing the assembly produced by Oracle Virtual Assembly Builder) or physical topologies distributed across multiple hosts. A server is an instance of WebLogic Server which runs the application services. A domain is a WebLogic Server Domain which contains one or more instances of WebLogic Servers. A family of FA services such as {General Ledger, Receivables, Payables} for Financial Management can be organized in a set of Servers in the Financial Domain. An FA service is classified along the Domain×Server dimensions, for example (Financial Domain, Admin Server), (Financial Domain, General Ledger Server), (Financial Domain, Receivables Server), (Financial Domain, Payables Server), (CRM Domain, Admin Server), (CRM Domain, Customer Server), (CRM Domain, Sales Server), (CRM Domain, Order Capture Server), etc. Each class of FA service can be deployed in a cluster for load balancing and high availability.

The domain and server cluster structure can be mapped to an appropriate OVM topology in a pod. For example, the Admin services across all domains in a Fusion Application pod, including (CRM Domain, Admin Server), (SCM Domain, Admin Server), (HCM Domain, Admin Server), (Financial Domain, Admin Server), etc., can be mapped to the same admin OVM. For a CRM tenant, the two classes of services (CRM Domain, Customer Server) and (CRM Domain, Sales Server), which demands more CPU and memory resources than other services, can be mapped in a cluster to a pair of primary OVM's while the supporting services among (CRM Domain, . . . ), (SCM Domain, . . . ), (HCM Domain, . . . ), (Financial Domain, . . . ), (Procurement Domain, . . . ), and (Projects Domain, . . . ) classes can be consolidated in a cluster in another pair of secondary OVM's. Some Fusion Middleware services, such as ODI Server (Oracle Data Integrator), SOA Server (Fusion Middleware SOA), and ESS Server (Enterprise Scheduler Service), can be duplicated in each domain to partition the work load.

A Fusion Application pod includes three logical database services, namely OAM DB (for Oracle Access Manager), OIM-APM DB (for Oracle Identity Management and Authorization Policy Manager), and Fusion DB (for application schemas), that can be mapped to several different topologies of RAC database servers. OAM repository contains policies for authentication, Single-Sign-On (SSO), and identity assertion; OIM repository contains user profiles and groups memberships; APM repository contains RBAC authorization policies. Fusion DB contains various repositories for FA, MDS, SOA, BI, UCM, and WebCenter. Oracle Access Manager (OAM) and Authorization Policy Manager (APM) use the WebLogic Security Services Provider Interface to provide services for Java Authorization and Authentication Services (JAAS) and Java Authorization Contract for Containers (JACC). OAM WebGate, AccessGate, and Web Services Manager (OWSM) components in the WebLogic server access the authentication policies in OAM repository. Oracle Platform Security Services (OPSS) framework in WebLogic server accesses the user's group membership information in OIM repository and uses this information to access the RBAC authorization policies in APM repository.

Data access operations in FA servers can be identified by the database services (Database, OAM DB), (Database, OIM-APM DB), and (Database, Fusion DB) that they depend on. The following database dependency information can be incorporated in the model:

OAM connections in the FA servers depend on Access Server and OAM DB,
 JNDI connections in the FA servers depend on Oracle Internet Directory server and OIM-APM DB,
 JDBC connections from the OPSS framework in the FA servers depend on OIM-APM DB,
 JDBC connections from ADF Business Components (ADF-BC) and Metadata Services (MDS) in the FA servers depend on Fusion DB,
 JDBC connections from BPM, WebCenter, UCM, and BI in the SOA and BI servers depend on Fusion DB.

Classification of SQL Statements

A cloud customer's (tenant's) FA services can be distributed across multiple pillars/pods, domains, and clusters of servers. The distributed servers effectively partition the database connections into JDBC connection pools. Depending on the quality of service (QoS) requirements, the system can allocate a different number of JDBC connections to each pool. For example, the connection pools in Sales Server, Order Capture Server, Marketing Server, Analytic Server, etc., can be allocated with different numbers of JDBC connections to control QoS. The sizing of the connection pools can be guided by the seasonal intensity trends and impedance matching of mid-tier database operation thread classes performing database operation, waiting for a connection in JDBC connection pool, and active SQL statement classes. Partitioning of the database connections by mid-tier connection pools aids in the classification of the SQL statements and enables isolation of problems. It can prevent a poorly tuned SQL statement in a low priority application from blocking the highly performant SQL statements for high-intensity mid-tier threads.

Classification of Threads and Thread Dependency Relations by Stack Traces

The stack trace for a stuck thread can reveal the operation blocking the thread. For example, by the stack frame "oracle jdbc driver OracleStatement doExecuteWithTimeout" near the beginning of the following stack trace, the inference can be drawn that the thread is blocking for a database operation:

oracle.jdbc.driver.T4CCallableStatementexecuteForRows (T4CCallableStatement.java:991)
 oracle.jdbc.driver.OracleStatement.doExecuteWithTimeout(OracleStatement.java:1285)
 ...
 oracle.mds.core.MetadataObject.getBaseMO(MetadataObject.java:1048)
 oracle.mds.core.MDSSession.getBaseMO(MDSSession.java:2769)
 oracle.mds.core.MDSSession.getMetadataObject(MDSSession.java:1188)
 ...
 oracle.adf.model.servlet.ADFBindingFilter.doFilter(ADFBindingFilter.java:150)
 ...
 oracle.apps.setup.taskListManager.ui.customization.CustomizationFilter.doFilter(CustomizationFilter.java:46)
 ...
 weblogic.servlet.internal.WebAppServletContext.secureDExecute(WebAppServletContext.java:2209)
 weblogic.servlet.internal.ServletRequestImpl.run(ServletRequestImpl.java:1457)
 ...
 weblogic.work.ExecuteThread.execute(ExecuteThread.java:250)
 weblogic.work.ExecuteThread.run(ExecuteThread.java:213)

In the above stack trace, the stack frame "oracle mds core MetadataObject getBaseMO" below the JDBC driver stack indicates that the MDS library issues the JDBC operation. The stack frame "oracle adf model servlet ADFBindingFilter doFilter" below the MDS library stack indicates that MDS is invoked by an ADF Application, which is invoked through a Hypertext Transfer Protocol (HTTP) Servlet request. Since this thread is observed in the Customer Server Weblogic instance in the CRM Domain, the stuck thread can be classified as (CRM Domain, Customer Server, HTTP Servlet, ADF Application, ADF-MDS, DATABASE Operation). This thread depends on a database server thread classified by (DATABASE, Fusion DB).

The following is a stack trace for another stuck thread:

com.sun.jndi.ldap.LdapCtx.connect(LdapCtx.java:2640)
 com.sun.jndi.ldap.LdapCtxFactory.getInitialContext(LdapCtxFactory.java:48)
 javax.naming.spi.NamingManager.getInitialContext(NamingManager.java:637)
 javax.naming.InitialContext.init(InitialContext.java:219)
 ...
 atoracle.adf.controller.internal.security.AuthorizationEnforcer.checkPermission (AuthorizationEnforcer.java:114)
 ...
 oracle.adf.model.servlet.ADFBindingFilter.doFilter(ADFBindingFilter.java:150)
 ...
 oracle.apps.setup.taskListManager.ui.customization.CustomizationFilter.doFilter(CustomizationFilter.java:46)
 ...
 weblogic.servlet.internal.WebAppServletContext.secureDExecute(WebAppServletContext.java:2209)
 weblogic.servlet.internal.ServletRequestImpl.run(ServletRequestImpl.java:1457)
 ...
 weblogic.work.ExecuteThread.execute(ExecuteThread.java:250)
 weblogic.work.ExecuteThread.run(ExecuteThread.java:213)

This stuck thread is blocked by a Lightweight Directory Access Protocol (LDAP) connection. The stack frame "oracle adf internal controller state ControllerState checkPermission" below the JNDI stack indicates that the ADF Controller is using the LDAP connection, probably to load permission objects from the LDAP server for authorization check. The second thread has the same stack trace below the stack frame "oracle adf model servlet ADFBindingFilter doFilter" as the first thread. It therefore shares a common classification (HTTP Servlet, ADF Application) with the first thread. If the second thread is also observed in Customer Server Weblogic instance in the CRM Domain, it will be classified as (CRM Domain, Customer Server, HTTP Servlet, ADF Application, ADF-SECURITY, LDAP Operation). The second thread depends on an OID thread classified by (OID), which in turn depends on the database server thread classified by (DATABASE, OIM-APM DB).

The threads classification information model captures the dependencies of one class of threads on another. For example, the following dependencies are defined for the super classes of threads to generalize the dependencies of the subclasses:

(ADF Web Service Invocation)→(ADF Web Service, ADF-BC)

(ADF-BC, DATABASE Operation)→(DATABASE, Fusion DB)

(ADF-MDS, DATABASE Operation)→(DATABASE, Fusion DB)

(ADF-SECURITY, DATABASE Operation)→(DATABASE, OIM-APM DB)

(ADF-SECURITY, LDAP Operation)→(OID)→(DATABASE, OIM-APM DB)

(SOA-BPEL, DATABASE Operation)→(DATABASE, Fusion DB)

(ESS, DATABASE Operation)→(DATABASE, Fusion DB)

The dependency relation (ADF Web Service Invocation)→(ADF Web Service, ADF-BC) is a generalization that includes many subclasses of dependency relations among the ADF services. One of the subclasses of this dependency relation is (CRM Domain, Sales Server, ADF-Application, ADF Web Service Invocation)→(CRM Domain, Order Capture Server, ADF Web Service, ADF-BC, DATABASE Operation). The thread segments on both client side and server side of the relation can be drilled down. For instance, the client side of the dependency relation (ADF-BC, DATABASE Operation)→(DATABASE, Fusion DB) can be drilled down to a high-intensity relation (CRM Domain, Order Capture Server, ADF Web Service, ADF-BC, DATABASE Operation)→(DATABASE, Fusion DB). Similarly on the server side, the call graph, call tree, or call stack model (including the SQL execution plan and execution traces) in the database can be drilled down to a high-intensity subclass of the (DATABASE, Fusion DB) thread.

Subsumption Hierarchy

The subsumption hierarchy of the classification scheme is induced by tuple projection. For example, given that the tuple (Customer Server, ADF Application) is a projection of the tuple (CRM Domain, Customer Server, HTTP Servlet, ADF Application) the classification (CRM Domain, Customer Server, HTTP Servlet, ADF Application) is subsumed under the classification (Customer Server, ADF Application). Since the classifications (CRM Domain, Customer Server, HTTP Servlet, ADF Application, ADF-MDS, DATABASE Operation) and (CRM Domain, Customer Server, HTTP Servlet, ADF Application, ADF-SECURITY, LDAP Operation) are subsumed under the classification (CRM Domain, Customer Server, HTTP Servlet, ADF Application) both of the sample threads above are subsumed under any projection of (CRM Domain, Customer Server, HTTP Servlet, ADF Application). Hence the statistics of the two sample threads are aggregated in the statistics of (CRM Domain, Customer Server, HTTP Servlet, ADF Application) and its super classes.

The ADF application can be invoked through Outlook Connector and Web Service in addition to HTTP Servlet. Additional classifications can be defined in (Channel×Application) dimensions:

(HTTP Servlet, ADF Application)
(Outlook Connector, ADF Application)
(Web Service, ADF Application)

ADF Applications are deployed in different servers in different domains. One can classify them by taking cross products (Domain×Server×Channel×Application). For example, the classification (CRM Domain, Customer Server, HTTP Servlet, ADF Application) (CRM Domain, Customer Server, Outlook Connector, ADF Application), and (CRM Domain, Customer Server, Web Service, ADF Application) have the least common super class (CRM Domain, Customer Server, ADF Application).

The Operation dimension includes the classifications Database Operation, LDAP Operation, Web Service Invocation, to name a few. The data access Library is another dimension that includes the classifications ADF-MDS, ADF-SECURITY, ADF-BC, AQ-JMS, to name a few. The class hierarchy can be drilled down by taking the cross product (Domain×Server×Channel×Application×Library×Operation).

A tuple can be treated as a state of a thread with valid state transitions from reverse(cdr(reverse(tuple)))) to (tuple) in LISP expressions. In this case, car(reverse(tuple)) gives the stack frames on top of the stack trace. For example the thread in the state (HTTP Servlet, ADF Application) can transition to the state (HTTP Servlet, ADF Application, ADF-BC) when ADF Application invokes ADF-BC.

Disclosed herein is an intensity-driven classification technique that tracks the intensity of each stack frame over time and demarcates the stack segments in the stack traces by an equivalence relation among the stack frames induced by the intensities of the stack frames. It gives the same classification to the stack frames that occur in the same stack segment with the same intensity. This classification technique continually splits the stack segments into smaller stack segments as the intensities of the individual stack frames in the segments diverge over time. Each time a stack segment is split into constituent segments, the technique creates a new classification for each of the constituent segments. For example, the technique may start with a classification (ADF Application Business Component) for a stack segment that may be split into (ADF Application) and (ADF-BC) when the intensity of (ADF-BC) segment diverges from the intensity of (ADF Application) segment. The classification (ADF Application Business Component) is an alias of (ADF Application, ADF-BC) which is subsumed under the new classifications (ADF Application) and (ADF-BC).

The technique generates a globally unique identifier (GUID) each time a new classification is created to classify a stack segment. When a stack segment is split into constituent segments each of which is assigned a new classification, the algorithm may derive the identifiers of the new classifications from the identifier of the classification of the coalescing segment. For example, the identifier of the coalescing segment might be 546372819. If this segment is split into 2 constituent segments, the technique can assign identifiers 546372819-1 and 546372819-2 to the constituent segments. If the segment 546372819-1 is split up again to 2 constituent segments, the technique can assign identifiers 546372819-1-1 and 546372819-1-2 to the constituent segments.

Tacit knowledge can be applied to assign meaningful names such as (ADF-BC), (ADF-MDS), or (ADF-VIEW) to the classifications. Tacit knowledge can also assign the dimensions, such as Channel, Application, or Operation to organize the classifications. A knowledge base of classifications and dimensions can be provided to bootstrap the automatic classification technique. If the knowledge base specifies a name, for example (ADF-VIEW), for the classification of a stack segment that is subsequently split into constituent segments, the technique can derive the classification names such as (ADF-VIEW-1), (ADF-VIEW-2), (ADF-VIEW-1-1), etc., for the constituent segments from the name (ADF-VIEW) of the coalescing segment.

Tacit knowledge can assist in creating and maintaining a knowledge base of thread dependency relations, which are used to correlate incidences across services and servers under a problem to assist in root cause analysis. The thread dependency relations, such as [(ADF Web Service Invocation, HTTP-Client)→(ADF Web Service, ADF-BC)] and [(ADF-BC, DATABASE Operation)→(Database, Fusion DB)], are defined in terms of the stack segment names assigned by tacit knowledge.

Roll-Up and Drill-Down of Thread or Stack Segment Intensity Statistics

This classification scheme supplies many dimensions for roll-up and drill-down statistical analysis. One interesting statistics is the intensity of a class of threads or stack segments. Assuming a Poisson distribution for arrivals, the expected intensity $\rho$ (the expected number of arrivals during a time interval corresponding to the expected response time $\tau$) is related to the expected response time $\tau$ and the arrival rate $\lambda$ by Little's formula:

$$\rho = \lambda \tau$$

The average intensity of a class of threads or stack segments can be measured from a series of thread dump samples taken regularly, for example every 1 minute. Given a constant arrival rate $\lambda$, the average intensity of the threads or stack segments $\rho$ is proportional to the average response time $\tau$ of the threads or stack segments. The arrival rate can be assumed not to change during a short time interval—e.g., a 15 minutes time interval for a seasonal index. Holt-Winter forecasting and seasonal trending filter can track the seasonal factor for each seasonal index over many seasonal cycles. If the intensity of a sample, adjusted by a seasonal factor for a seasonal index, spikes above the average intensity then it indicates that the threads are stuck longer than the average response time. An outlier filter can detect this as an anomaly.

The intensity of a class of threads or stack segments (invoking a certain operation) in each thread dump can be a measure of the number of arrivals of the operation within the expected length of sample time window. Intensity provides an indirect measurement of the expected length of the sample time windows.

The thread or stack segment intensity statistics implies that the system will tend to see the stack traces for threads or stack segments that have a combination of high arrival rate and long response time. Threads or stack segments with intensities smaller than 1 (fractional values such as 0.05) can be detected by counting the occurrences of the corresponding stack traces over a sufficient number of thread dumps. For example, a class of threads or stack segments with arrival rate of 0.5 per second and expected response time of 0.1 second will have expected thread or stack segment intensity of 0.05 per thread dump. An intensity of 0.05 per thread dump means that on average one occurrence of the stack trace for this class of threads or stack segments should be detectable in 20 thread dumps. If each thread dump represents a sample time window of expected length $\tau=0.1$ second, then 20 thread dumps add up to a sample time window of expected length $20 \cdot \tau = 2$ seconds. Thus the expected number of occurrences of this class of threads or stack segments in a 2 seconds window is given by $20 \cdot \gamma \cdot \tau = 1$.

For Poisson processes, the above reasoning is valid as long as the sample time windows are non-overlapping. To ensure that the sample time windows are non-overlapping, the sampling interval must be significantly greater than the expected response time $\tau$ of a given class of threads. Disclosed herein is an anti-aliasing method, which detects the stuck threads that are already counted in the previous sample time windows, to ensure that the system counts only those threads that arrive within the current sample time window. This keeps the sample time windows non-overlapping. If the thread is not stuck, it is still possible for a lingering thread to appear as different subclasses in consecutive thread dumps. For example, an ADF Application thread may be counted multiple times as (ADF Application, ADF-MDS) in one thread dump and (ADF Application, ADF-BC) in another thread dump. Embodiments of the invention avoid counting the lingering threads more than once to ensure that the sample time windows are independent. The lingering threads can be detected for anti-aliasing if the applications among the root classes, such as the servlet filter that sets up the execution context of the thread, append an epoch counter in the thread names. The epoch counter can be correlated to the ECID of the execution context of the thread.

Nesting Thread or Stack Segment Intensity Statistics

Nested subclasses can be represented as states in a state machine. For example, example class (ADF Application) can contain example subclass (ADF Application, ADF-BC), which can contain example subclass (ADF Application, ADF-BC, Database Operation). Each of these three nested subclasses can be represented as a state in a state machine.

Threads in each of the subclasses can have various intensities. For purposes of the discussion below, $\rho(ADF)$ denotes the intensity of (ADF Application) threads, $\rho(ADF-BC)$ denotes the intensity of (ADF Application, ADF-BC) threads, and $\rho(ADF-BC-JDBC)$ denotes the intensity of (ADF Application, ADF-BC, Database Operation) threads. The intensity of the (ADF Application, ADF-BC, Database Operation) threads are included in the intensity of the (ADF Application, ADF-BC) threads, which is in turn included in the intensity of the (ADF Application) threads.

The intensity of the (ADF Application, ADF-BC, Database Operation) threads represents the number of arrivals of the Database Operations within the interval $\tau(ADF-BC-JDBC)$. These arrivals of Database Operation are observable as JDBC stack frames in the thread dumps taken before their departures. The arrival and departure of a Database Operation can be represented as state transitions to "Begin Database Operation" and "End Database Operation" states in the state machine. The intensity, i.e. expected number of arrivals, depends on the density of the arrival points and the expected length of time interval between "Begin Database Operation" and "End Database Operation" states. The intensity of Database Operation will spike if the density of arrival points $\lambda$ and/or the expected response time $\tau(ADF-BC-JDBC)$ of the Database Operation spike. Assuming that the density of arrival points $\lambda$ is constant within a seasonal index, a spike in intensity can be attributed to the Database Operations getting stuck longer than expected. The intensities of the three nested classes of threads can be rolled up along the chain:

$$\rho(ADF-BC-JDBC) \sqsubset \rho(ADF-BC) \sqsubset \rho(ADF).$$

Splitting Thread or Stack Segment Intensity Statistics

A fraction of the threads invoking the ADF-BC library might need to perform data access using JDBC while the rest of the threads may access the data in the cache. The state transition diagram for this scenario can be represented by the splitting of a Poisson process into two Poisson sub-processes. If $\lambda$(ADF-BC) denotes the arrival density of the ADF-BC thread, $\lambda$(ADF-BC-JDBC) denotes the density of the ADF-BC-JDBC thread, and $\lambda$(ADF-BC-cache) denotes the density of the ADF-BC threads that skip the JDBC operation, then the sum of two Poisson processes ADF-BC-JDBC and ADF-BC-cache is a Poisson process ADF-BC with density and intensity given by $\lambda$(ADF-BC)=$\lambda$(ADF-BC-JDBC)+$\lambda$(ADF-BC-cache)
$\rho$(ADF-BC)=$\rho$(ADF-BC-JDBC)+$\rho$(ADF-BC-cache)

If p denotes the percentage of $\lambda$(ADF-BC) that invokes the JDBC operation, then $\lambda$(ADF-BC-JDBC)=p·$\lambda$(ADF-BC)
$\lambda$(ADF-BC-cache)=(1−p)·$\lambda$(ADF-BC)

If the corresponding expected response times are denoted by $\tau$(ADF-BC), $\tau$(ADF-BC-JDBC), and $\tau$(ADF-BC-cache), then $\rho$(ADF-BC)=$\rho$(ADF-BC-JDBC)+$\rho$(ADF-BC-cache)
$\rho$(ADF-BC)=$\lambda$(ADF-BC-JDBC)·$\tau$(ADF-BC-JDBC)+$\lambda$(ADF-BC-cache)·$\tau$(ADF-BC-cache)
$\lambda$(ADF-BC)·$\tau$(ADF-BC)=p·$\lambda$(ADF-BC)·$\tau$(ADF-BC-JDBC)+(1−p)·$\lambda$(ADF-BC)·$\tau$(ADF-BC-cache)
$\tau$(ADF-BC)=p·$\tau$(ADF-BC-JDBC)+(1−p)·$\tau$(ADF-BC-cache)

The intensities of the nested classes of threads can be rolled up along directed chains:

$\rho$(ADF-BC-JDBC)$\sqsubset$ $\rho$(ADF-BC)$\sqsubset$ $\rho$(ADF)
$\rho$(ADF-BC-cache)$\sqsubset$ $\rho$(ADF-BC)$\sqsubset$ $\rho$(ADF).

Merging Thread or Stack Segment Intensity Statistics

Two example classes (Customer Server, HTTP Servlet, ADF Application) and (Customer Server, Outlook Connector, ADF Application) of threads can be merged under an example super-class (Customer Server, ADF Application). The intensity statistics of ADF Application includes requests through HTTP Servlet and Outlook Connector. It may be assumed that the response time of the ADF Application is the same for HTTP Servlet and Outlook Connector channels.

$\tau$(ADF)=$\tau$(HTTP-ADF)=$\tau$(Outlook-ADF)

The arrival rate of the merged process is $\lambda$(ADF)=$\lambda$(HTTP-ADF)+$\lambda$(Outlook-ADF)

The intensity of the merged process is $$\rho(ADF) = \lambda(ADF) \cdot \tau(ADF)$$
$$= (\lambda(HTTP-ADF) + \lambda(Outlook-ADF)) \cdot \tau(ADF)$$
$$= \lambda(HTTP-ADF) \cdot \tau(HTTP-ADF) + \lambda(Outlook-ADF) \cdot \tau(Outlook-ADF)$$
$$= \rho(HTTP-ADF) + \rho(Outlook-ADF)$$

Segmenting Thread or Stack Segment Intensity Statistics

The example class (ADF Application) of threads can include three example subclasses of threads (ADF Application, ADF-BC), (ADF Application, ADF-MDS), and (ADF Application, ADF-SECURITY). These three subclasses of threads represent a sequence of invocations of component states by the composite state. The corresponding thread intensities can be denoted in the following manner. $\rho$(ADF-BC) denotes the intensity of (ADF Application, ADF-BC) threads; $\rho$(ADF-MDS) denotes the intensity of (ADF Application, ADF-MDS) threads; $\rho$(ADF-SECURITY) denotes the intensity of (ADF Application, ADF-SECURITY) threads.

The expected response time of ADF Application can be segmented into the response times of ADF-BC, ADF-MDS, and ADF-SECURITY invocations:

$\tau$(ADF)≈$\tau$(ADF-BC)+$\tau$(ADF-MDS)+$\tau$(ADF-SECURITY)

The thread or stack segment intensity of the ADF Application can be segmented by the component response times:

$$\rho(ADF) \approx \lambda(ADF) \cdot \tau(ADF)$$
$$\approx \lambda(ADF) \cdot \begin{pmatrix} \tau(ADF-BC) + \tau(ADF-MDS) + \\ \tau(ADF-SECURITY) \end{pmatrix}$$

Since the arrival density $\lambda$(ADF) is the same for all 3 subclasses, the intensity of the super class threads or stack segments is composed of the intensity of 3 subclasses of threads or stack segments:

$\rho$(ADF)≈$\lambda$(ADF-BC)·$\tau$(ADF-BC)+$\lambda$(ADF-MDS)·$\tau$(ADF-MDS)+$\lambda$(ADF-SECURITY)·$\tau$(ADF-SECURITY)
≈$\rho$(ADF-BC)+$\rho$(ADF-MDS)+$\rho$(ADF-SECURITY)

Hence, the expected intensity of the composite state can be proportionally attributed to the expected intensity of the component states.

Multiplying Arrival Rate in Thread or Stack Segment Intensity Statistics

Supposing that ADF-JAAS denotes the access control check that may be invoked multiple times from any stack frame in ADF-BC, ADF-MDS, and ADF-SECURITY states, the projection (ADF Application, ADF-JAAS) represents the state of a thread performing access control check. It merges the intensity statistics of the following three subclasses (ADF Application, ADF-BC, ADF-JAAS), (ADF Application, ADF-MDS, ADF-JAAS), and (ADF Application, ADF-SECURITY, ADF-JAAS).

Depending on the expected number of times each ADF Application thread may invoke an access control check, the arrival rate $\lambda$(ADF-JAAS) of the state (ADF Application, ADF-JAAS) can be a multiple of the arrival rate $\lambda$(ADF) for ADF Application. In the following equations, $\omega$ denote the multiplicative factor:

$\lambda$(ADF-JAAS)=$\omega$·$\lambda$(ADF)

The arrival process of ADF thread samples is a Poisson arrival process. The arrival process of ADF-JAAS thread samples is not a Poisson arrival process because multiple arrivals of ADF-JAAS thread samples can be dependent on arrival of one ADF thread sample. However, we can still apply Little's formula $\rho$=$\lambda$·$\tau$, which holds for any mean-ergodic arrival process. We maintain that the arrival process of ADF-JAAS thread samples is mean-ergodic since the arrivals of any two ADF-JARS thread samples are independent if the interval between their arrival times is sufficiently large. The intensity of the thread or stack segment (ADF Application, ADF-JAAS) is, therefore, given by:

$$\rho(ADF-JAAS) = \lambda(ADS-JAAS) \cdot \tau(ADF-JAAS)$$
$$= \omega \cdot \lambda(ADF) \cdot \tau(ADF-JAAS)$$

If $\lambda$(ADF)=$\rho$(ADF)/$\tau$(ADF) is substituted, then the following equation is produced:

$\rho$(ADF-JAAS)=$\omega$·[$\tau$(ADF-JAAS)/$\tau$(ADF)]·$\rho$(ADF)

The intensity of the thread or stack segment (ADF Application, ADF-JAAS) is a factor $\omega\cdot\tau(\text{ADF-JAAS})/\tau(\text{ADF})$ of the intensity of the thread or stack segment (ADF Application). For example, if each request to ADF Application performs 5 access control checks, i.e. $\omega=5$, and the expected response time of ADF-JAAS constitutes 10 percent of the expected response time of ADF Application, i.e. $\tau(\text{ADF}) = 10\cdot\tau(\text{ADF-JAAS})$, then the average intensity of ADF-JAAS thread or stack segment will constitute 50 percent of the intensity of the ADF Application threads or stack segments. It can be expected that $\rho(\text{ADF-JAAS}) \sqsubset \rho(\text{ADF})$ Hence, $\omega\cdot\tau(\text{ADF-JAAS})/\tau(\text{ADF}) < 1$ Impedance Matching by Thread or Stack Segment Intensity Statistics An example may be considered in which there are communication channels between a two-node CRM Domain Sales Server cluster and a two-node CRM Domain Order Capture Server cluster. These channels can support the client-server dependency relation between a class of threads in Sales service and a class of threads in Order Capture service:

(CRM Domain, Sales Server, ADF Application, ADF Web Service Invocation)→(CRM Domain, Order Capture Server, ADF Web Service, ADF-BC)

The corresponding thread intensities can be denoted as follows: $\rho(\text{ADF-HTTPClient})$ denotes the intensity of (CRM Domain, Sales Server, ADF Application, ADF Web Service Invocation) threads in a Sales server cluster; $\rho(\text{ADF-HTTPClient}(i))$ denotes the intensity of (CRM Domain, Order Capture Server, ADF Web Service, ADF-BC) threads in Sales server node i; $\rho(\text{WebService-ADF-BC})$ denotes the intensity of (CRM Domain, Order Capture Server, ADF Web Service, ADF-BC) threads in an Order Capture server cluster; $\rho(\text{WebService-ADF-BC}(i))$ denotes the intensity of (CRM Domain, Order Capture Server, ADF Web Service, ADF-BC) threads in Order Capture server node i.

Given that there are n and m number of nodes, respectively, in the Sales Server and Order Capture Server clusters:

$$\rho(ADF-HTTPClient) = \sum_{i=1}^{n} \rho(ADF-HTTPClient(i))$$

$$\rho(WebService-ADF-BC) = \sum_{i=1}^{m} \rho(WebService-ADF-BC(i))$$

If the communication channels between the Sales Server and Order Capture Server do not introduce any impedance mismatch to the Web Service invocation from Sales service to Order Capture service, then:

$\rho(\text{ADF-HTTPClient}) = \rho(\text{WebService-ADF-BC})$

If a discrepancy of the intensities of client and server threads is observed, it can be attributed to the congestion in the communication channels. If $\rho(\text{channel})$ denotes the traffic intensity in the communication channels between the client and server threads, then:

$\rho(\text{ADF-HTTPClient}) = \rho(\text{WebService-ADF-BC}) + \rho(\text{channel})$ When the arrival and departure rates are at equilibrium:

$\lambda(\text{ADF-HTTPClient}) = \lambda(\text{WebService-ADF-BC}) = \lambda(\text{channel})$ and $\tau(\text{ADF-HTTPClient}) = \tau(\text{WebService-ADF-BC}) + \tau(\text{channel})$.

The capacity of the communication channels can be increased to reduce the impedance mismatch between the client service and server service that contributes latency $\tau(\text{channel})$ to the response time $\tau(\text{ADF-HTTPClient})$ of the client.

Saturation of Intensity

The thread or stack segment intensity is a measure of the expected number of stack traces of a class of threads or stack segments in a thread dump. The thread intensity will increase with the increase in arrival rate and expected response time of the given class of threads or stack segments.

Some systems impose a limit on the maximum number of threads available to run a given class of threads. When this limit is reached, the thread or stack segment intensity becomes saturated (maxed out) and the statistics will no longer reflect the relation $\rho=\lambda\cdot\tau$ even though the arrival rate or response time may continue to increase. Embodiments of the invention are able to recognize when the saturation points are reached. Embodiments of the invention include the Holt-Winter triple exponential moving average filter that extrapolates the growth trend of the intensity. These embodiments can recognize the saturation points when they detect a series of outliers when the intensity levels off at a maximum and stops following the projected growth trends.

If the system does not impose a limit on the maximum intensity, it is possible for the thread or stack segment intensity to grow out of bound and cause out of memory errors in the system. This condition can be predicted by Holt-Winter triple exponential moving average filter as an endpoint.

Anti-Aliasing

The Poisson counting process requires that the sample windows are non-overlapping and independent. This requires that stuck threads and lingering threads are not counted more than once. The system uses the ThreadInfo.getThreadId( ) and ThreadMXBean.getThreadCpuTime (long id) in java.lang.management API to monitor the central processing unit (CPU) time of each thread. The technique infers that the thread is stuck if the CPU time of the thread does not change since the previous thread dump. The technique also tracks the number of consecutive thread dumps in which this thread is detected as stuck. These variables can be maintained in a ThreadAntiAliasingInfo data structure.

If the thread is lingering but not stuck, the CPU time will change. To detect lingering threads, the anti-aliasing technique cooperates with the classes such as the servlet filters among the root frames of the stack trace to append the epoch counter to the name of the thread using the java.lang.Thread setName application programming interface (API). If the thread name is the same as the previous thread name recorded in the ThreadAntiAliasingInfo, the technique infers that the thread has already been counted. The epoch information in the thread name provides an anti-aliasing solution when the same thread in a thread pool is observed as an alias when it is reused for a new epoch.

If stuck or lingering threads are consistently detected for a certain class of threads, the technique can adapt the sampling interval (by using every Nth thread dump) until the expected length of sample time windows for this class of threads is less than N*M minutes, where M is the sampling time interval.

Hypertension and Hypotension States

A JVM can be instrumented to detect stuck threads that may represent a hypertension state of the system. Hypertension states can be diagnosed as congestions in the downstream paths towards the database or backend servers. However, embodiments of the invention can also detect the hypotension states (dehydration) when the requests are not getting through to the server due to congestions in the upstream path. The latter condition cannot be detected by the regular JVM instrumentation for stuck thread detection. The outlier detection using thread or stack segment intensity can detect both hypertension and hypotension states symmetrically.

If the maximum number of threads is N and the expected thread or stack segment intensity is $\rho$, then the probability of saturation is given by the Poisson distribution:

$$P\{k \geq N\} = 1 - \sum_{k=0}^{N-1} e^{-\rho} \frac{\rho^k}{k!}$$

If the expected thread or stack segment intensity is 5 and the maximum number of threads or stack segments is 10, the probability of saturating the thread or stack segment intensity is 0.032, which means that 3.2% of the thread dumps will show intensity saturated at 10. Supposing the expected thread or stack segment intensity is 50 and the maximum number of threads or stack segments is 100, the probability of saturating the thread or stack segment intensity at 100 is 3.2E-10. With this probability the normal cause of saturation is unlikely and the thread or stack segment intensity saturation must be due to abnormal causes such as severe congestions downstream to the server. It is equally unlike, with probability of 5.0E-10, for thread or stack segment intensities to drop below 14 unless the server is severely dehydrated due to congestions upstream to the server.

Intensity-Driven Classification of Stack Frames

Generally, after the thread dumps are sampled a sufficient number of times over some period, the detection of stack traces of low intensity threads or stack segments can be expected. Sometimes the stack frames whose intensities are too low to be detected even after long periods of thread dumps can be detected due to system glitches or regression of software upgrades. Nevertheless, there can be very rare stack frames that remain undetected and unclassified. Embodiments of the invention can continuingly classify new traces of stack frames when they are detected after a sufficient number of thread dumps or after system glitches that cause their intensities to spike. Disclosed herein is a classification scheme which is driven by the intensity measures of the stack frames.

The system tracks the intensity of each individual stack frame as well as the predecessor and successor stack frames that appear adjacent to the stack frame in the stack traces. The system assigns the same classification to adjacent stack frames that appear with the same intensity—i.e., the stack frames that always appear together as an ordered array in the stack traces. For example, the scheme will assign the (JDBC-Execute) class to the following stack frames that always appear together as an ordered array with the same intensity:

oracle.jdbc.driver.T4CCallableStatement.executeFor Rows(T4CCallableStatement.java:991)
    oracle.jdbc.driver.OracleStatement.doExecuteWithTimeout(OracleStatement.java:1285)
    oracle.jdbc.driver.OraclePreparedStatement.executeInternal(OraclePreparedStatement.java:3449)
    oracle.jdbc.driver.OraclePreparedStatement.execute(OraclePreparedStatement.java:3550)
    oracle.jdbc.driver.OracleCallableStatement.execute(OracleCallableStatement.java:4693)
    oracle.jdbc.driver.OraclePreparedStatementWrapper.execute(OraclePreparedStatementWrapper.java:1086)

As discussed above, the intensity $\rho(ADF)$ of the ADF Application can be approximated by segmenting it into 3 components $\rho(ADF-BC)$, $\rho(ADF-MDS)$, and $\rho(ADF-SECURITY)$:

$\rho(ADF) \approx \rho(ADF-BC) + \rho(ADF-MDS) + \rho(ADF-SECURITY)$

To improve the model, the intensity of miscellaneous ADF application states that are disjoint from ADF-BC, ADF-MDS, and ADF-SECURITY states can be rolled up under (ADF Application, ADF-misc) class. The last state's intensity, $\rho(ADF-misc)$, may be negligible compared to the intensities of the 3 major components:

$\rho(ADF) = \rho(ADF-BC) + \rho(ADF-MDS) + \rho(ADF-SECURITY) + \rho(ADF-misc)$ It is possible for the intensity of a subclass of threads or stack segments under the (ADF Application, ADF-misc) class to spike due to system glitches. For example, a file system glitch can cause some ADF Application threads to get stuck in file write operation:

java.io.FileOutputStream.writeBytes(Native Method)
    java.io.FileOutputStream.write(FileOutputStream.java:260)
    ...
    java.io.OutputStreamWriter.flush(OutputStreamWriter.java:213)
    org.apache.log4j.helpers.QuietWriter.flush(QuietWriter.java:57)
    ...
    org.apache.log4j.WriterAppender.append(WriterAppender.java:159)
    ...
    at oracle.adf.View.process(View.java:632)

Supposing that the intensity of this stack frame spikes above a threshold, a new state (ADF Application, ADF-View-misc) of ADF Application threads can be classified. For the duration of the spike, the intensity $\rho(ADF)$ of the ADF Application can be decomposed into 4 components:

$\rho(ADF) = \rho(ADF-BC) + \rho(ADF-MDS) + \rho(ADF-SECURITY) + \rho(ADF-View-misc)$ The stack frames performing file write operation may occur on top of the ADF-View-misc stack frames as well as the ADF-BC, ADF-MDS, and ADF-Security stack frames. Over time the system may detect the intensity of the file write operation stack frames diverging from the intensity of other stack frames in ADF-View-misc. Separating the intensity of the different groups of the stack frames will result in the new classification (File Write Operation) and segmenting of the classification (ADF-View-misc) into (ADF-View, File Write Operation). The previous classification (ADF-View-misc) is subsumed under the new (File Write Operation) and (ADF-View) classes. The new (File Write Operation) class also intersects with (ADF-BC), (ADF-MDS), and (ADF-Security) classes to form new subclasses (ADF-BC, File Write Operation), (ADF-MDS, File Write Operation), and (ADF-Security, File Write Operation), whose intensities are also spiking Thus the intensity drives the classification of (File Write Operation) and (ADF-View) classes.

The system may solicit human tacit knowledge to classify stack frames and to assign the classifications to the proper dimensions. In certain embodiments of the invention, an inductive learning process can assign the new classes to the dimensions that the system has already defined. For example, by analyzing the intensity and adjacency statistics of (ADF-BC, File Write Operation), (ADF-MDS, File Write Operation), (ADF-Security, File Write Operation), and (ADF-View, File Write Operation) stack traces, the inductive learning process may assign the (File Write Operation) class to the Operation dimension and the (ADF-View) class to the Library dimension as shown below:

Operation=(Database Operation)|(LDAP Operation)|
(Web Service Invocation)|(File Write Operation)
Library=(ADF-BC)|(ADF-MDS)|(ADF-SECURITY)|
(ADF-VIEW)

To enable the classification of each individual stack frame in the stack traces, the system maintains the number of occurrences of a stack frame in the current thread dump (numOfOccur), total number of occurrences in all thread dumps (totalNumOfOccur), a list of predecessors, a list of successors, and a coalescing segment using a StackFrameInfo data structure. A classMethodLineNumber variable in the StackFrameInfo data structure holds a string, such as "weblogic.work.ExecuteThread run (ExecuteThread java:213)" that represents a stack frame in the thread dump. The numOfOccur holds the number of occurrences of the string "weblogic.work.ExecuteThread run (ExecuteThread.java:213)" in the current thread dump. An intensity measure is a derived variable given by intensity=totalNumOfOccur/totalNumOfDumps.

If an existing classification, such as (ADF-View-misc), is split into two new classifications, such as (ADF-View, File Write Operation), the new classifications are maintained as the first segment and second segment of the original classification. The original classification is set as the coalescing segment of the new classifications. The stack frames that belong to the classification are also maintained as elements in the classification. The name of the classification and dimension are optional and can be specified by tacit knowledge. The coalescing segment, first constituent segment, second constituent segment, and elements of a stack segment classification are maintained using the StackSegmentInfo data structure.

A stack segment that can repeat a variable number of times due to a recursive program construct is also classified by a StackSegmentInfo. This recursive StackSegmentInfo can appear in different contexts, i.e. it can occur in more than one class of coalescing segments or threads. The RecursiveSegmentInfo data structure is used to represent the recursive occurrence of a StackSegmentInfo in each context to record the depth of recursion (numOfRecur) in a RecursiveSegmentInfo data structure. The RecursiveSegmentInfo can also constitute the mutual recursion segments in the visitor design pattern for tree traversal. For example, a simple mutual recursion construct will look like $(A, B)^n$ where A and B are invoking each other. The visitor design pattern, in which mutual recursion involves different types of tree nodes {A1, A2, A3} and different types of visitor nodes {B1, B2, B3}, will look like ((A1, B1), (A3, B3)$^2$, (A2, B2), (A3, B3)$^5$, . . . ). The mutual recursion segment, for example the segment (A3, B3)$^n$, can occur any number of times at different positions in the stack trace. Each position is represented by an instance of RecursiveSegmentInfo.

The technique splits the stack traces of a thread into a sequence of leaf-level stack segments and then coalesces the leaf-level stack segments until it gets a sequence of top-level coalesced stack segments, each of which can contain a binary tree structure representing a hierarchy of constituent segments. This representation forms a signature for classifying an equivalence class of threads and reduces the time complexity of pattern matching a thread against a large repertoire of threads. Thread classification information is maintained using the ThreadClassificationInfo data structure.

Embodiments of the invention also filter the seasonal trend for the intensity for each classification of stack frames. A SeasonalTrendInfo data structure contains some of the filter variables. A rawIntensity variable in SeasonalTrendInfo records the intensity of a stack frame, a stack segment, or a thread class in the current thread dump. If a stack segment is a leaf level segment (no sub-segments), then numOfOccur will be the same as numOfOccur of each StackFrameInfo element in the stack segment. The filter updates the smoothed intensity and smoothed intensity growth rate to forecast the growth trend of the intensity. The normalized residual of the forecasted intensity can be used as a filter for detecting outliers, which represent when the measured intensity is deviating from the expected intensity. This condition can represent hypertension or hypotension states of the services.

An Example Scenario of Intensity-Driven Classification

Supposing that a system has classified an array of stack frames in a stack trace, a list of stack frames can make up elements of a stack segment (A). Each stack frame element maintains the intensity, number of occurrences, predecessors, and successors information. The stack frames in this class may have, for example, the same intensity of 1.3 after 10 thread dumps.

After 100 thread dumps, the intensities of the stack frames in the stack segment (A) might diverge into three groups, with the intensity of the bottom 3 stack frames increasing to 2.5, the intensity of the top 3 stack frames increasing slightly to 1.33, and the intensity of the middle stack frame, which serves as a glue frame, staying around 1.3. As the intensities diverge, the system splits the stack segment (A) into two constituent stack segments (A-1) and (A-2), and again splits the stack segment (A-2) into (A-2-1) and (A-2-2). The intensity of the middle stack frame (A-2-1) is representative of the intensity of the stack segment (A), i.e. A=(A-1, A-2-1, A-2-2). The intensities of (A-1) and (A-2-2) diverges because of their occurrences in the stack traces (A-1, AC, C) and (B, BA, A-2-2), where (AC) and (BA) represent glue frames that, respectively, connect (A-1) with (C) and (B) with (A-2-2). A particular stack frame can have multiple successors and multiple predecessors.

When the technique detects a divergence of intensities among the stack frames of a stack segment, it splits the stack frame elements among the new constituent stack segments. For example, constituent stack segments (A-1), (A-2), (A-2-1) and (A-2-2), each of which directly or indirectly refers to the stack segment (A) as the coalescing segment, can be produced from such a split. In the example, the elements in the stack segment (A) can be split into elements in stack segment (A-1) and elements in stack segment (A-2). The stack segment (A-2) can in turn be split into elements in stack segment (A-2-1) and elements in stack segment (A-2-2). The stack frames are updated to refer to the corresponding leaf-level coalescing segment. Coalescing segment for various elements can be updated to reflect the new stacks to which those elements belong.

It is possible to observe variations of a stack segment that differ only by the depth of recursion of a constituent segment. Assuming that the intensities of certain segments remain the same, but the intensity of other segments diverge due to an arbitrary depth of recursion, the system can split the original segment into constituent segments. The elements of the original stack segment can contain a variable number of the stack segments, which is classified by A-2-1.

Consequently, the constituent segments of the original stack segment will contain a variable number of the segment A-2-1. Any stack trace that matches a specified pattern can be identified by the same classification signature. The recursive segment can point to the stack segment A-2-1 as the classification of the first constituent segment of the coalescing segment A-2.

The system can create one copy of the SeasonalTrendInfo data in stack segment (A) for each new stack segment (A-1), (A-2), (A-2-1), and (A-2-2) to use as initial filter states. Subsequently the SeasonalTrendInfo data for (A-1), (A-2), (A-2-1), and (A-2-2) can be updated independently.

Thread Class Dependency Information Model

The thread classification and intensity measurement algorithm can be bootstrapped with a knowledge base that provides the dependency information between thread classes. The dependency information can be used to estimate traffic intensity in the communication channels between the thread classes. They can also relate the events and incidences from two or more thread classes in different parts of the FA servers in a problem container for root cause analysis. For example, assuming the thread class dependency (CRM Domain, Sales Server, ADF Application, ADF Web Service Invocation)→(CRM Domain, Order Capture Server, ADF Web Service, ADF-BC), then if Sales Server and Order Capture Server in an FA pod simultaneously report hypotension state of the client threads and hypertension state of the server threads, these events can be collected under an incidence. If these events occur often enough, a ticket can be opened and assigned to an owner to analyze possible impedance mismatch in the communication channels between the Sales Server and Order Capture Server clusters. The owner may assess these incidences as an impedance matching problem and submit a service request.

Typically the dependency information is specified at super class levels. For example, the dependency (ADF Web Service Invocation)→(ADF Web Service, ADF-BC) captures a general pattern of service invocations between ADF services distributed across WebLogic domains and servers in an FA pod. This abstract dependency includes the dependency (CRM Domain, Sales Server, ADF Application, ADF Web Service Invocation)→(CRM Domain, Order Capture Server, ADF Web Service, ADF-BC). In another situation, the abstract dependency patterns (ADF-BC, DATABASE Operation)→(DATABASE, Fusion DB) and (ADF-SECURITY, DATABASE Operation)→(DATABASE, OIM-APM DB) enable differential diagnosis of a hypertension problem of JDBC threads to isolate the problem in one of the database servers.

An information model can map the dependencies between thread classes. ThreadClassDependencyInfo can represent many-to-one mappings from client thread classes to server thread classes. ThreadClassInfo can specify a class of threads by a tuple of stack segments. For example, (ADF-BC, DATABASE Operation) is a tuple of stack segments (ADF-BC) and (DATABASE Operation). The class (CRM Domain, Order Capture Server, ADF Web Service, ADF-BC, DATABASE Operation) is a subclass of (ADF-BC, DATABASE Operation). ThreadClassificationInfo contains a list of stack segments that represent a signature for classifying threads. The technique can perform a single depth first traversal of the binary tree (from bottom to top of the stack frames), extracting the thread class objects from the partOfThreadClasses attribute of the stack segments objects visited, and match the stack segments in ThreadClassInfo against the stack segments in the classification signature. When a thread class is matched, the client or server thread class is included in the alerts or incidence reports.

Applying Thread or Stack Segment Intensity Analytics

Figure 1B:
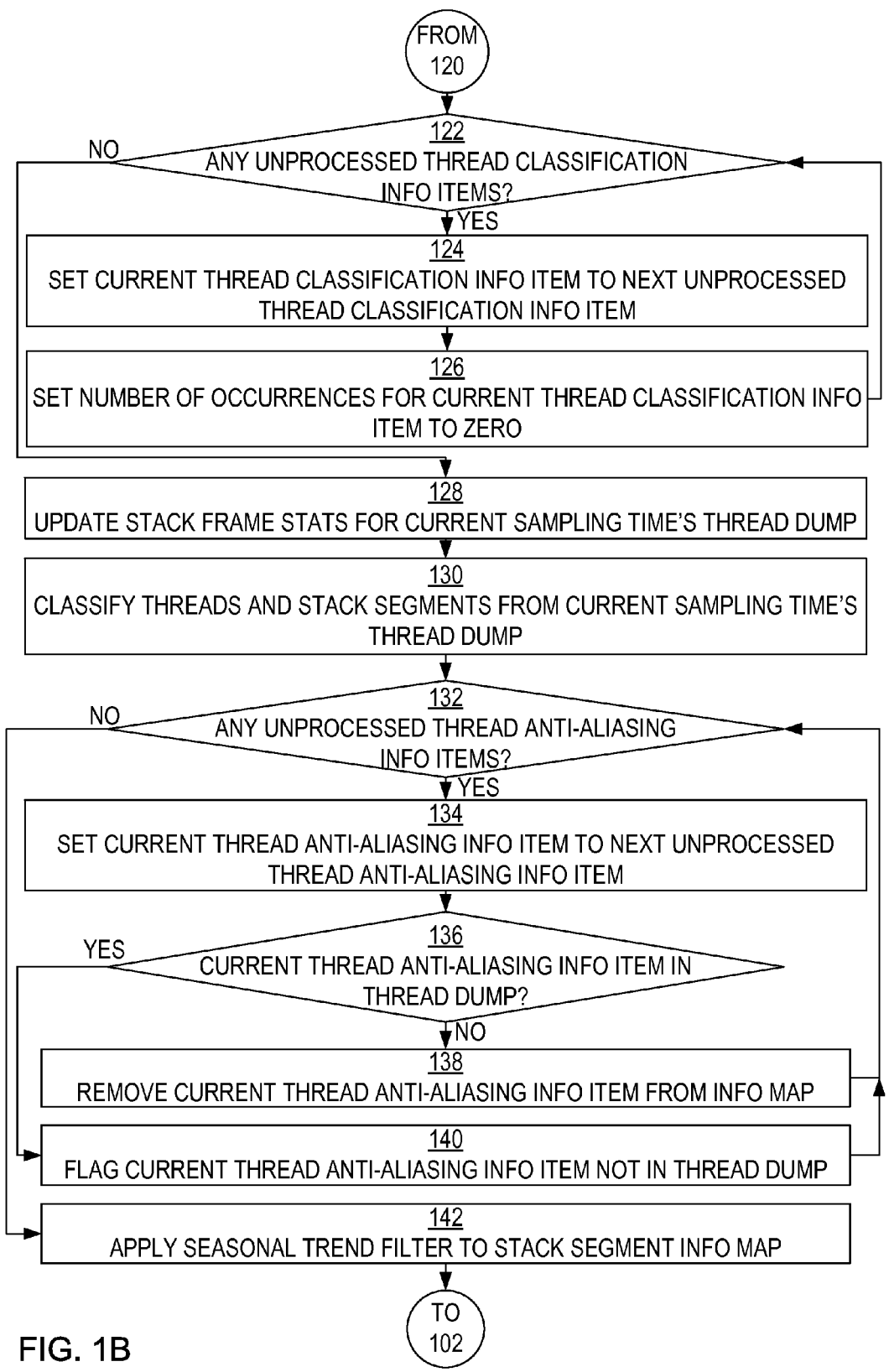

FIGS. 1A-B show a flow diagram that illustrates an example of a technique for applying thread or stack segment intensity analytics, according to an embodiment of the invention. The technique maintains a stack frame information map, a stack segment information map, a thread classification map, and an anti-aliasing information map. The stack frame information map, stack segment information map and thread classification map are comprised of the stack frame, stack segment, and thread classifications extracted from the threads dump samples collected up to a point in time (collected in a series of sampling times preceding a sampling time). These maps can be optionally bootstrapped with the stack frame, stack segment and thread classifications extracted from the thread dumps in historical archives. The anti-aliasing information map represents the threads that are sampled in the previous threads dump. The thread anti-aliasing information map is used to identify the threads in the threads dump of the current sampling time that are already encountered in the threads dump of the previous sampling time. The stack traces of the threads dump at a sampling time can be classified using the stack frame information map, stack segment information map, and thread classification map. These maps are part of the contexts for the processes depicted by the flow diagrams in FIGS. 1A-B and subsequent figures. Referring first to FIG. 1A, in block 102, the current sampling time arrives.

In block 104, the current sampling time is set to be the next sampling time, a point in time when a sampling time interval has elapsed. In block 106, a thread dump of all threads at the current sampling time is obtained. For example, the thread dump for the current sampling time can be obtained from java.lang.management.ThreadMXBean. In block 108, a thread dump counter is incremented.

For threads dump at each sampling time, a number of occurrences counter of each stack frame information item in the stack frame information map is reset to zero such that the counter can be used to count the number of occurrences of the stack frame in the current thread dump. To achieve this, in block 110 a determination is made whether an unprocessed stack frame information item in the stack frame information map remains to be processed. If so, then control passes to block 112. Otherwise, control passes to block 116.

In block 112, the current stack frame information item is set to be the next unprocessed stack frame information item in the stack frame information map. In block 114, a number of occurrences for the current stack frame information item is set to zero. Control passes back to block 110.

For threads dump at each sample time, a number of occurrences counter of each stack segment information item in the stack segment information map is reset to zero such that the counter can be used to count the number of occurrences of the stack segment in the current thread dump. To achieve this, in block 116 a determination is made whether an unprocessed stack segment information item in the stack segment information map remains to be processed. If so, then control passes to block 118. Otherwise, control passes to block 122 on FIG. 1B.

In block 118, the current stack segment information item is set to be the next unprocessed stack segment information item in the stack segment information map. In block 120, a number of occurrences for the current stack segment information item is set to zero. Control passes back to block 116.

For threads dump at each sample time, a number of occurrences counter of each thread classification information item in the thread classification information map is reset to zero such that the counter can be used to count the number of occurrences of the thread in the current thread dump. To achieve this Referring now to FIG. 1B, in block 122, a determination is made whether an unprocessed thread classification information item in the thread classification information map remains to be processed. If so, then control passes to block 124. Otherwise, control passes to block 128.

In block 124, the current thread classification information item is set to be the next unprocessed thread classification information item in the thread classification information map. In block 126, a number of occurrences for the current thread classification information item is set to zero. Control passes back to block 122.

In block 128, stack frame statistics for the thread dump for the current sampling time are updated. A technique for updating the stack frame statistics for the thread dump for the current time interval is disclosed below with reference to FIGS. 2A-B. In block 130, a set of thread classes is determined by classifying threads and stack segments from the thread dump for the current sampling time. A technique for classifying threads and stack segments from the thread dump for the current sampling time is disclosed below with reference to FIGS. 3A-J.

For threads dump at each sample time, a flag in each thread anti-aliasing information item in the thread anti-aliasing information map is checked to determine whether a classified thread occurs in the current thread dump. If the classified thread does not occur in the current thread dump, it is removed from the thread anti-aliasing information map. To achieve this, in block 132 a determination is made whether an unprocessed thread anti-aliasing information item remains in the thread anti-aliasing information map. If so, then control passes to block 134. Otherwise, control passes to block 142.

In block 134, the current thread anti-aliasing information item is set to be the next unprocessed thread anti-aliasing information item in the thread anti-aliasing information map. In block 136, a determination is made whether a flag for the current thread anti-aliasing information item, indicating whether the current thread information item occurs in the thread dump for the current sample time, is false. If so, then control passes to block 138. Otherwise, control passes to block 140.

In block 138, the current thread anti-aliasing information item is removed from the thread anti-aliasing information map. Control passes back to block 132.

In block 140, the flag for the current thread anti-aliasing information item is set to false. Control passes back to block 132.

In block 142, a seasonal trend filter is applied relative to the stack segment information map for the current sample time. A technique for applying a seasonal trend filter is disclosed below with reference to FIG. 4. Control passes back to block 102 on FIG. 1A.

Updating Stack Frame Statistics

Figure 2A:
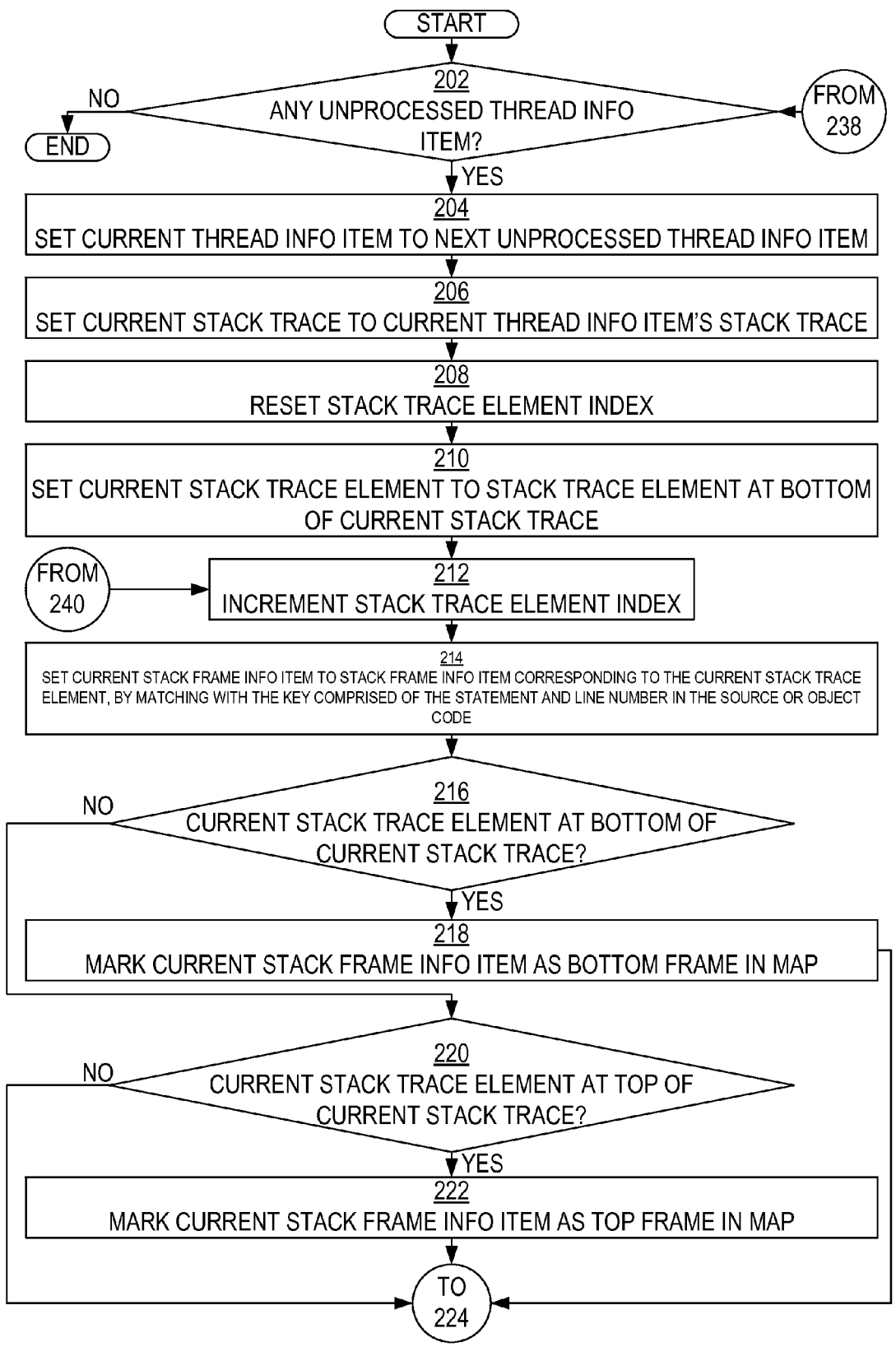
FIGS. 2A-B show a flow diagram that illustrates an example of a technique for updating stack frame statistics, according to an embodiment of the invention.
Figure 2B:
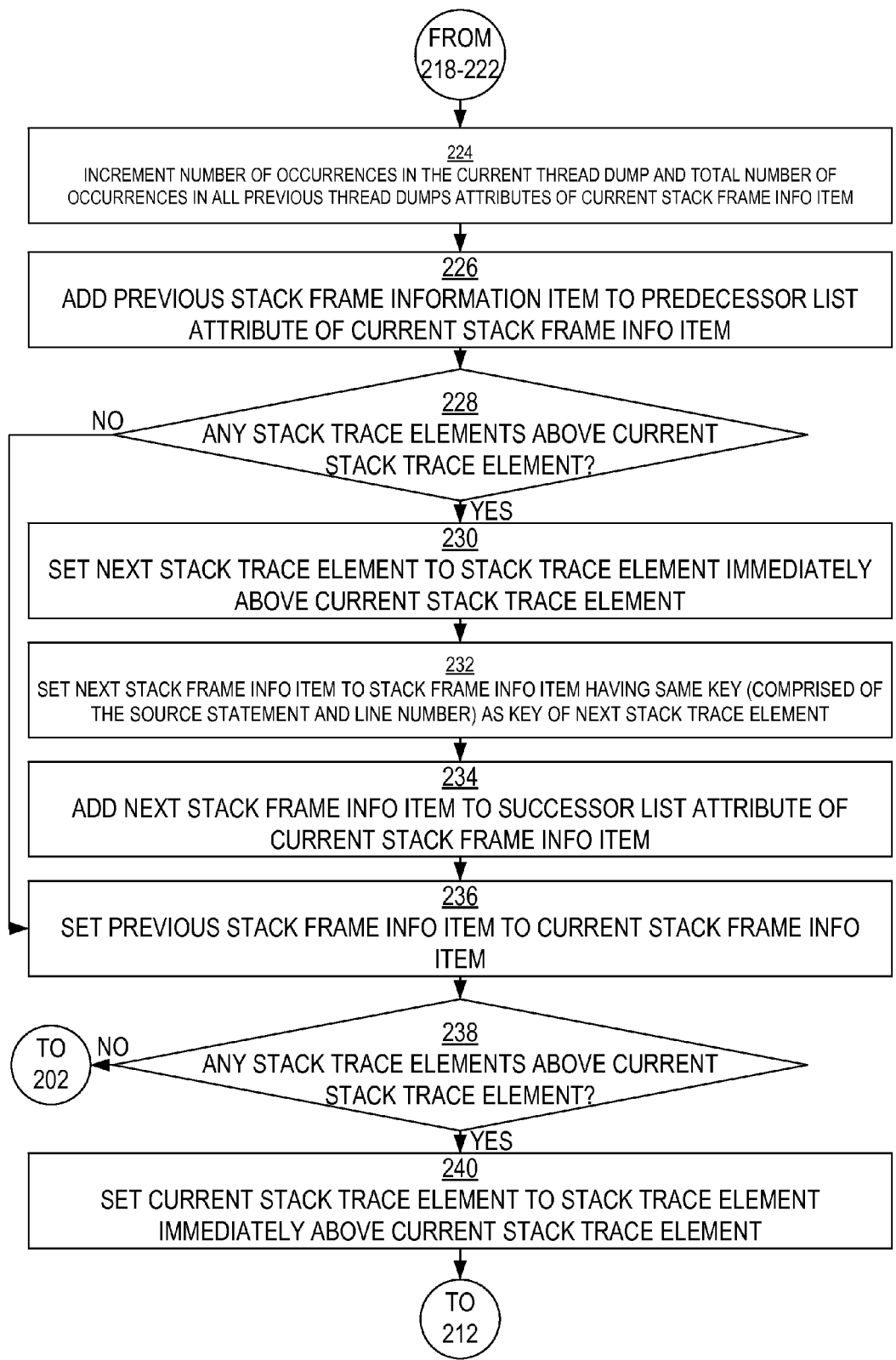

FIGS. 2A-B show a flow diagram that illustrates an example of a technique for updating stack frame statistics, according to an embodiment of the invention. The technique can be performed relative to a thread dump for a current sampling time, referred to above with reference to FIGS. 1A-B. Referring first to FIG. 2A, in block 202, a determination is made whether an unprocessed thread information item in the thread dump remains to be processed. If so, then control passes to block 204. Otherwise, the technique illustrated in FIGS. 2A-B concludes.

In block 204, the current thread information item is set to be the next unprocessed thread information item in the thread dump. In block 206, the current stack trace is set to be the stack trace in the current thread information item. In block 208, a stack trace element index is reset. For example, the index can be reset by setting the index to −1. In block 210, a current stack trace element is set to be the stack trace element at the bottom of the current stack trace.

In block 212, the stack trace element index is incremented. In block 214, the current stack frame information item is set to be a stack frame information item (in the stack frame information map or created as necessary) corresponding to the current stack trace element, by matching with a key, i.e. get a stack frame information item that has the same key as the key of the current stack trace element. For example, a key can be comprised of a source code statement, a line number, an object code address, or combination of these.

In block 216, a determination is made whether the current stack trace element is at the bottom of the current stack trace. For example, if the stack trace element index is equal to zero, then this can indicate that the current stack trace element is at the bottom of the current stack trace. If the current stack trace element is at the bottom of the current stack trace, then control passes to block 218. Otherwise, control passes to block 220.

In block 218, the current stack frame information item is marked as being a bottom frame in the stack frame information map. This may be accomplished by adding a constant stack frame information item such as "FRAME_FLOOR" to a predecessors list attribute of the current stack frame information item. The current stack frame information item can be also added to the successors list attribute of the "FRAME_FLOOR." Control passes to block 224 on FIG. 2B.

In block 220, a determination is made whether the current stack trace element is at the top of the current stack trace. For example, if the stack trace element index is equal to one less than the size of the current stack trace, then this can indicate that the current stack trace element is at the top of the current stack trace. If the current stack trace element is at the top of the current stack trace, then control passes to block 222. Otherwise, control passes to block 224 on FIG. 2B.

In block 222, the current stack frame information item is marked as being a top frame in the stack frame information map. This may be accomplished by adding a constant stack frame information item such as "FRAME_CEILING" to a successors list attribute of the current stack frame information item. The current stack frame information item can be also added to the predecessors list attribute of the "FRAME_CEILING." Control passes to block 224 on FIG. 2B.

Referring now to FIG. 2B, in block 224, a number of occurrences attribute of the current stack frame information item is incremented. A total number of occurrences attribute of the current stack frame information item also can be incremented. In block 226, a previous stack frame information item, if it is not null, is added to a predecessors list attribute of the current stack frame information item. In block 228, a determination is made as to whether any stack trace elements exist above the current stack trace element in the current stack trace. If so, then control passes to block 230. Otherwise, control passes to block 236.

In block 230, the next stack trace element is set to be the stack trace element that exists immediately above the current stack trace element. In block 232, the next stack frame information item is set to be a stack frame information item (in the stack frame information map) that has the same key as the key of the next stack trace element. For example, a key can be comprised of a source code statement, line number, or object code address corresponding to a stack frame. In block 234, the next stack frame information item is added to a successors list attribute of the current stack frame information item. Control passes to block 236.

In block 236, the previous stack frame information item is set to be the current stack frame information item. In block 238, a determination is made whether any stack trace element exists above the current stack trace element in the current stack trace. If so, then control passes to block 240. Otherwise, control passes back to block 202 on FIG. 2A.

In block 240, the current stack trace element is set to be a stack trace element that exists immediately above the current stack trace element in the current stack trace. Control passes back to block 212 on FIG. 2A.

Classifying Threads and their Stack Segments

Figure 3A:
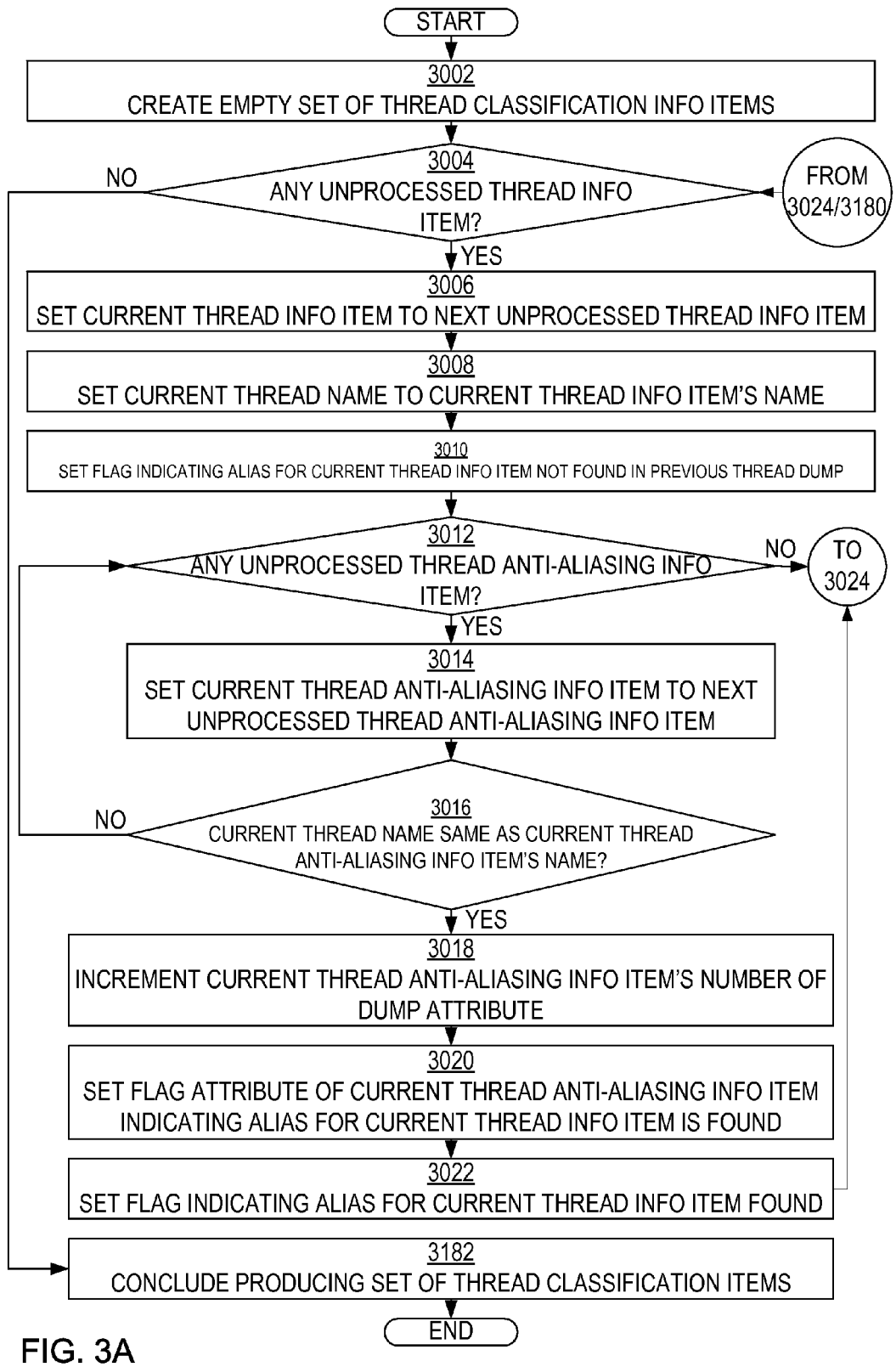
FIGS. 3A-J show a flow diagram that illustrates an example of a technique for classifying threads and the stack segments of those threads, according to an embodiment of the invention.

FIGS. 3A-J show a flow diagram that illustrates an example of a technique for classifying threads and the stack segments of those threads, according to an embodiment of the invention. The technique can be performed relative to a specified thread dump for a current sampling time, referred to above with reference to FIGS. 1A-B. The technique can produce a set of thread classes, represented as a set of thread classification information items. Referring first to FIG. 3A, in block 3002, an empty set of thread classification information items is created, having properties that each thread in the thread dump can be represented by a (potentially different) thread classification item in the set, and such that equivalent threads in the thread dump are represented by the same thread classification item. New thread classification items abiding by these properties can be created and added to the set through the operations described below. In block 3004, a determination is made whether an unprocessed thread information item in the thread dump remains to be processed. If so, then control passes to block 3006. Otherwise, control passes to block 3182.

In block 3006, the current thread information item is set to be the next unprocessed thread information item in the thread dump. In block 3008, a thread name is set to be the name of the current thread information item. In block 3010, a flag, which indicates whether an alias for the current thread information item was found in a previous thread dump (i.e., for a previous sampling time), is set to false. In block 3012, a determination is made whether an unprocessed thread anti-aliasing information item in the thread anti-aliasing information map remains to be processed. If so, then control passes to block 3014. Otherwise, control passes to block 3024 on FIG. 3B.

In block 3014, the current thread anti-aliasing information item is set to be the next unprocessed thread anti-aliasing information item in the thread anti-aliasing information map. In block 3016, a determination is made whether the thread name (referred to in block 3008) is the same as a name of the current thread anti-aliasing information item. If so, then control passes to block 3018. Otherwise, control passes back to block 3012.

In block 3018, a number of dumps attribute of the current thread anti-aliasing information item is incremented. In block 3020, a flag attribute of the current thread anti-aliasing information item, which indicates whether an alias for that item is found in the current thread dump (i.e., for the current sampling time), is set to true. In block 3022, the flag referred to in block 3010, which indicates whether an alias for the current thread information item was found in a previous thread dump, is set to true. Control passes to block 3024.

Figure 3B:
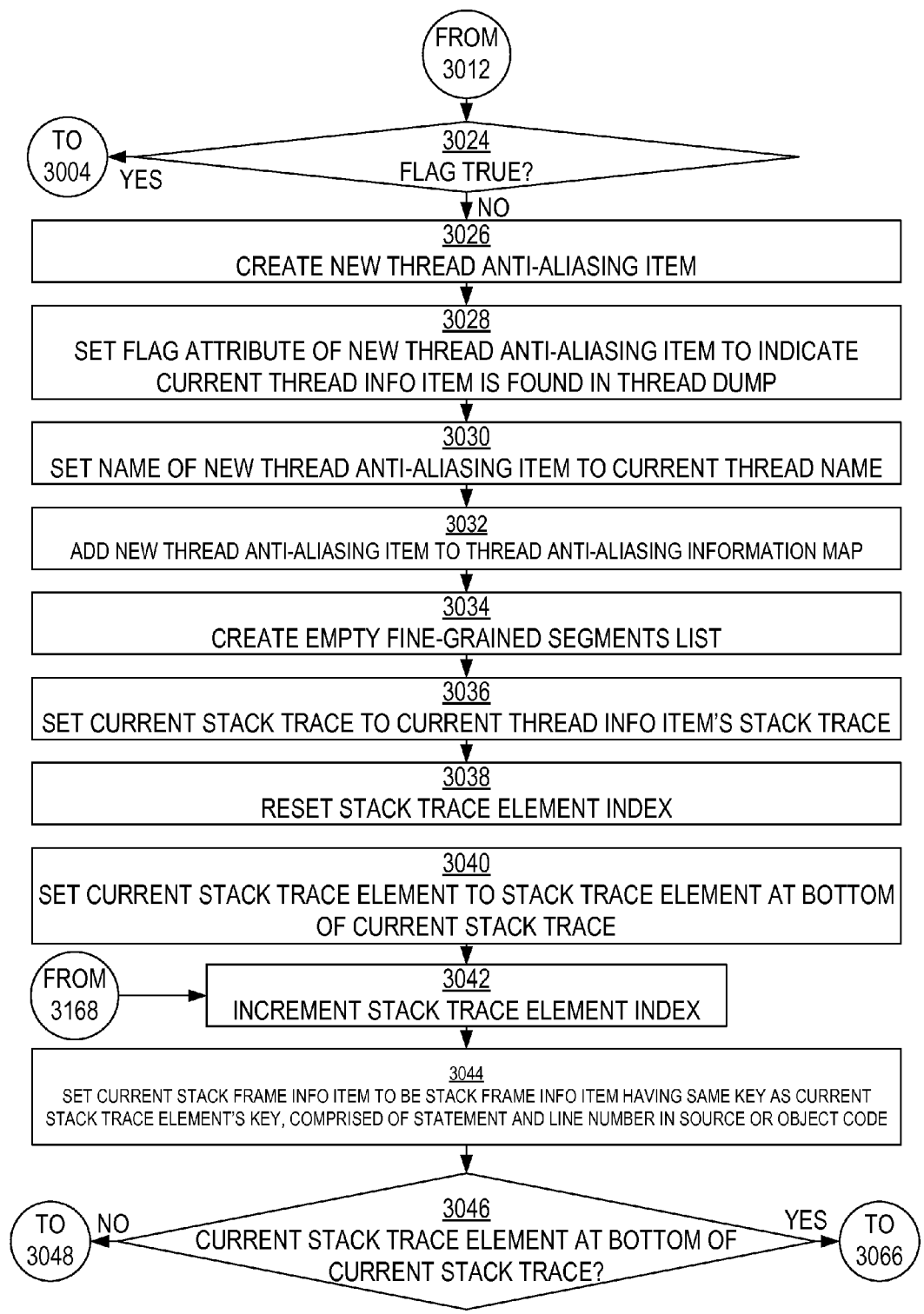

Referring now to FIG. 3B, in block 3024, a determination is made whether the flag referred to in blocks 3010 and 3022 equals true. If so, then control passes back to block 3004 on FIG. 3A. Otherwise, control passes to block 3026.

In block 3026, a new thread anti-aliasing information item corresponding to the current thread information item is created. In block 3028, a flag attribute of the new thread anti-aliasing information item, which indicates whether an alias for that item is found in the current thread dump (i.e., for the current sampling time), is set to true. In block 3030, a name of the new thread anti-aliasing information item is set to be the thread name (referred to in block 3008). In block 3032, the new thread anti-aliasing information item is added to the thread anti-aliasing information map. In block 3034, a new fine grained segments list is created to track fine-grained segments of the current thread information item. In block 3036, the current stack trace is set to be the stack trace of the current thread information item. In block 3038, a stack trace element index is reset. For example, the stack trace element index can be reset by setting a value of the index to −1. In block 3040, a current stack trace element is set to be the stack trace element at the bottom of the current stack trace.

In block 3042, the stack trace element index is incremented. In block 3044, the current stack frame information item is set to be a stack frame information item (in the stack frame information map) that has the same key as the key of the current stack trace element. For example, a key can be comprised of a source code statement, line number, or object code address corresponding to a stack frame.

In block 3046, a determination is made whether the current stack trace element is at the bottom of the current stack trace. For example, if the stack trace element index is equal to zero, then this can indicate that the current stack trace element is at the bottom of the current stack trace. If the current stack trace element is at the bottom of the current stack trace, then control passes to block 3048 on FIG. 3C. Otherwise, control passes to block 3066 on FIG. 3D.

Figure 3C:
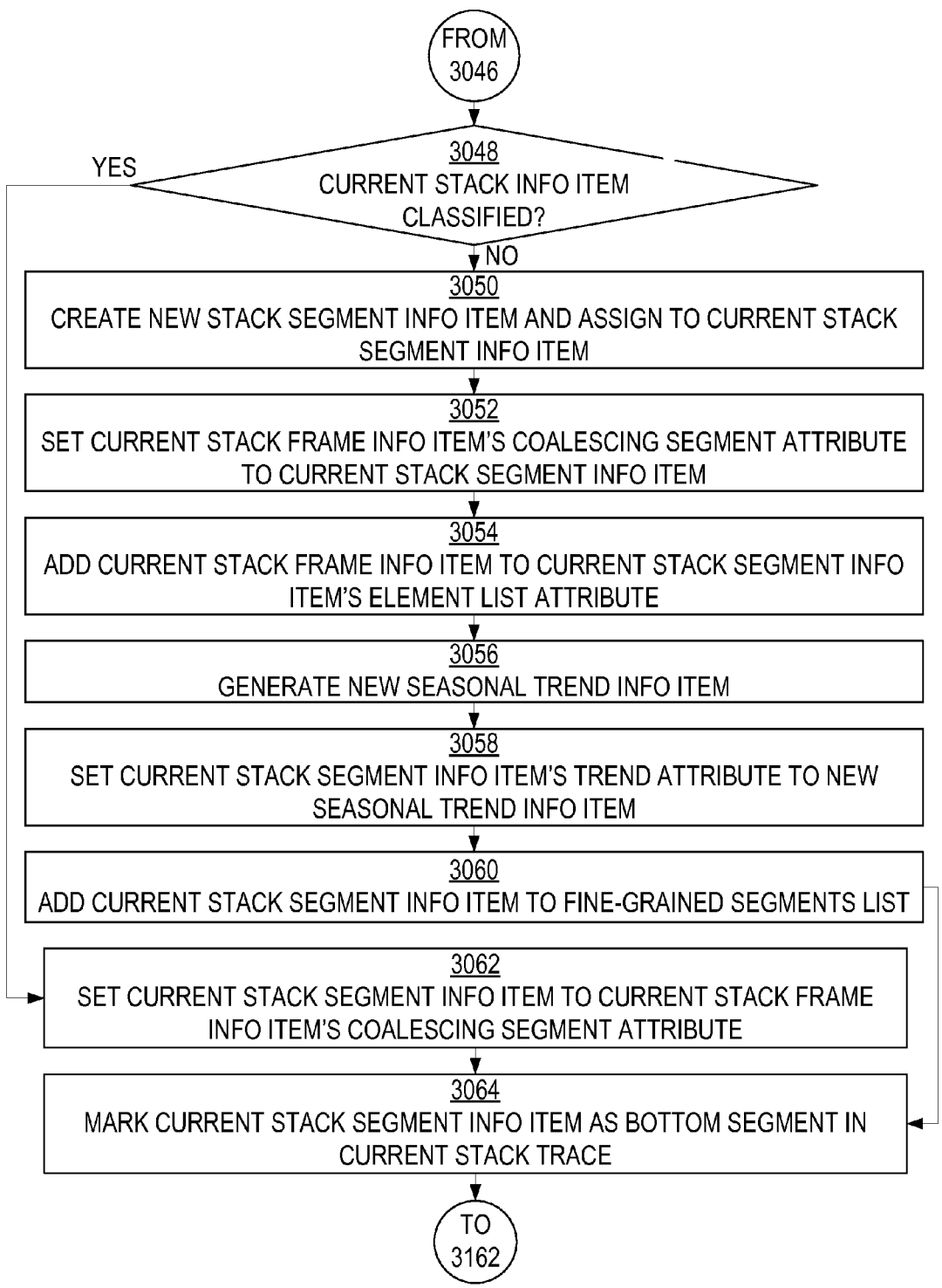

Referring now to FIG. 3C, in block 3048, a determination is made whether the current stack frame information item has been classified. For example, this determination can be made by determining whether a coalescing segment attribute of the current stack frame information item is equal to null. If this attribute is equal to null, then the current stack frame information item has not been classified. If the current stack frame information has not been classified, then control passes to block 3050. Otherwise, control passes to block 3062.

In block 3050, a new stack segment information item is created and assigned to the value of the current stack segment information item. In block 3052, the value of the coalescing segment attribute (referred to in block 3048) of the current stack frame information item is set to be the current stack segment information item. In block 3054, the current stack frame information item is added to an element list attribute of the current stack segment information item. In block 3056, a new seasonal trend information item is generated. In block 3058, a value of a trend attribute of the current stack segment information item is set to be the new seasonal trend information item. In block 3060, the current stack segment information item is added to the fine grained segments list (referred to in block 3034). Control passes to block 3064.

In block 3062, the current stack segment information item is set to be the value of the coalescing segment attribute (referred to in block 3048) of the current stack frame information item. Control passes to block 3064.

In block 3064, the current stack segment information item is marked as being a bottom segment in the current stack trace. This may be accomplished by adding a constant stack segment information item such as "SEGMENT_FLOOR" to a predecessors list attribute of the current stack segment information item. The current stack segment information item can be added to a successors list attribute of "SEGMENT_FLOOR." Control passes to block 3162 on FIG. 3J.

Figure 3D:
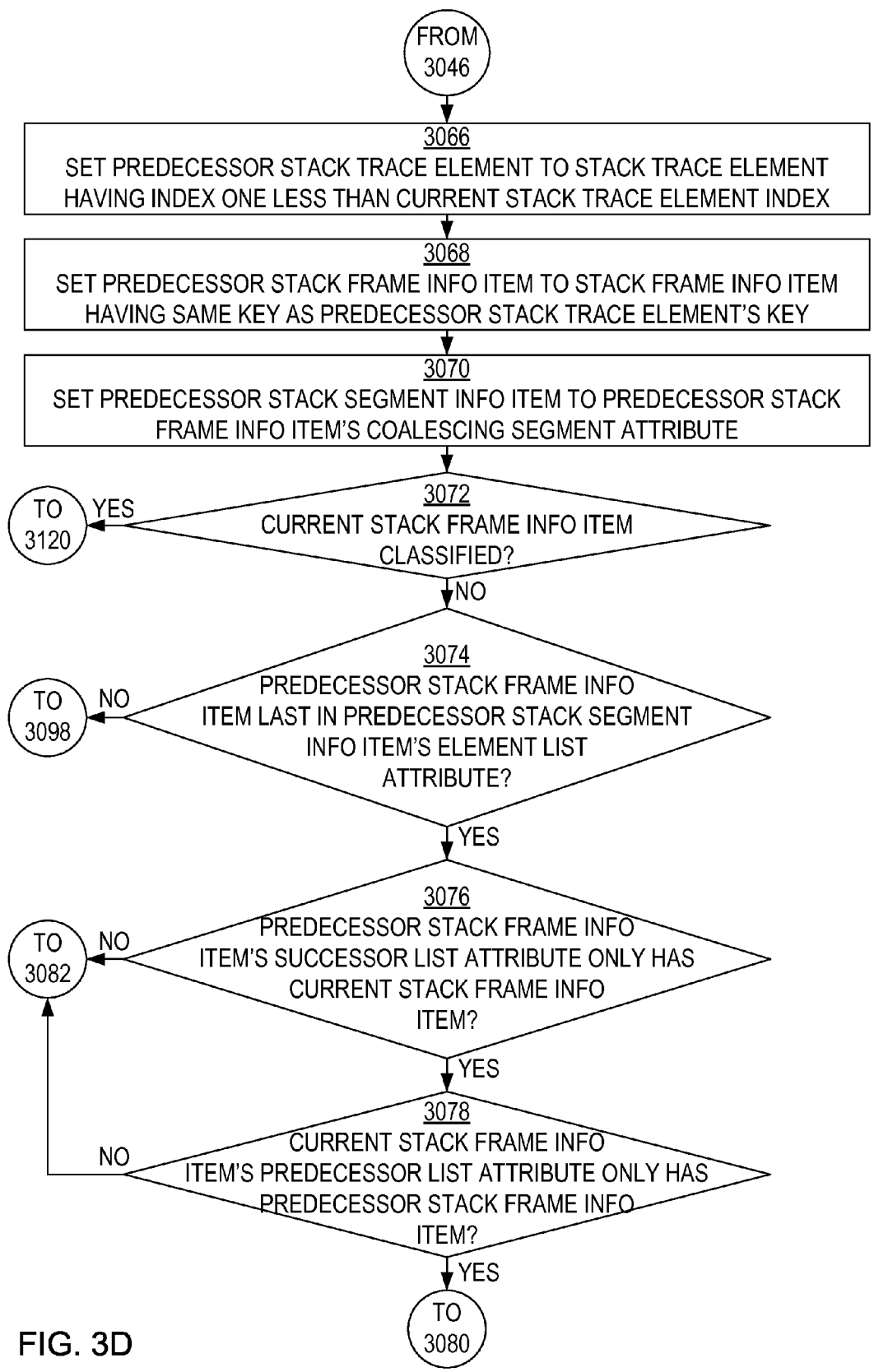

Referring now to FIG. 3D, in block 3066, a predecessor stack trace element is set to be a stack trace element (in the current stack trace) having an index that is one less than the value of the current stack trace element index. In block 3068, a predecessor stack frame information item is set to be a stack frame information item (in the stack frame information map) that has the same key as the key of the predecessor stack trace element. For example, a key can be comprised of a source code statement, line number, or object code address corresponding to a stack frame. In block 3070, a predecessor stack segment information item is set to be the value of the coalescing segment attribute of the predecessor stack frame information item.

In block 3072, a determination is made whether the current stack frame information item has been classified. For example, this determination can be made by determining whether a coalescing segment attribute of the current stack frame information item is equal to null. If this attribute is equal to null, then the current stack frame information item has not been classified. If the current stack frame information item has not been classified, then control passes to block 3074. Otherwise, control passes to block 3120 on FIG. 3G.

In block 3074, a determination is made whether the predecessor stack frame information item is the last stack frame information item in the element list attribute of the predecessor stack segment information item. If so, then control passes to block 3076. Otherwise, control passes to block 3098 on FIG. 3F.

In block 3076, a determination is made whether a successors list attribute of the predecessor stack frame information item has only one entry that is the current stack frame information item. If so, then control passes to block 3078. Otherwise, control passes to block 3082.

In block 3078, a determination is made whether a predecessors list attribute of the current stack frame information item has only one entry that is the predecessor stack frame information item. If so, then control passes to block 3080 on FIG. 3E. Otherwise, control passes to block 3082.

Figure 3E:
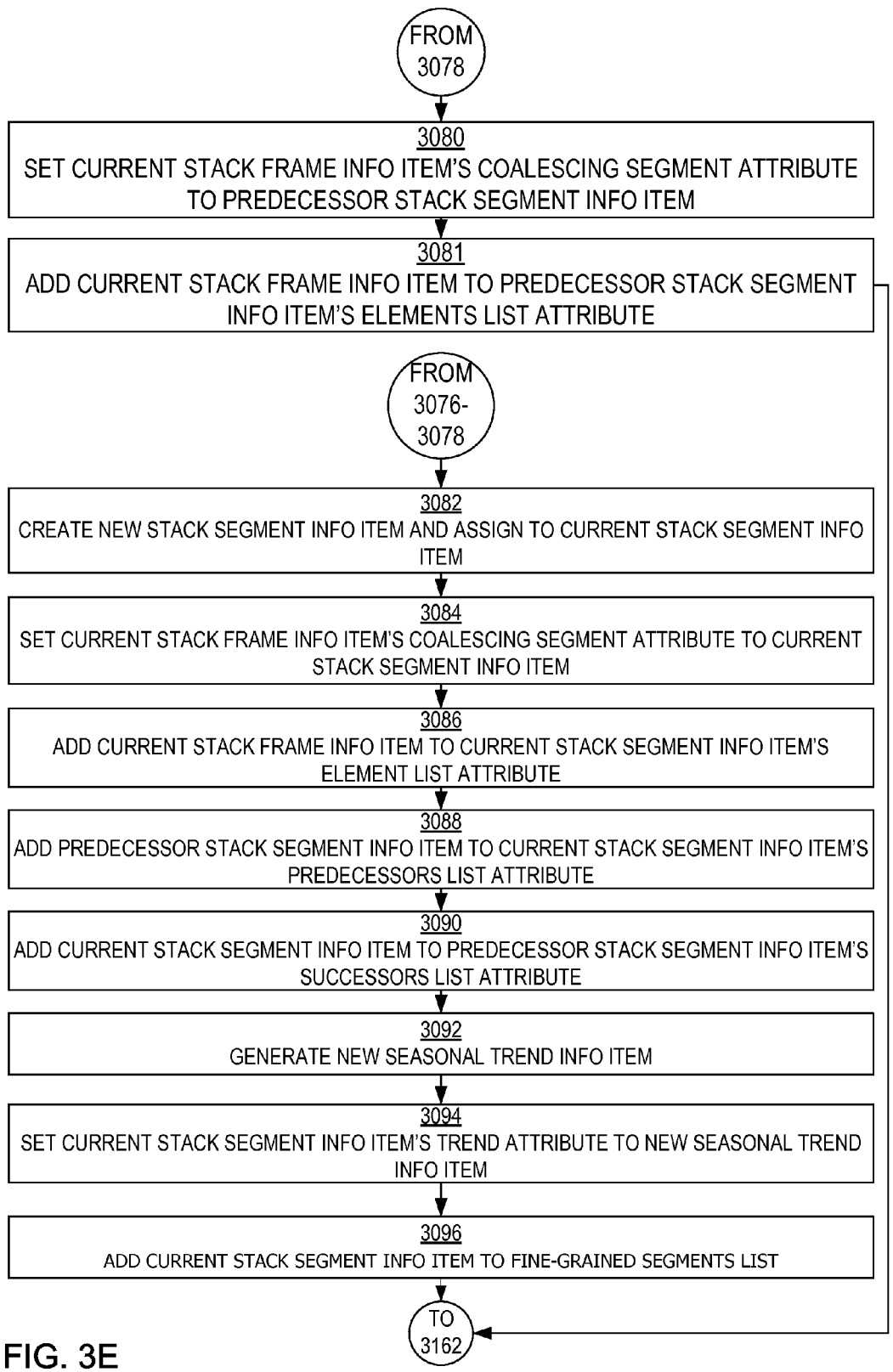

Referring now to FIG. 3E, in block 3080, the value of the coalescing segment attribute of the current stack frame information item is set to be the predecessor stack segment information item. In block 3081, the current stack frame information item is added to the elements list attribute of the predecessor stack segment information item. Control passes to block 3162 on FIG. 3J.

In block 3082, a new stack segment information item is created and assigned to the value of the current stack segment information item. In block 3084, the value of the coalescing segment attribute (referred to in block 3048) of the current stack frame information item is set to be the current stack segment information item. In block 3086, the current stack frame information item is added to the element list attribute of the current stack segment information item. In block 3088, the predecessor stack segment information item is added to the predecessors list attribute of the current stack segment information item. In block 3090, the current stack segment information item is added to the successors list attribute of the predecessor stack segment information item. In block 3092, a new seasonal trend information item is generated. In block 3094, a value of a trend attribute of the current stack segment information item is set to be the new seasonal trend information item. In block 3096, the current stack segment information item is added to the fine grained segments list (referred to in block 3034). Control passes to block 3162 on FIG. 3J.

Figure 3F:
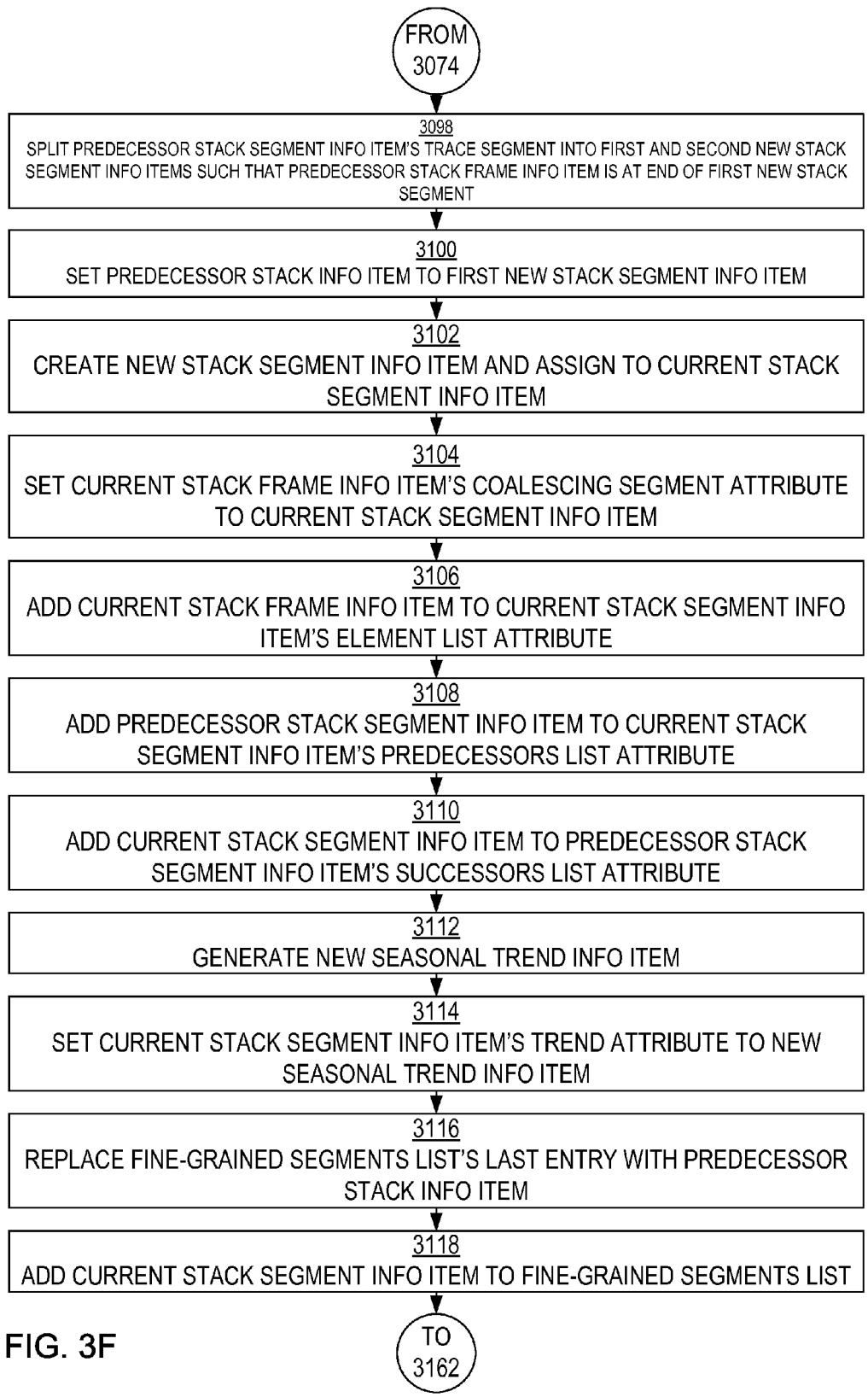

Referring now to FIG. 3F, in block 3098, a trace segment of the predecessor stack segment information item is split into separate first and second new stack segment information items that occur in between the indices of the predecessor stack frame information item and a succeeding stack frame information item, such that the predecessor stack frame information item is at the end of the first new stack segment information item. A technique for splitting a stack segment to add a branch point before or after a specified stack frame is disclosed below with reference to FIGS. 5A-C. In this scenario, that stack segment splitting technique can be invoked to perform the split after (rather than before) the specified stack segment information item, which in this scenario is the predecessor stack segment information item.

In block 3100, the predecessor stack information item is set to be the first new stack segment information item produced by the splitting of block 3098. In block 3102, a new stack segment information item is created and assigned to the value of the current stack segment information item. In block 3104, the value of the coalescing segment attribute (referred to in block 3048) of the current stack frame information item is set to be the current stack segment information item. In block 3106, the current stack frame information item is added to the element list attribute of the current stack segment information item. In block 3108, the predecessor stack segment information item is added to the predecessors list attribute of the current stack segment information item. In block 3110, the current stack segment information item is added to the successors list attribute of the predecessor stack segment information item. In block 3112, a new seasonal trend information item is generated. In block 3114, a value of a trend attribute of the current stack segment information item is set to be the new seasonal trend information item. In block 3116, the value of the last existing entry in the fine grained segments list (referred to in block 3034) is replaced with the value of the predecessor stack segment information item. In block 3118, the current stack segment information item is added to the fine grained segments list. Control passes to block 3162 on FIG. 3J.

Figure 3G:
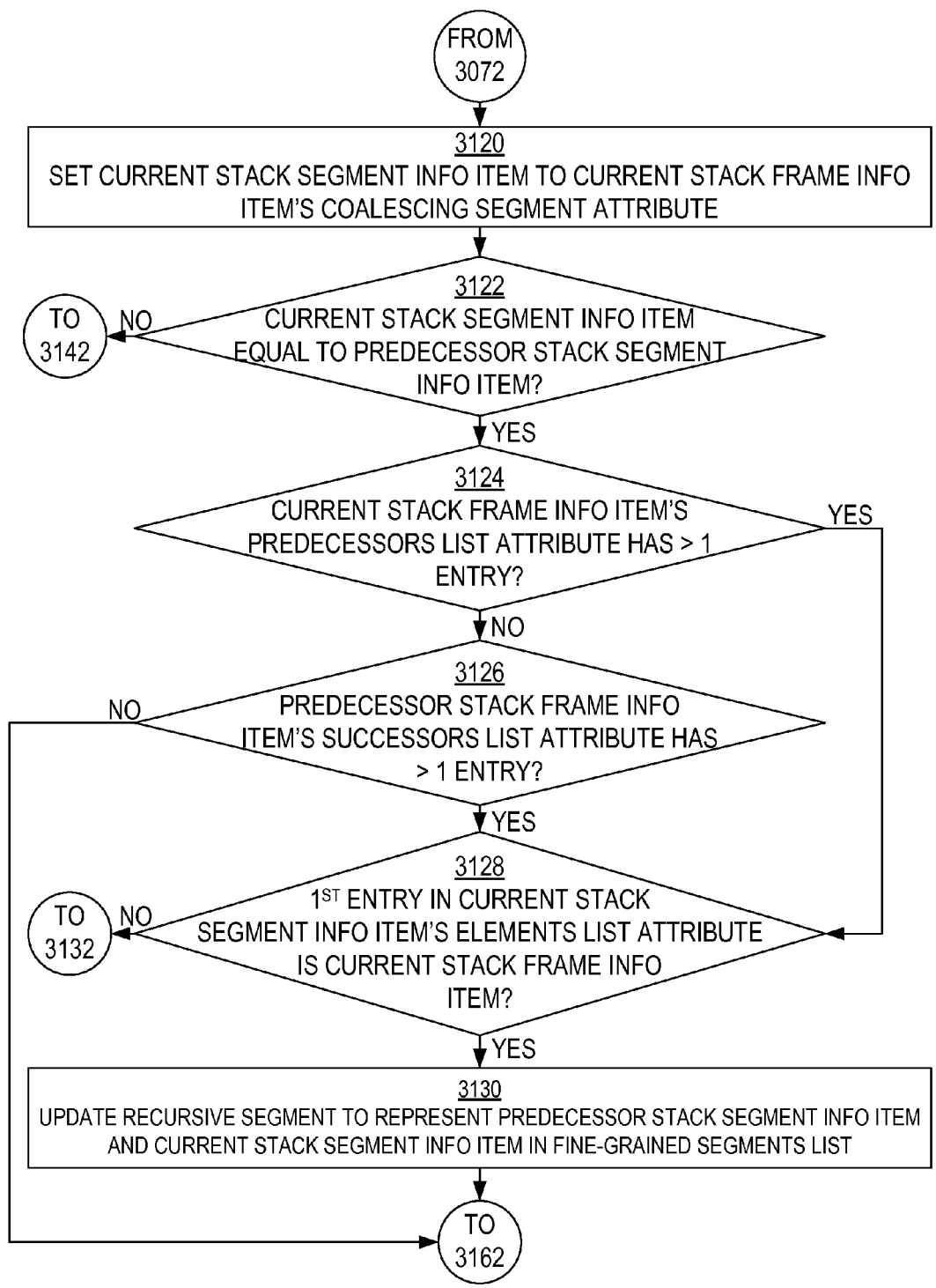

Referring now to FIG. 3G, in block 3120, the current stack segment information item is set to be the value of the coalescing segment attribute of the current stack frame information item. In block 3122, a determination is made whether the current stack segment information item is equal to the predecessor stack segment information item. If so, then control passes to block 3124. Otherwise, control passes to block 3142 on FIG. 3I.

In block 3124, a determination is made whether the predecessors list attribute of the current stack frame information item has more than one entry. If so, then control passes to block 3128. Otherwise, control passes to block 3126.

In block 3126, a determination is made whether the successors list attribute of the predecessor stack frame information item has more than one entry. If so, then control passes to block 3128. Otherwise, control passes to block 3162 on FIG. 3J.

In block 3128, a determination is made whether the first entry in the elements list attribute of the current stack segment information item is the same as the current stack frame information item. If so, then control passes to block 3130. Otherwise, control passes to block 3132 of FIG. 3H.

In block 3130, a recursive segment representing the predecessor stack segment information item and the current stack segment information item in the fine grained segments list is updated. In an embodiment, this updating can involve incrementing a value of a number of recurrences attribute of a last segment in the fine grained segments list if the last segment is a recursive segment, or adding a new recursive segment to the end of the fine grained segments list if the last segment is a stack segment. Further information about these variables will be seen below in the discussion of FIGS. 6A-E. Control passes to block 3162 on FIG. 3J.

Figure 3H:
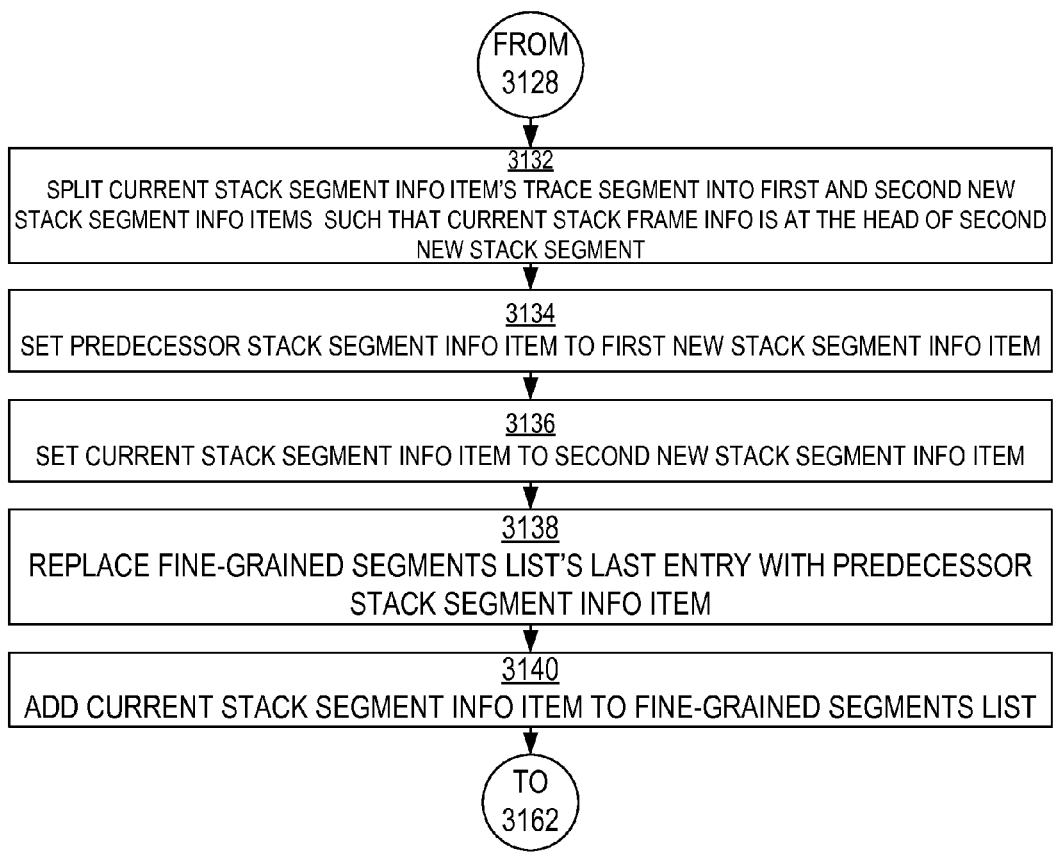

Referring now to FIG. 3H, in block 3132, a trace segment of the current stack segment information item is split into separate first and second new stack segment information items that occur in between the indices of the predecessor stack frame information item and the current stack frame information item, such that the predecessor stack frame information item is at the end of the first new stack segment information item, and such that the current stack frame information item is at the beginning of the second new stack segment information item. A technique for splitting a stack segment at a branch point before or after a specified stack frame is disclosed below with reference to FIGS. 5A-C. In this scenario, that stack segment splitting technique can be invoked to perform the split before (rather than after) the specified stack segment information item information item, which in this scenario is the current stack segment information item.

In block 3134, the predecessor stack segment information item is set to be the first new stack segment information item produced by the splitting of block 3132. In block 3136, the current stack segment information item is set to be the second new stack segment information item produced by the splitting of block 3132. In block 3138, the value of the last existing entry in the fine grained segments list (referred to in block 3034) is replaced with the value of the predecessor stack segment information item. In block 3140, the current stack segment information item is added to the fine grained segments list. Control passes to block 3162 on FIG. 3J.

Figure 3I:
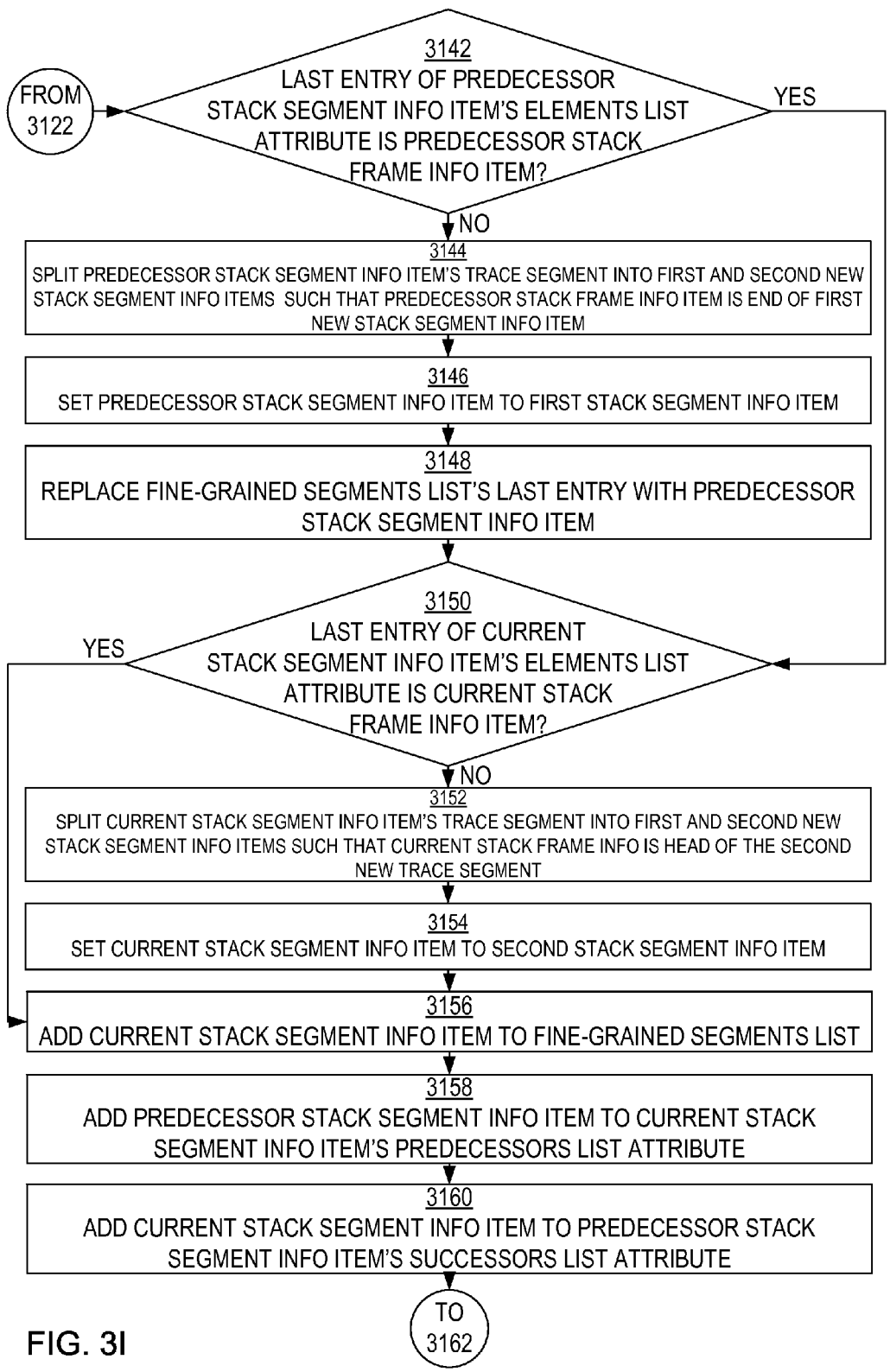

Referring now to FIG. 3I, in block 3142, a determination is made whether the last entry of the elements list attribute of the predecessor stack segment information item is the same as the predecessor stack frame information item. If so, then control passes to block 3150. Otherwise, control passes to block 3144.

In block 3144, a trace segment of the predecessor stack segment information item is split into separate first and second new stack segment information items that occur in between the indices of the predecessor stack frame information item and a succeeding stack frame information item, such that the predecessor stack frame information item is at the end of the first new stack segment information item. A technique for splitting a stack segment at a branch point before or after a specified stack frame is disclosed below with reference to FIGS. 5A-C. In this scenario, that stack segment splitting technique can be invoked to perform the split after (rather than before) the specified stack segment information item, which in this scenario is the predecessor stack segment information item.

In block 3146, the predecessor stack segment information item is set to be the first new stack segment information item produced by the splitting of block 3144. In block 3148, the value of the last existing entry in the fine grained segments list (referred to in block 3034) is replaced with the value of the predecessor stack segment information item. Control passes to block 3150.

In block 3150, a determination is made whether the last entry of the elements list attribute of the current stack segment information item is the same as the current stack frame information item. If so, then control passes to block 3156. Otherwise, control passes to block 3152.

In block 3152, a trace segment of the current stack segment information item is split into separate first and second new stack segment information items that occur in between the indices of a preceding stack frame information item and the current stack frame information item, such that the current stack frame information item is at the beginning of the second new stack segment information item. A technique for splitting a stack segment at a branch point before or after a specified stack frame is disclosed below with reference to FIGS. 5A-C. In this scenario, that stack segment splitting technique can be invoked to perform the split before (rather than after) the specified stack segment information item, which in this scenario is the current stack segment information item.

In block 3154, the current stack segment information item is set to be the second new stack segment information item produced by the splitting of block 3152. Control passes to block 3156.

In block 3156, the current stack segment information item is added to the fine grained segments list (referred to in block 3034). In block 3158, the predecessor stack segment information item is added to the predecessors list attribute of the current stack segment information item. In block 3160, the current stack segment information item is added to the successors list element of the predecessor stack segment information item. Control passes to block 3162 on FIG. 3J.

Figure 3J:
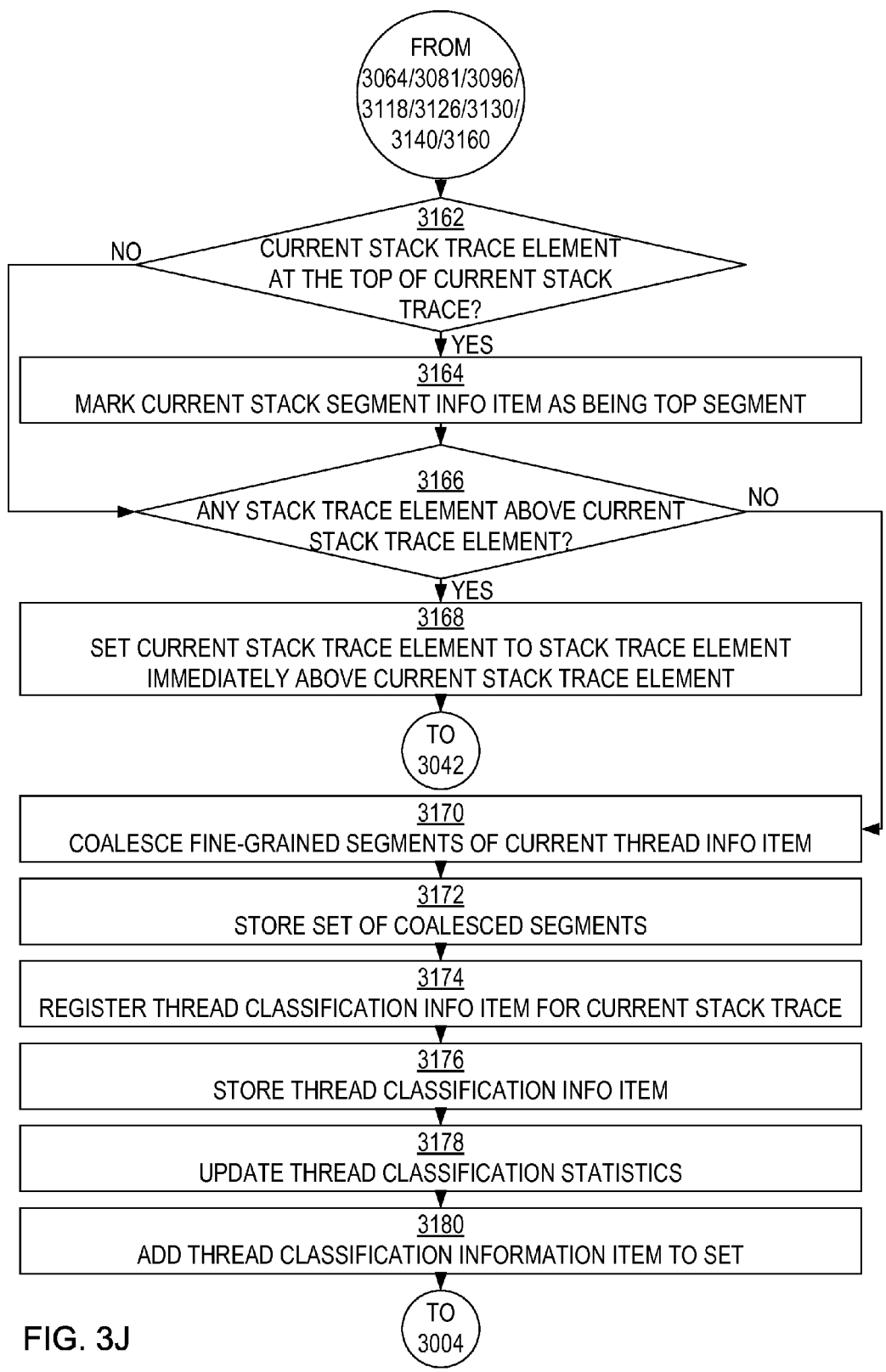

Referring now to FIG. 3J, in block 3162, a determination is made whether the current stack trace element is at the top of the current stack trace. This determination may be made by determining whether the stack trace element index is equal to one less than the current stack trace size. If the stack trace element index is equal to one less than the current stack trace size, then the current stack trace element is at the beginning of the current stack trace. If the current stack trace element is at the beginning of the current stack trace, then control passes to block 3164. Otherwise, control passes to block 3166.

In block 3164, the current stack segment information item is marked as being a top segment in the current stack trace. This may be accomplished by adding a constant stack segment information item such as "SEGMENT_CEILING" to the successors list attribute of the current stack segment information item. The current stack segment information item can be added to the predecessors list attribute of "SEGMENT_CEILING." Control passes to block 3166.

In block 3166, a determination is made whether any stack trace element exists above the current stack trace element in the current stack trace. If so, then control passes to block 3168. Otherwise, control passes to block 3170.

In block 3168, the current stack trace element is set to be a stack trace element that exists immediately above the current stack trace element in the current stack trace. Control passes back to block 3042 on FIG. 3B.

In block 3170, the fine-grained segments of the current thread information item are coalesced. A technique for coalescing fine-grained segments given a specified fine grained segments list is disclosed below with reference to FIGS. 6A-E. The technique disclosed with reference to FIGS. 6A-E produces a set of coalesced segments. In block 3172, the set of coalesced segments so produced for the current thread information item are stored.

In block 3174, a thread classification information item (referred to in block 3002) is registered for the current stack trace and the set of coalesced segments (stored in block 3172). A technique for registering a thread classification item for a specified stack trace and a specified set of coalesced segments is disclosed below with reference to FIGS. 7A-B. The technique disclosed with reference to FIGS. 7A-B produces a thread classification information item. In block 3176, the thread classification information item so produced for the current stack trace and the set of coalesced segments (stored in block 3172) is stored.

In block 3178, thread classification statistics for the thread classification information item (stored in block 3176) are updated. A technique for updating thread classification statistics for a specified thread classification information item is disclosed below with reference to FIG. 8.

In block 3180, the thread classification information item is added to the set of thread classification information items (referred to in block 3002). Control passes back to block 3004 on FIG. 3A.

Referring again to FIG. 3A, in block 3182, with the set of thread classification items having been produced, the technique illustrated in FIGS. 3A-J concludes.

Applying a Seasonal Trend Filter

FIG. 4 is a flow diagram that illustrates an example of a technique for applying a seasonal trend filter, according to an embodiment of the invention. In block 402, a determination is made whether an unprocessed stack segment information item in the stack segment information map remains to be processed. If so, then control passes to block 404. Otherwise, the technique illustrated in FIG. 4 concludes.

In block 404, the current stack segment information item is set to be the next unprocessed stack segment information item in the stack segment information map. In block 406, the Holt-Winter triple exponential filter is applied to the seasonal trend information item that is the value of the current stack segment information item's trend attribute. In block 408, an N-step (where N is 1, 2, . . . ) forecast is computed. In block 410, a normalized residual of the forecast is computed. In block 412, a determination is made whether the normal residual exceeds a specified cutoff. If so, then control passes to block 414. Otherwise, control passes to block 422.

In block 414, a determination is made whether measured thread or stack segment intensity is above the forecast by a margin greater than a specified margin. If so, then control passes to block 416. Otherwise, control passes to block 418.

In block 416, a warning about a hypertension state is issued. Control passes to block 422.

In block 418, a determination is made whether measured thread or stack segment intensity is below the forecast by a margin greater than a specified margin. If so, then control passes to block 420. Otherwise, control passes to block 422.

In block 420, a warning about a hypotension state is issued. Control passes to block 422.

In block 422, de-seasonalized trends are computed. In block 424, trends are adjusted for a seasonal index. In block 426, a confidence level of predicted time horizons is computed. In block 428, a determination is made whether the confidence level of a predicted time horizon exceeds a specified threshold. If so, then control passes to block 430. Otherwise, control passes back to block 402.

In block 430, a warning about saturation or an endpoint state in the horizon is issued. Control passes back to block 402.

Splitting a Stack Segment at a Branch Point Before or after a Stack Frame

Figure 5A:
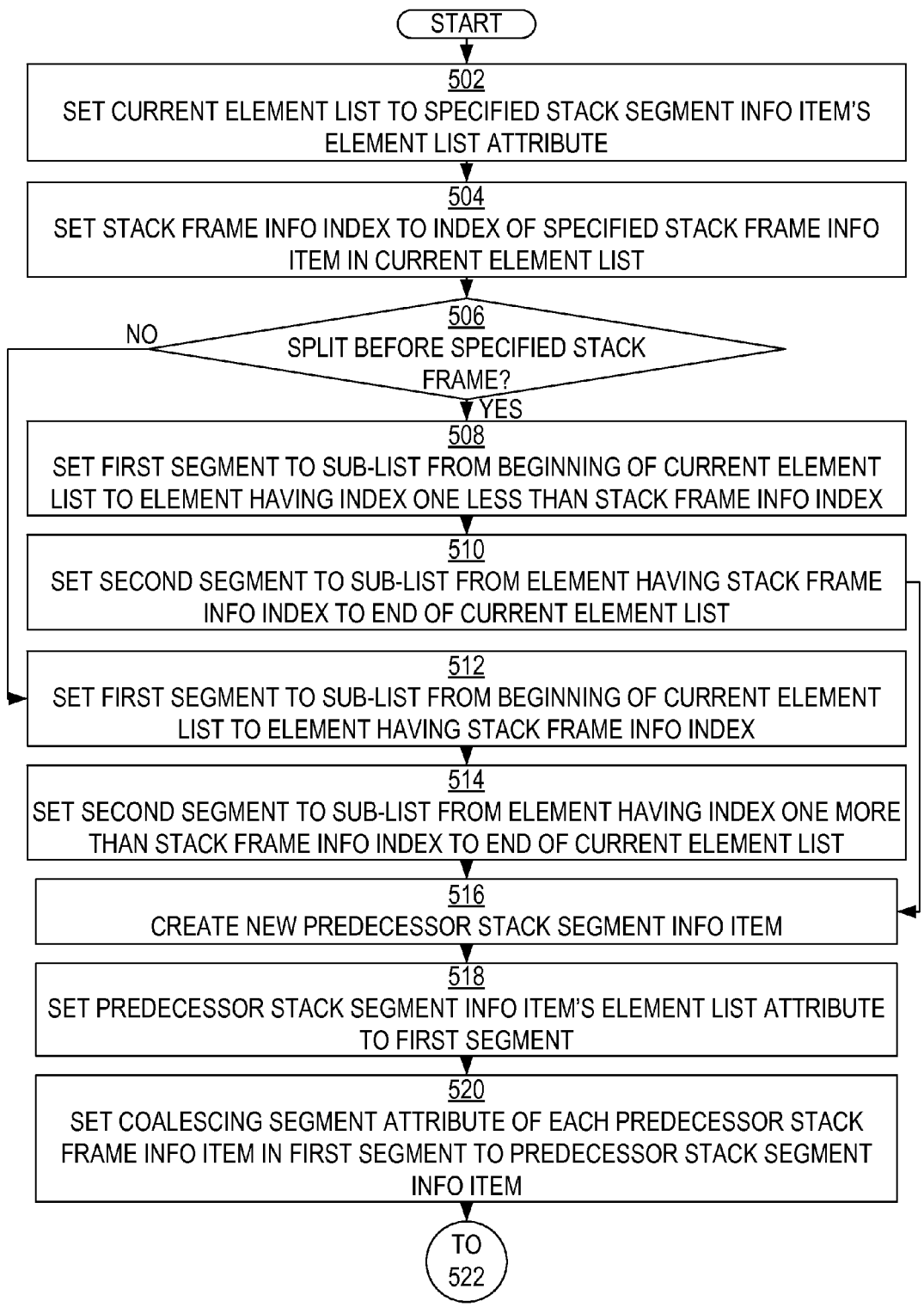
FIGS. 5A-C show a flow diagram that illustrates an example of a technique for splitting a stack segment at a branch point before or after a stack frame, according to an embodiment of the invention.
Figure 5B:
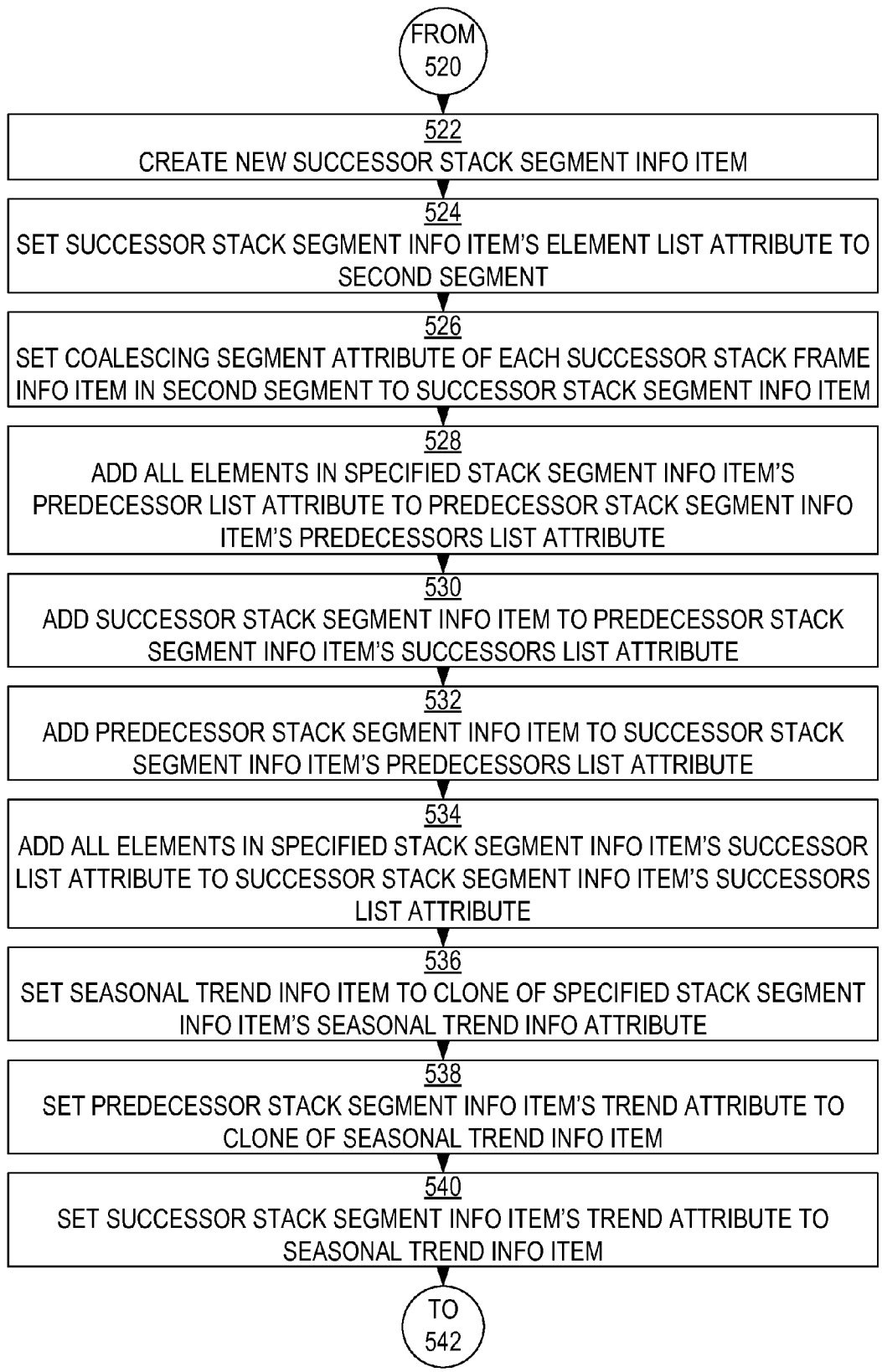
Figure 5C:
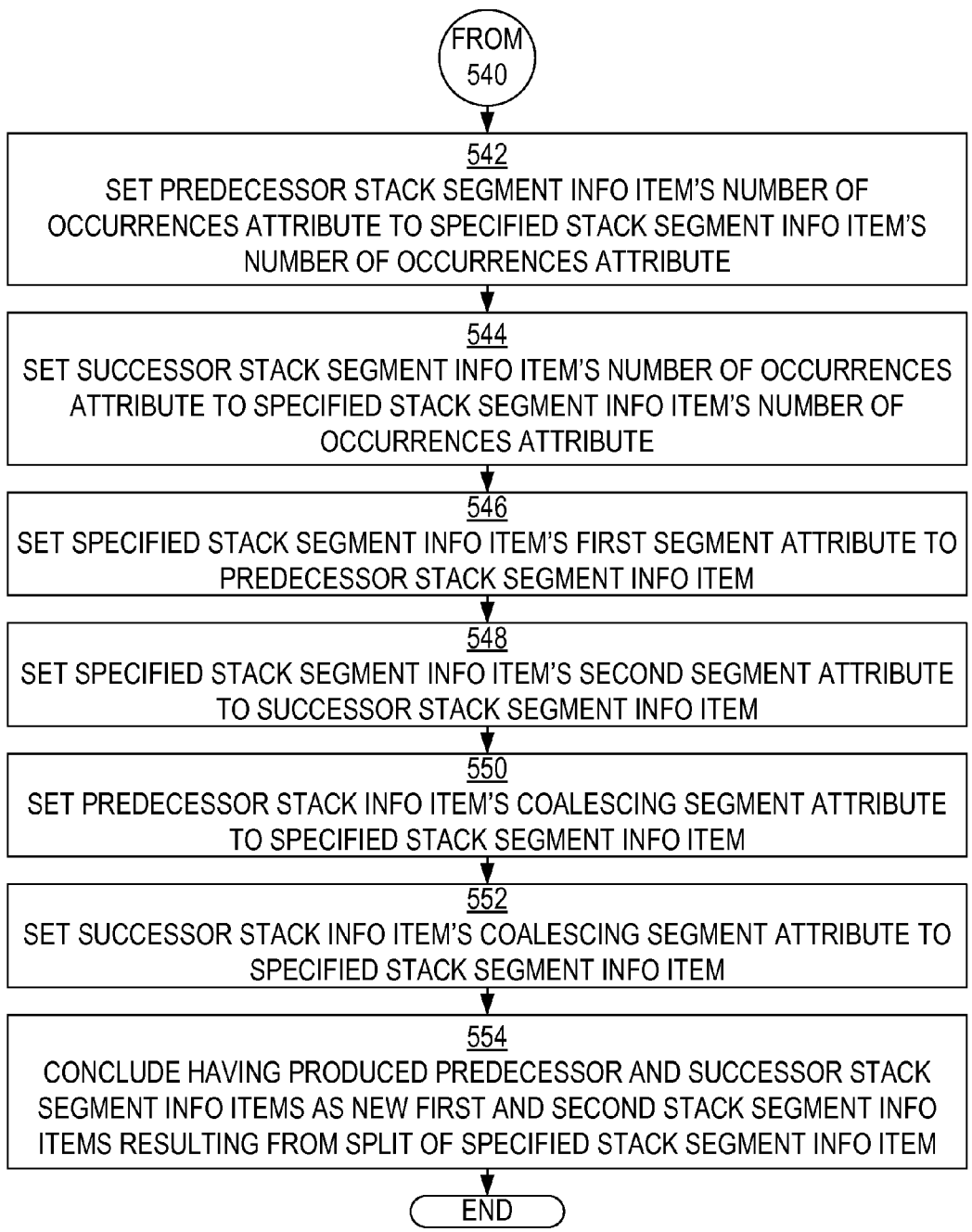

FIGS. 5A-C show a flow diagram that illustrates an example of a technique for splitting a stack segment at a branch point before or after a stack frame, according to an embodiment of the invention. The technique can be performed relative to a specified stack segment information item and a corresponding specified stack frame information item. The technique can be invoked with directions to perform the split either before or after the stack frame represented by the specified stack frame information item. The technique can produce a pair (first and second) of new stack segment information items resulting from the split. Referring first to FIG. 5A, in block 502, the current element list is set to be the value of the element list attribute of the specified stack segment information item. In block 504, a stack frame information index is set to be the index of the specified stack frame information item within the current element list. In block 506, a determination is made whether the split is directed to be performed before the specified stack frame. If so, then control passes to block 508. Otherwise, control passes to block 512.

In block 508, a first segment is set to be a sub-list of the current element list spanning from the beginning of the current element list to the element having an index that is one less than the stack frame information index. In block 510, a second segment is set to be a sub-list of the current element list spanning from the element having the stack frame information index to the end of the current element list. Control passes to block 516.

In block 512, a first segment is set to be a sub-list of the current element list spanning from the beginning of the current element list to the element having the stack frame information index. In block 514, a second segment is set to be a sub-list of the current element list spanning from the element having an index that is one more than the stack frame information index to the end of the current element list. Control passes to block 516.

In block 516, a new predecessor stack segment information item is created. In block 518, an element list attribute of the new predecessor stack segment information item is set to be the first segment. In block 520, for each predecessor stack frame information item in the first segment, the coalescing segment attribute of the predecessor stack frame information item is set to be the new predecessor stack segment information item. An exception can be raised if the value of that coalescing segment attribute was not previously equal to the specified stack segment information item that is being split. Control passes to block 522 on FIG. 5B.

Referring now to FIG. 5B, in block 522, a new successor stack segment information item is created. In block 524, an element list attribute of the new successor stack segment information item is set to be the second segment. In block 526, for each successor stack frame information item in the second segment, the coalescing segment attribute of the successor stack frame information item is set to be the new successor stack segment information item. An exception can be raised if the value of that coalescing segment attribute was not previously equal to the specified stack segment information item that is being split.

In block 528, all of the elements in the predecessors list attribute of the specified stack segment information item being split are added to the predecessors list attribute of the predecessor stack segment information item. In block 530, the successor stack segment information item is added to the successors list attribute of the predecessor stack segment information item. In block 532, the predecessor stack information item is added to the predecessors list attribute of the successor stack segment information item. In block 534, all of the elements in the successors list attribute of the specified stack segment information item being split are added to the successors list attribute of the successor stack segment information item.

In block 536, the seasonal trend information item is set to be a clone of the seasonal trend information attribute of the specified stack segment information item being split. In block 538, a trend attribute of the predecessor stack segment information item is set to be a clone of the seasonal trend information item. In block 540, a trend attribute of the successor stack segment information item is set to be the seasonal trend information item. Control passes to block 542 on FIG. 5C.

Referring now to FIG. 5C, in block 542, a number of occurrences attribute of the predecessor stack segment information item is set to be the value of the number of occurrences attribute of the specified stack segment information item being split. A total number of occurrences attribute of the predecessor stack segment information item also can be set to be the value of a total number of occurrences attribute of the specified stack segment information item being split. In block 544, a number of occurrences attribute of the successor stack segment information item is set to be the value of the number of occurrences attribute of the specified stack segment information item being split. A total number of occurrences attribute of the successor stack segment information item also can be set to be the value of a total number of occurrences attribute of the specified stack segment information item being split.

In block 546, a first segment attribute of the specified stack segment information item is set to be the predecessor stack segment information item. In block 548, a second segment attribute of the specified stack segment information item is set to be the successor stack segment information item. In block 550, a coalescing segment attribute of the predecessor stack information item is set to be the specified stack segment information item. In block 552, a coalescing segment attribute of the successor stack information item is set to be the specified stack segment information item. In block 554, with the predecessor stack segment information item and the successor stack information item having been produced as the new first and second stack segment information items resulting from the split, the technique concludes.

Coalescing the Stack Segments of a Thread

Figure 6A:
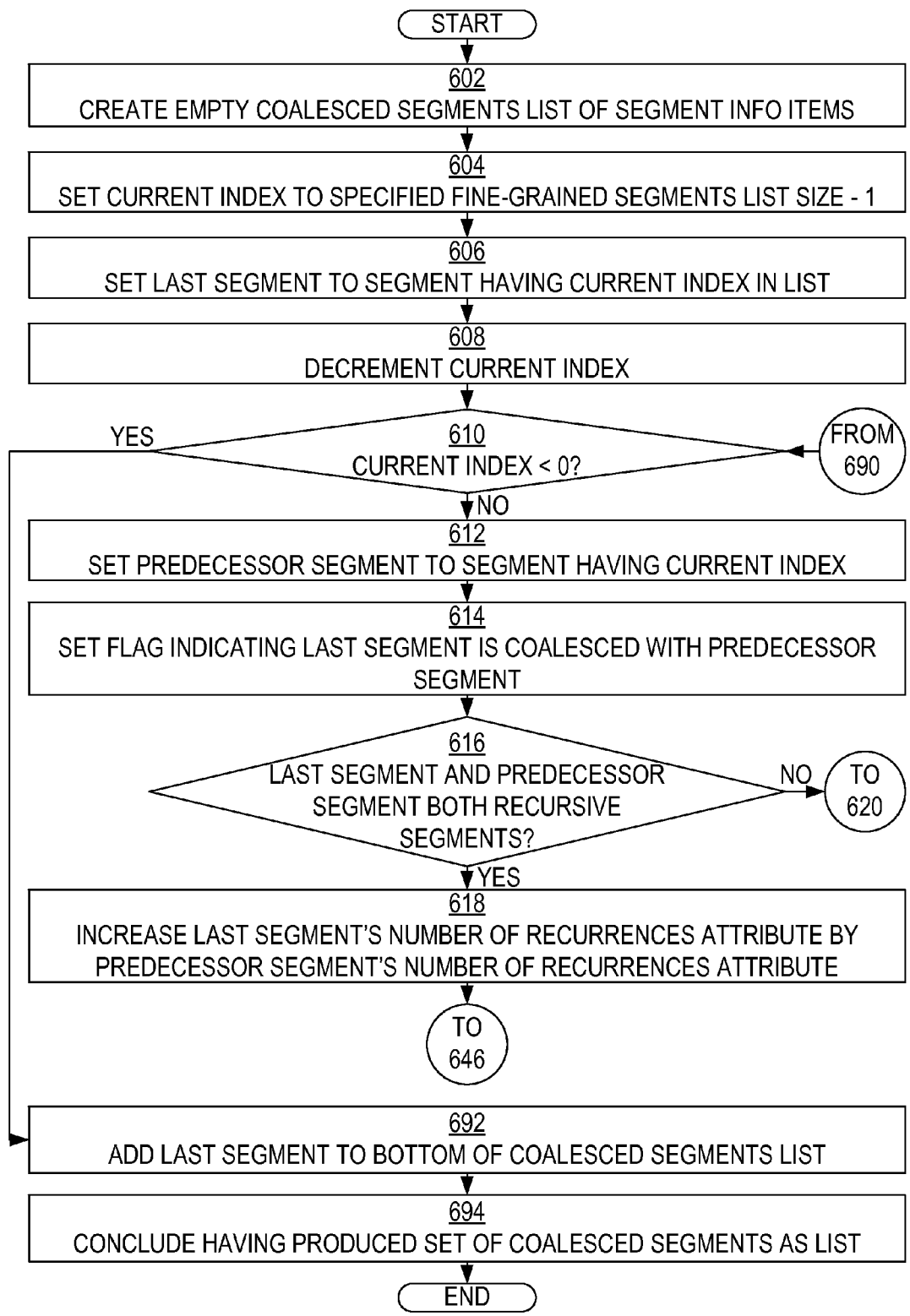
FIGS. 6A-E show a flow diagram that illustrates an example of a technique for coalescing the stack segments of a thread, according to an embodiment of the invention.

FIGS. 6A-E show a flow diagram that illustrates an example of a technique for coalescing the stack segments of a thread, according to an embodiment of the invention. The technique can be performed relative to a specified fine grained segments list. The technique can produce a set of coalesced segments. Referring first to FIG. 6A, in block 602, an empty coalesced segments list of segment information items is created. In block 604, a value of a current index is set to be one less than the size of the specified fine grained segments list. In block 606, a last segment is set to be the segment having the current index in the specified fine grained segments list. In block 608, the value of the current index is decremented. In block 610, a determination is made whether the current index is less than zero. If so, then control passes to block 692. Otherwise, control passes to block 612.

In block 612, a predecessor segment is set to be the segment having the current index in the specified fine grained segments list. In block 614, a flag, indicating whether the last segment is coalesced with the predecessor segment, is set to be true. In block 616, a determination is made whether both the last segment and the predecessor segment are recursive segments. If so, then compare whether the classification attribute of the predecessor recursive segment is same as the classification attribute of the last recursive segment. The classification attribute of a recursive segment is referred to in blocks 634 and 670. In an embodiment, this determination is accomplished by determining whether both the last segment and the predecessor segment are instances of a recursive segment information class. If both segments are recursive segments, then compare the classification attributes of the predecessor recursive segment with the classification attribute of the last recursive segment. If both attribute values are the same, then control passes to block 618. Otherwise, control passes to block 620 on FIG. 6B.

In block 618, the value of a number of recurrences attribute of the last segment is increased by a value of a number of recurrences attribute of the predecessor segment. Control passes to block 646 on FIG. 6C.

Figure 6B:
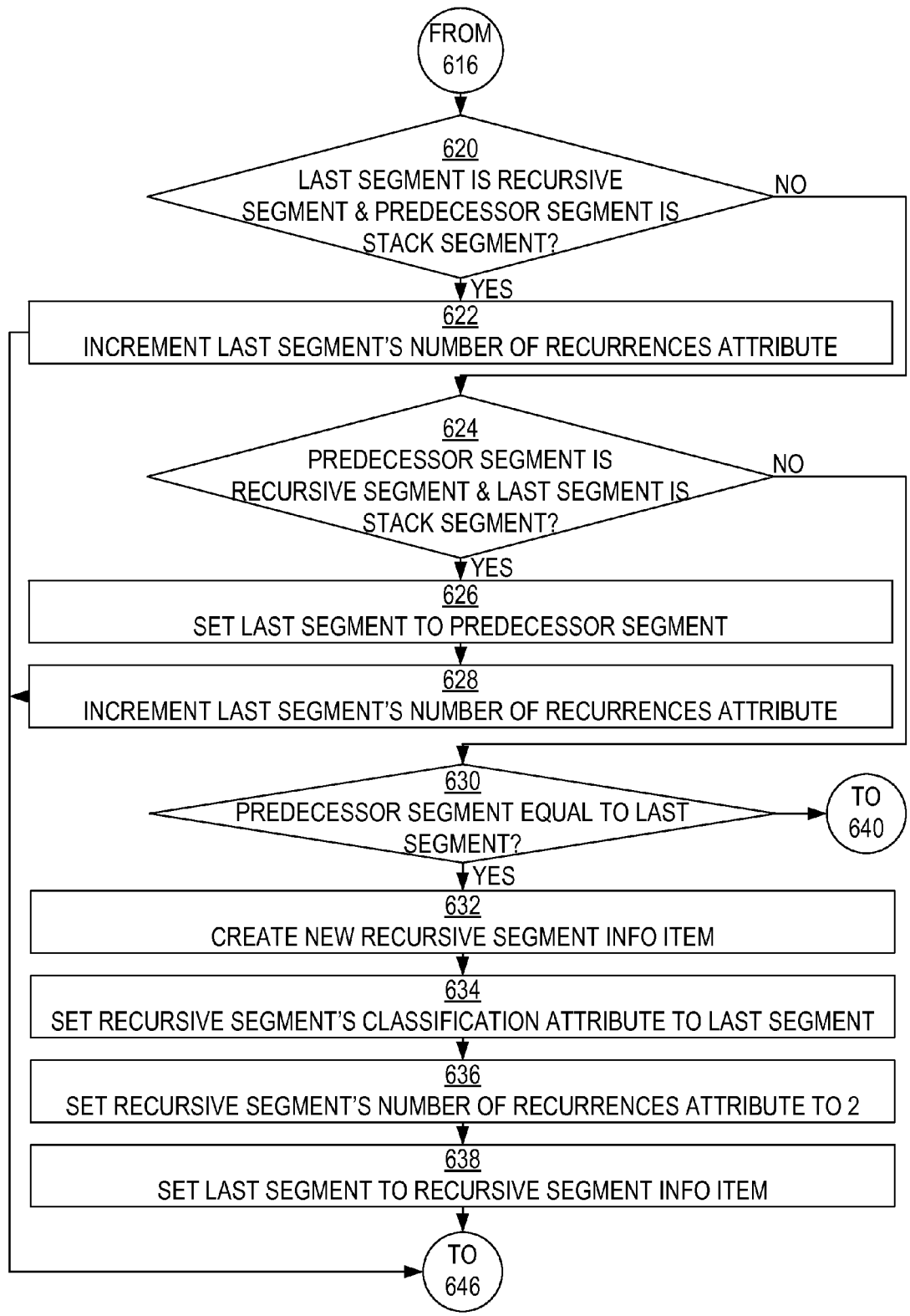

Referring now to FIG. 6B, in block 620, a determination is made whether the last segment is a recursive segment and the predecessor segment is a stack segment. If so then compare the classification attribute of the last recursive segment with the value of the predecessor segment. The classification attribute of a recursive segment is referred to in blocks 634 on FIG. 6B and 670 on FIG. 6D. If the value of the classification attribute of the last segment is same as the value of the predecessor segment, control passes to block 622. Otherwise, control passes to block 624.

In block 622, the value of a number of recurrences attribute of the last segment is incremented. Control passes to block 646 on FIG. 6C.

In block 624, a determination is made whether the predecessor segment is a recursive segment and the last segment is a stack segment. If so then compare the classification attribute of the predecessor recursive segment with the value of the last segment. The classification attribute of a recursive segment is referred to in blocks 634 on FIG. 6B and 670 on FIG. 6D. If the value of the classification attribute of the predecessor segment is same as the value of the last segment, control passes to block 626. Otherwise, control passes to block 630.

In block 626, the last segment is set to be the predecessor segment. In block 628, the value of a number of recurrences attribute of the last segment is incremented. Control passes to block 646 on FIG. 6C.

In block 630, a determination is made whether the predecessor segment is equal to the last segment. If so, then control passes to block 632. Otherwise, control passes to block 640 on FIG. 6C.

In block 632, a new recursive segment information item is created. In block 634, a classification attribute of the new recursive segment information item is set to be the last segment. In certain embodiments, this classification attribute can be checked as part of a determination of whether two adjacent recursive segments represent the recursions of the same segment indicated by the classification attribute, and consequently, the adjacent recursive segments can be coalesced into one recursive segment, as referred to in blocks 616 on FIG. 6A, and 620 and 624 on FIG. 6B. In block 636, the value of a number of recurrences attribute of the new recursive segment information item is set to two. In block 638, the last segment is set to be the new recursive segment information item. Control passes to block 646 on FIG. 6C.

Figure 6C:
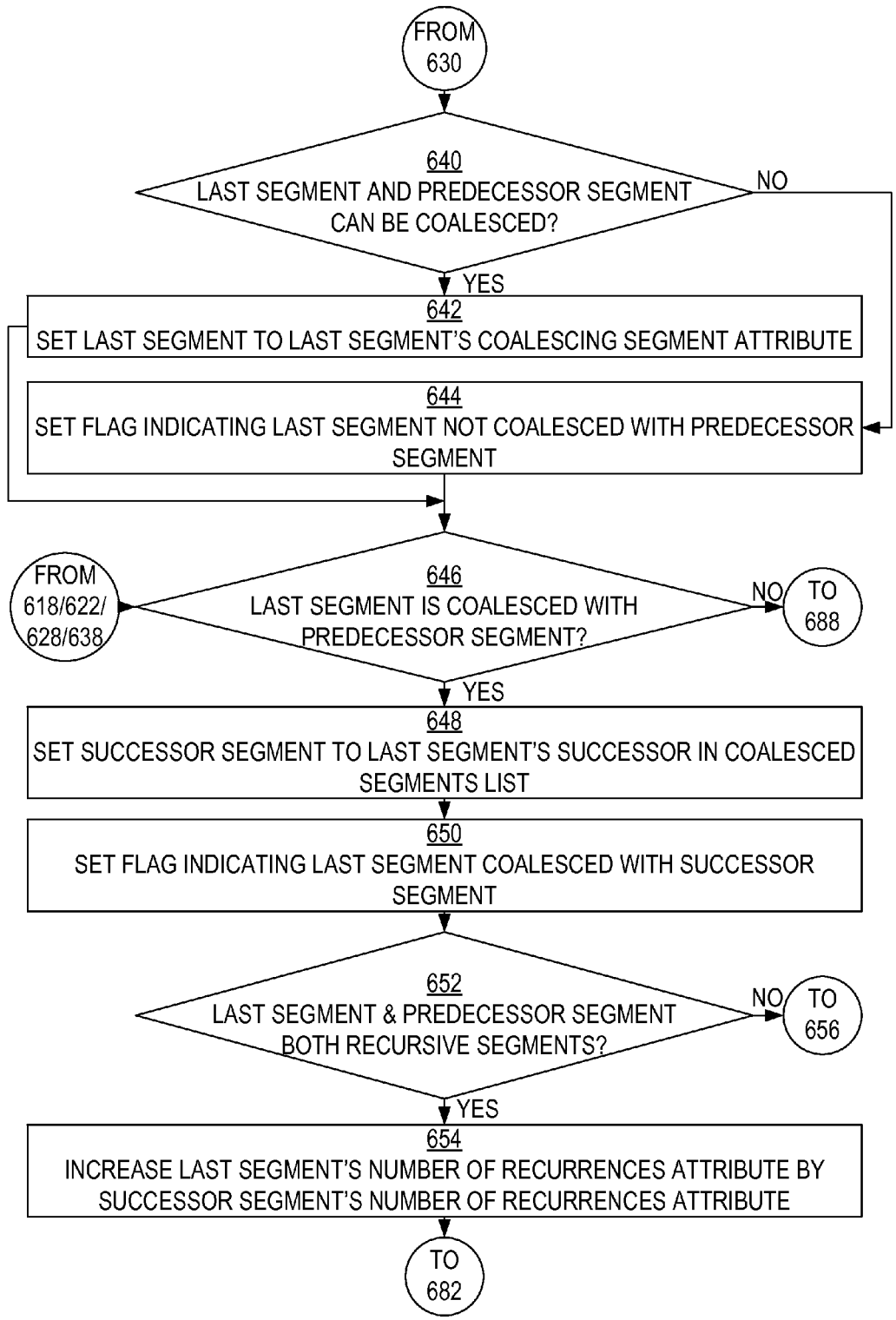

Referring now to FIG. 6C, in block 640, a determination is made whether the last segment and the predecessor segment can be coalesced. In an embodiment, the last segment and the predecessor segment can be coalesced if all of the following are true: (1) the values of the coalescing segment attributes of each are the same, (2) the values of the coalescing segment attribute of each is non-null, (3) a value of a first segment attribute of the coalescing segment attribute of the predecessor segment is the predecessor segment, and (4) a value of a second segment attribute of the coalescing segment attribute of the last segment is the last segment. In a certain embodiment two adjacent segments can be coalesced if they are split from the same coalescing segment by the blocks 546, 548, 550, and 552 on FIG. 5C. In other words, the above conditions (1) and (2) tests the effect of blocks 552 and 554, the condition (3) tests the effect of block 546, and the condition (4) tests the effect of block 548. If the last segment and the predecessor segment can be coalesced, then control passes to block 642. Otherwise, control passes to block 644.

In block 642, the last segment is set to be the value of the coalescing segment attribute of the last segment. Control passes to block 646.

In block 644, the flag (referred to in block 614) that indicates whether the last segment is coalesced with the predecessor segment is set to be false. Control passes to block 646.

In block 646, a determination is made whether the flag (referred to in block 614) that indicates whether the last segment is coalesced with the predecessor segment is true. If so, then control passes to block 648. Otherwise, control passes to block 688 on FIG. 6E.

In block 648, a successor segment is set to be a successor of a last segment in the coalesced segments list (referred to in block 602). In block 650, a flag, indicating whether the last segment is coalesced with the successor segment, is set to be true. In block 652, a determination is made whether the last segment and the successor segment are both recursive segments. If so, then compare whether the classification attribute of the successor recursive segment is same as the classification attribute of the last recursive segment. The classification attribute of a recursive segment is referred to in blocks 634 and 670. If so, then control passes to block 654. Otherwise, control passes to block 656 on FIG. 6D.

In block 654, the value of a number of recurrences attribute of the last segment is increased by a value of a number of recurrences attribute of the successor segment. Control passes to block 682 on FIG. 6E.

Figure 6D:
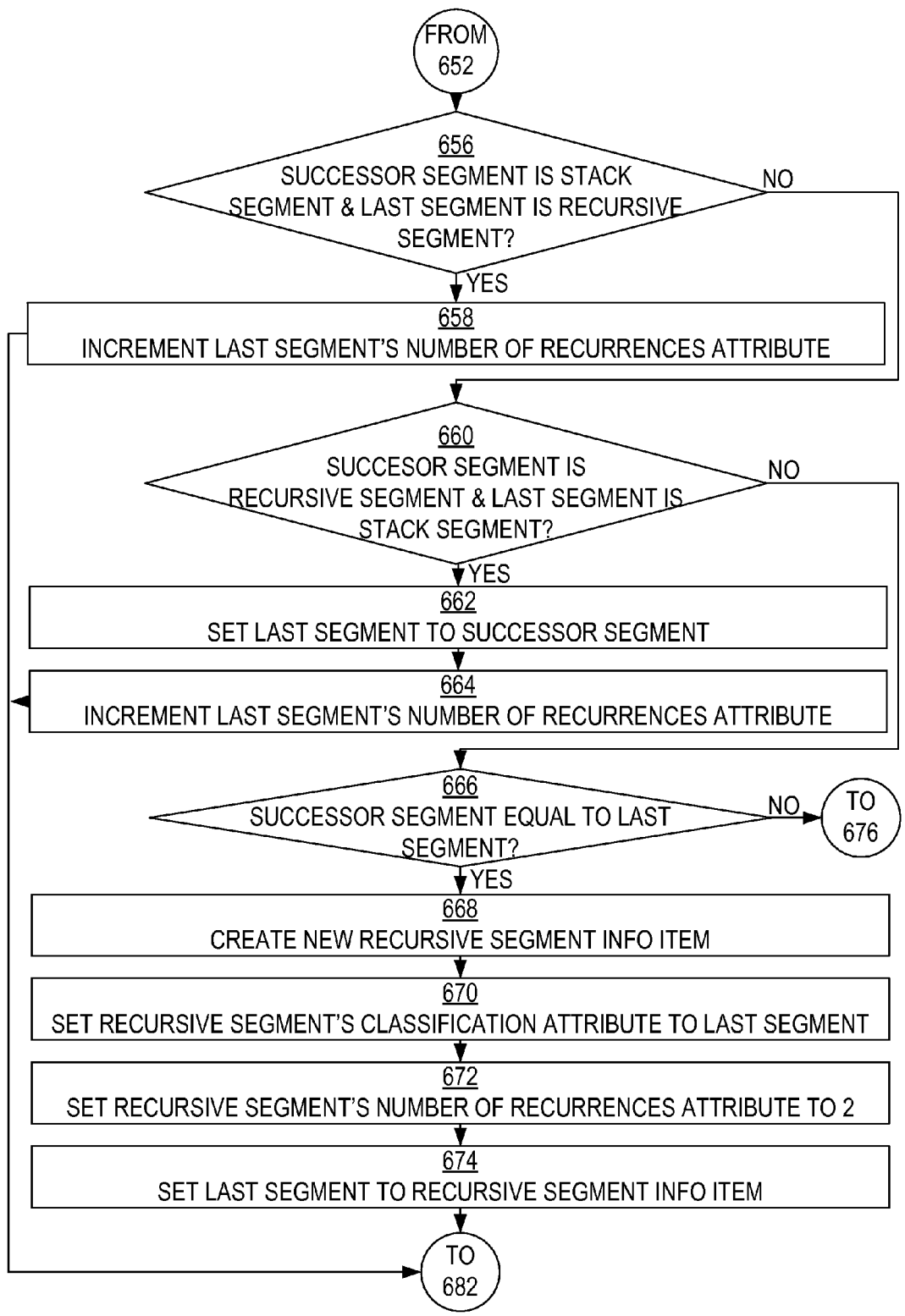

Referring now to FIG. 6D, in block 656, a determination is made whether the last segment is a recursive segment and the successor segment is a stack segment. If so then compare the classification attribute of the last recursive segment with the value of the successor segment. The classification attribute of a recursive segment is referred to in blocks 634 on FIG. 6B and 670 on FIG. 6D. If the value of the classification attribute of the last segment is same as the value of the successor segment, control passes to block 658. Otherwise, control passes to block 660.

In block 658, the value of a number of recurrences attribute of the last segment is incremented. Control passes to block 682 on FIG. 6E.

In block 660, a determination is made whether the successor segment is a recursive segment and the last segment is a stack segment. If so then compare the classification attribute of the successor recursive segment with the value of the last segment. The classification attribute of a recursive segment is referred to in blocks 634 on FIG. 6B and 670 on FIG. 6D. If the value of the classification attribute of the successor segment is same as the value of the last segment, control passes to block 662. Otherwise, control passes to block 666.

In block 662, the last segment is set to be the successor segment. In block 664, the value of a number of recurrences attribute of the last segment is incremented. Control passes to block 682 on FIG. 6E.

In block 666, a determination is made whether the successor segment is equal to the last segment. If so, then control passes to block 668. Otherwise, control passes to block 676 on FIG. 6E.

In block 668, a new recursive segment information item is created. In block 670, a classification attribute of the new recursive segment information item is set to be the last segment. In certain embodiments, this classification attribute can be checked as part of a determination of whether two adjacent recursive segments represent the recursions of the same segment indicated by the classification attribute, and consequently, the adjacent recursive segments can be coalesced into one recursive segment, as referred to in blocks 616 on FIG. 6A, and 620 and 624 on FIG. 6B. In block 672, the value of a number of recurrences attribute of the new recursive segment information item is set to two. In block 674, the last segment is set to be the new recursive segment information item. Control passes to block 682 on FIG. 6E.

Figure 6E:
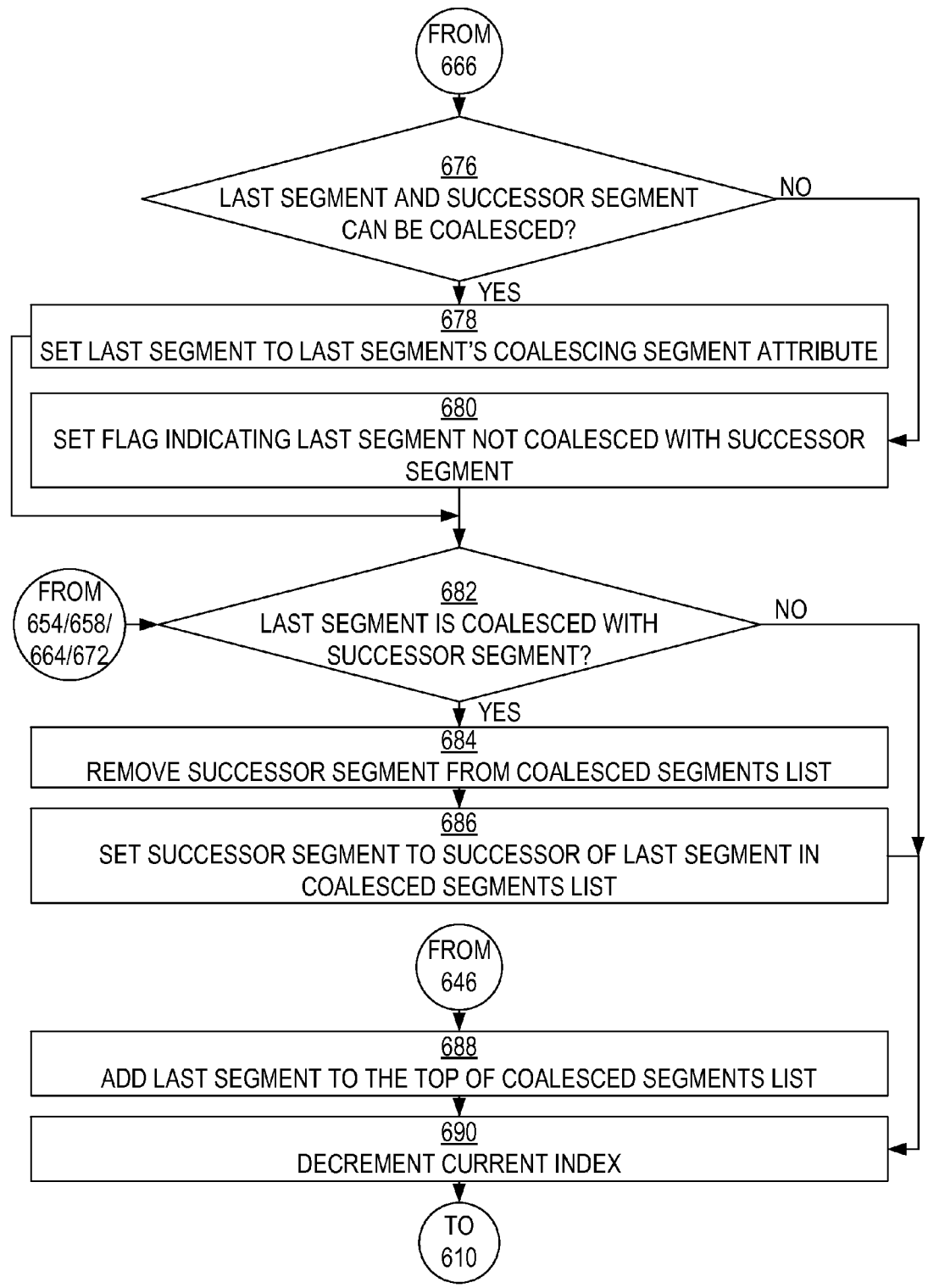

Referring now to FIG. 6E, in block 676, a determination is made whether the last segment and the successor segment can be coalesced. In an embodiment, the last segment and the successor segment can be coalesced if all of the following are true: (1) the values of the coalescing segment attributes of each are the same, (2) the values of the coalescing segment attribute of each is non-null, (3) a value of a first segment attribute of the coalescing segment attribute of the last segment is the last segment, and (4) a value of a second segment attribute of the coalescing segment attribute of the successor segment is the successor segment. In a certain embodiment two adjacent segments can be coalesced if they are split from the same coalescing segment by the blocks 546, 548, 550, and 552 on FIG. 5C. In other words, the above conditions (1) and (2) tests the effect of blocks 552 and 554, the condition (3) tests the effect of block 546, and the condition (4) tests the effect of block 548. If the last segment and the successor segment can be coalesced, then control passes to block 678. Otherwise, control passes to block 680.

In block 678, the last segment is set to be the value of the coalescing segment attribute of the last segment. Control passes to block 682 on FIG. 6E.

In block 680, the flag (referred to in block 650) that indicates whether the last segment is coalesced with the successor segment is set to be false. Control passes to block 682.

In block 682, a determination is made whether the flag (referred to in block 650) that indicates whether the last segment is coalesced with the successor segment is true. If so, then control passes to block 684. Otherwise, control passes to block 690.

In block 684, the successor segment is removed from the coalesced segments list (referred to in block 602). In block 686, the successor segment is set to be the successor of the last segment in the coalesced segments list. Control passes to block 690.

In block 688, the last segment is added to the beginning of the coalesced segments list (referred to in block 602). Control passes to block 690.

In block 690, the value of the current index is decremented. Control passes back to block 610 on FIG. 6A.

Referring again to FIG. 6A, in block 692, the last segment is added to the bottom of the coalesced segments list (referred to in block 602). In block 694, with the set of coalesced segments having been produced in the form of the coalesced segments list, the technique concludes.

Figure 7A:
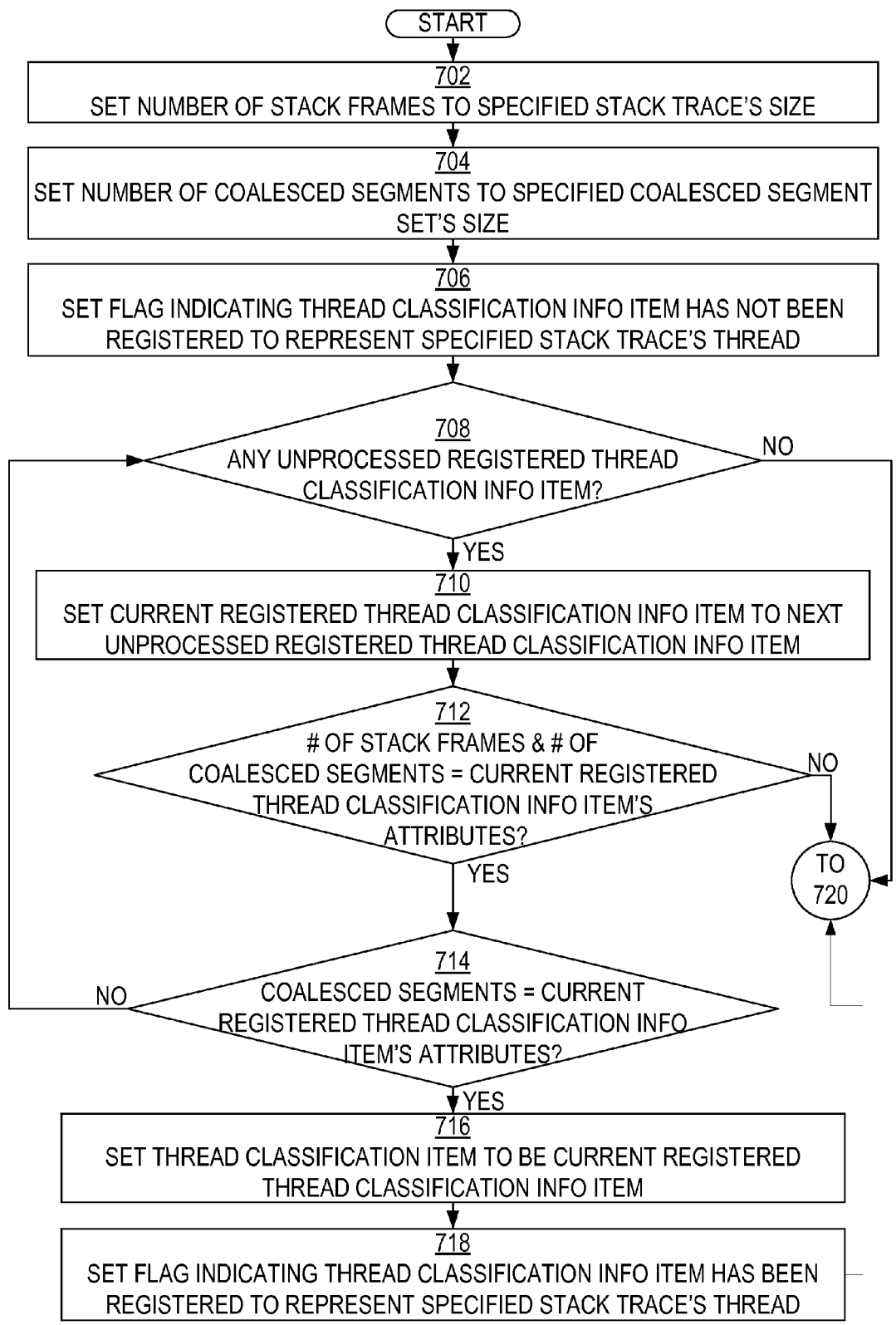
FIGS. 7A-B show a flow diagram that illustrates an example of a technique for registering a thread classification item for a specified stack trace and a specified set of coalesced segments, according to an embodiment of the invention.
Figure 7B:
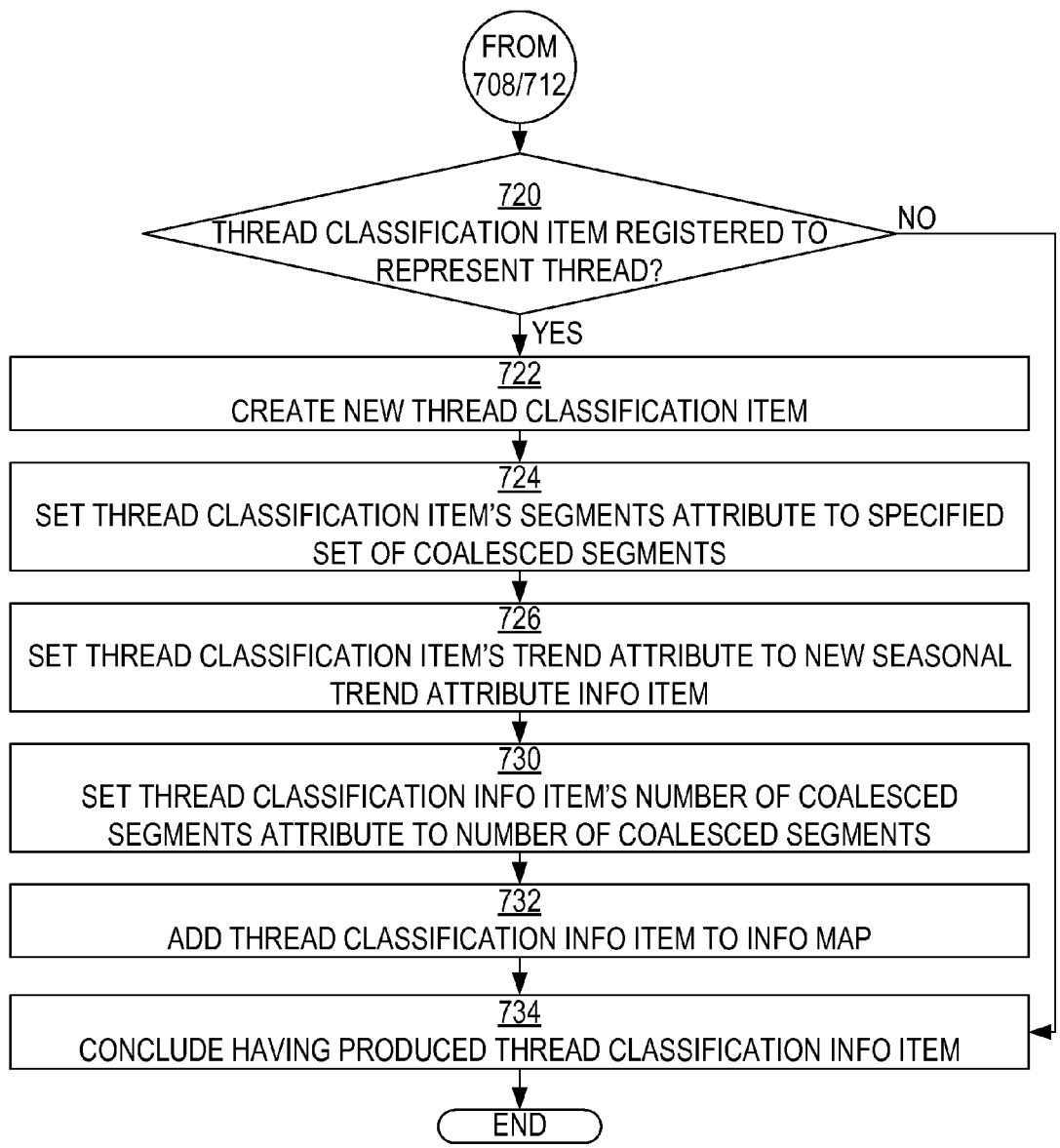

Registering a Thread Classification Signature for a Stack Trace and Coalesced Segments of a Thread FIGS. 7A-B show a flow diagram that illustrates an example of a technique for registering a thread classification item for a specified stack trace and a specified set of coalesced segments, according to an embodiment of the invention. The technique can be performed relative to a specified stack trace and a specified set of coalesced segments. The technique can produce a thread classification information item. Referring first to FIG. 7A, in block 702, a number of stack frames is set to be the size of the specified stack trace. In block 704, a number of coalesced segments is set to be the size of the specified set of coalesced segments. In block 706, a flag, which indicates whether a thread classification information item has been registered to represent the thread corresponding to the specified stack trace, is set to be false. In block 708, a determination is made whether any unprocessed registered thread classification information item remains in the thread classification information map. If so, then control passes to block 710. Otherwise, control passes to block 720 on FIG. 7B.

In block 710, the current registered thread classification information item is set to be the next unprocessed registered thread classification information item in the thread classification information map. In block 712, a determination is made whether both (1) the number of stack frames is equal to the number of stack frames attribute of the current registered thread classification information item and (2) the number of coalesced segments is equal to the number of coalesced segments attribute of the current registered thread classification information item. If so, then control passes to block 714. Otherwise, control passes to block 720 on FIG. 7B.

In block 714, a determination is made whether, for each index value, the segment of the coalesced segments having that index value is equal to the segment attribute having that index value in the current registered thread classification information item. If so, then control passes to block 716. Otherwise, control passes back to block 708.

In block 716, the thread classification information item is set to be the current registered thread classification information item. In block 718, the flag (referred to in block 706) that indicates whether a thread classification information item has been registered to represent the thread corresponding to the specified stack trace is set to be true. Control passes to block 720.

Referring now to FIG. 7B, in block 720, a determination is made whether the flag (referred to in block 706) that indicates whether a thread classification information item has been registered to represent the thread corresponding to the specified stack trace is true. If so, then control passes to block 734. Otherwise, control passes to block 722.

In block 722, a new thread classification information item is created. In block 724, a segments attribute of the new thread classification information item is set to be the specified set of coalesced segments. In block 726, a trend attribute of the new thread classification information item is set to be a new seasonal trend information item. In block 728, a number of stack frames attribute of the new thread classification information item is set to be the number of stack frames. In block 730, a number of coalesced segments attribute of the new thread classification information item is set to be the number of coalesced segments. In block 732, the new thread classification information item is added to the thread classification information map. This addition registers the new thread classification information item to represent the signature for an equivalence class of threads represented by the thread corresponding to the specified stack trace. Control passes to block 734.

In block 734, with the thread classification information item having been produced, the technique concludes.

Updating Stack Classification Statistics

Figure 8:
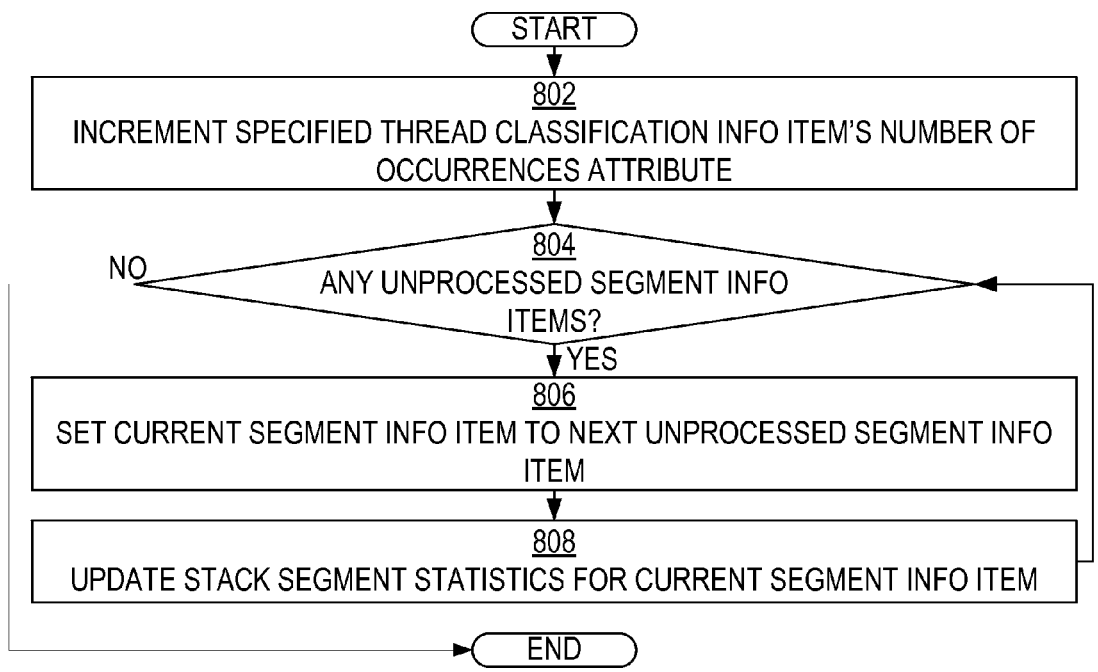
FIG. 8 is a flow diagram that illustrates an example of a technique for updating thread classification statistics for a specified thread classification information item, according to an embodiment of the invention.

FIG. 8 is a flow diagram that illustrates an example of a technique for updating thread classification statistics for a specified thread classification information item, according to an embodiment of the invention. The technique can be performed relative to a specified thread classification information item. In block 802, the value of a number of occurrences attribute of the specified thread classification information item is incremented. A value of a total number of occurrences attribute of the specified thread classification information item also can be incremented. In block 804, a determination is made whether any unprocessed segment information items remain in the specified thread classification information item. If so, then control passes to block 806. Otherwise, the technique concludes.

In block 806, the current segment information item is set to be the next unprocessed segment information item in the specified thread classification information item. In block 808, the stack segment statistics for the current segment information item are updated. A technique for updating stack segment statistics for a specified segment information item is disclosed below with reference to FIG. 9. Control passes back to block 804.

Updating Stack Segment Statistics

Figure 9:
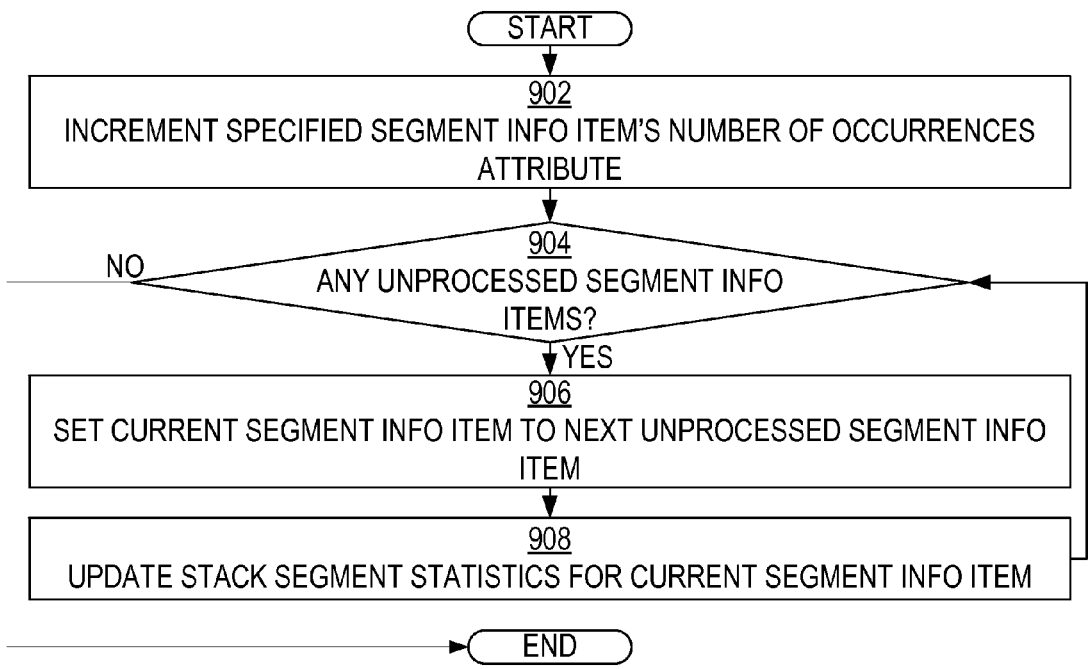
FIG. 9 is a flow diagram that illustrates an example of a technique for updating stack segment statistics for a specified segment information item, according to an embodiment of the invention.

FIG. 9 is a flow diagram that illustrates an example of a technique for updating stack segment statistics for a specified segment information item, according to an embodiment of the invention. The technique can be performed relative to a specified segment information item. In block 902, the value of a number of occurrences attribute of the specified segment information item is incremented. A value of a total number of occurrences attribute of the specified segment information item also can be incremented. In block 904, a determination is made whether any unprocessed segment information items remains in the specified segment information item. If so, then control passes to block 906. Otherwise, the technique concludes.

In block 906, the current segment information item is set to be the next unprocessed segment information item in the specified segment information item. In block 908, the stack segment statistics for the current segment information item are updated using this technique of FIG. 9. Control passes back to block 904.

Seasonal Trending and Forecasting Based on Java Heap Size, Thread Intensity, and Stack Segment Intensity Measurements A cloud control system for JAVA platform services can monitor the time series data for JAVA heap allocation to estimate trends and to forecast memory capacity requirements. By detecting seasonal trends and forecasting the memory capacity requirements, the system can dynamically reallocate shared system memory among JVMs to enable elasticity in resource allocation. Forecasting of capacity requirements involves estimation of the JAVA heap growth rate. Java heap allocation is measured by full garbage collection cycles that run at irregular time intervals. Estimation of JAVA heap growth rate involves division by random time intervals which is complicated by the irregular time intervals that intermittently get arbitrarily close to zero. The noise in growth rate measurement is a ratio of two Gaussian distributions yielding Cauchy distribution, which can be hard to filter. The mean and standard deviation of the Cauchy distribution are undefined in the sense that a large number of data points do not yield more accurate estimate of the mean and standard deviation than does a single data point. Increasing the pool of samples can increase the likelihood of encountering sample points with a large absolute value corresponding to division by a time close interval. Unlike JAVA heap size measurements whose sampling intervals are irregular due to the irregularity of full garbage collection cycles, the thread or stack segment intensity measurements can be sampled at regular intervals to avoid time-close intervals. Even so, the same techniques described herein for trending of JAVA heap allocation can be applied to seasonal trending and forecasting of thread and stack segment intensity measurements. The technique can adjust for the variable latencies due to the CPU scheduling of the threads and the interference of the Full GC cycles, which adds additional variability to the latencies of the sampling threads. The technique can also adjust for the variable sampling intervals due to the variable computation time required to classify the stack segments.

A Holt-Winter triple exponential filter, published in 1957 and 1960, can be used for seasonal trending and forecasting. C. C. Holt, "Forecasting Trends and Seasonal by Exponentially Weighted Averages," Office of Naval Research Memorandum, no. 52 (1957) is incorporated by reference herein. P. R. Winters, "Forecasting Sales by Exponentially Weighted Moving Averages," Management Science, vol. 6, no. 3, p. 324-342 (1960) is incorporated by reference herein. Wright extended the Holt-Winter formulae in 1986 to support irregular time intervals. D. J. Wright, "Forecasting data published at irregular time intervals using an extension of Holt's method," Management Science, vol. 32, no. 4, pp. 499-510 (1986) is incorporated by reference herein. In 2008, Hanzak proposed an adjustment factor for time-close intervals. T. Hanzak, "Improved Holt Method for Irregular Time Series," WDS'08 Proceedings Part I, pp. 62-67 (2008) is incorporated by reference herein.

The adjustment factor for time close intervals, which is meant to compensate for higher relative intensity of noise due to a random time-close interval in the rate estimate, can inadvertently dampen the rate of change estimates if the time interval decreases monotonically during a congestion caused by memory leaks or deadlocks. Polynomial time complexity on the total size of heap of full garbage collection algorithm can result in decreasing JVM runtime intervals as congestion worsens. In case of JAVA memory leaks, as the time interval decreases, the run time can decrease but the measurement time can increase because the JVM can be frozen longer for full garbage collection. If the JVM is frozen during full garbage collection, new requests can be queued up outside the JVM, with some portion redistributed to other JVMs. The backlog can accelerate the rate of change of the heap usage during the subsequent run time. In an embodiment, Hanzak's adjustment for time-close intervals is used for trending and forecasting of JAVA heap allocation and to track the accelerating heap growth rate.

In an embodiment, exponential moving averages can be applied to smooth out the time-series data from full garbage collection cycles, to estimate the growth rate, acceleration of growth rate, seasonal trend, error residual of forecast, and absolute deviation of forecast, to enable outlier detection and forecasting of JAVA memory heap allocation. An embodiment of the invention can track the acceleration of growth rate due to congestions. Disclosed herein are new adjustment factors that give more weights to more recent sample points when the measurement time is increasing. These adjustment factors can reduce to Hanzak's adjustment factor if the measurement time is a negligible constant and the time interval is comprised mostly by the run time. Embodiments of the invention can include adaptive scaling of the time for numerical stability, i.e. to avoid underflow of the double precision floating point representation. Time intervals can be adaptively scaled proportionally so that the average time interval is scaled close to 1. Estimations can be tracked in parallel by three or more independent filters running at different time scales. Depending on the time scale, these parallel filters can serve as multiple policies for predicting seasonal trends, long-term capacity demands, short term end-points (out-of-memory errors), etc. Embodiments of the invention utilize improved formulae for seasonal indexing to select, from among adjacent indices, the seasonal index that minimizes the normalized error residual. Embodiments of the invention can apply a supervisory control loop to fit the model by non-linear regression for each JVM instance (capturing the operating characteristics of the tenants, applications, users, etc.) for estimating various filter parameters and seasonal factors. Embodiments of the invention can push the filter parameters and seasonal factors from a supervisory controller to update the filters embedded in each JVM (using MBean with Hotspot or JRockit instrumentations).

In an embodiment of the invention, a fourth and a fifth exponential filters, in addition to the Holt-Winter triple exponential filters, are used to trend the mean and deviation of forecast error residual to compute the normalized error residual. The mean of forecast error residual can be interpreted as the bias of an identified model in a filter. Such a bias can indicate presence of a level spike, a temporary level shift, a permanent level shift, or a level drift. The deviation of forecast error residual can indicate variance change in the time series data. In an embodiment, the magnitude of variance change can effect the tolerance of a filter for detecting outliers. A measurement is detected as an outlier if its forecast error residual is larger than a percentage of the moving average of forecast error residual deviations. Conceptually, an outlier is a measurement which is not explained by the trend model identified in the filter, hence a cluster of outliers can indicate an anomaly that can only be explained by some extraneous causes. Embodiments of the invention adapts the tolerance of a filter for outlier detection depending on the variance change in the measurements. This technique reduces alert fatigue by reducing the number of outlier alerts when high variance change persists in the system.

In an embodiment of the invention, Holt-Winter triple exponential filter can be applied for seasonal trending and forecasting of JVM heap usage to efficiently achieve elasticity in JVM memory allocation. The standard Holt-Winter triple exponential filter, which can be applied to demand forecasting from regular time series, can be specially adjusted to work for the random time intervals with irregular time-close intervals. Embodiments of the invention can apply the Wright formula for irregular time intervals and Hanzak's adjustment for time-close intervals for trending and forecasting of JAVA heap allocation. A non-trivial selection of a structure of the filters suitable for the random time intervals seen in JVM full garbage collection can be performed. The structure of the Holt-Winter-Wright-Hanzak filters can be derived from first principles to systematically devise the adaptations to match the time series generated by JVM full garbage collection cycles. A non-trivial selection of extensions of the filters useful to predict JVM memory usage trends can be performed. The selected extensions can include, for example, an extension to filter the acceleration of growth rate (in order to track the congestions), an extension to run in different time scales in parallel (since irregular time intervals have some correlation to the seasons), and an extension to select the seasonal index (analogous to fuzzy logic) by minimizing the normalized error residual (which can be used to react to discontinuity caused by soft references). Embodiments of the invention can complement and augment an embedded system with a non-trivial supervisory controller and framework that applies non-linear regression for parameter estimation to tune embedded filters.

Techniques described herein for seasonal trending, forecasting, anomaly detection, and endpoint prediction can be added to an existing supervisory control framework, such as the CARE control framework discussed above. The model identification by a supervisory controller can provide a baseline for detecting outliers. A cluster of outliers can indicate anomalies in the system. Some of these anomalies can represent leading indicators for system faults and outages. When critical anomalies are detected or process endpoints are predicted, the system can generate automatic diagnostic repository (ADR) incident reports with thread dumps and heap dumps to aid in debugging the applications, configurations, and system glitches. The system can also report critical alerts to an enterprise manager (EM) cloud control.

In an embodiment, formulae for exponential moving averages are applied to smooth out time-series data, locally linear trend, seasonal trend, error residual of forecast, and absolute deviation of forecast for monitoring and forecasting of resource utilization measures such as memory heap usage and thread or stack segment intensity. In an embodiment, the formulae can be based on Brown's exponential filter proposed in 1956, Holt's double exponential filter proposed in 1957, Winters' triple exponential filter proposed in 1960, Wright's extension for irregular time intervals proposed in 1986, Hanzak's adjustment factor for time-close intervals proposed in 2008, and outlier detection and clipping. The following publications are included by reference herein: R. G. Brown, "Exponential Smoothing for Predicting Demand," Cambridge, Arthur D. Little Inc. (1956), p. 15; C. C. Holt, "Forecasting Trends and Seasonal by Exponentially Weighted Averages," Office of Naval Research Memorandum, no. 52, (1957); P. R. Winters, "Forecasting Sales by Exponentially Weighted Moving Averages," Management Science, vol. 6, no. 3, p. 324-342, (1960); D. J. Wright, "Forecasting data published at irregular time intervals using an extension of Holt's method," Management Science, vol. 32, no. 4, pp. 499-510 (1986); T. Hanzak, "Improved Holt Method for Irregular Time Series," WDS'08 Proceedings Part I, pp. 62-67 (2008); and S. Maung, S. W. Butler and S. A. Henck, "Method and Apparatus for process Endpoint Prediction based on Actual Thickness Measurements," U.S. Pat. No. 5,503,707 (1996).

Exponential Weighted Moving Average

Time series data can be smoothed by normalized weighted sum of the data points where the weights are selected appropriately depending on the autocorrelation of the time series (in autoregressive moving average model), length of the time intervals, and other factors:

$$\bar{x}_n = \frac{1}{\sum_{i=0}^{n} w_i} [w_n x_n + w_{n-1} x_{n-1} + w_{n-2} x_{n-2} + \ldots + w_0 x_0]$$

Exponential moving average is a weighted sum of the data points where the weights $$\frac{1}{\sum_{i=0}^{n} w_i} w_k = \alpha(1-\alpha)^k, 0 < \alpha < 1,$$

are in exponential form. This form assumes that the sampling interval is regular:

$$\bar{x}_n = \alpha x_n + \alpha(1-\alpha) x_{n-1} + \alpha(1-\alpha)^2 x_{n-2} + \ldots + \alpha(1-\alpha)^n x_0$$

$$= \alpha[x_n + (1-\alpha) x_{n-1} + (1-\alpha)^2 x_{n-2} + \ldots + (1-\alpha)^n x_0]$$

$$= \alpha \sum_{i=0}^{n} (1-\alpha)^{n-i} x_i$$

The above expression gives the normalized exponentially weighted sum of data series for regular time intervals. The parameter $\alpha$ is a normalization factor, as $n \to \infty$:

$$\alpha = \frac{1}{\sum_{i=0}^{n} (1-\alpha)^{n-i}}, n \to \infty$$

$$\bar{x}_n = \frac{1}{\sum_{i=0}^{n} (1-\alpha)^{n-i}} \sum_{i=0}^{n} (1-\alpha)^{n-i} x_i$$

This series is equivalently represented in a sequential form:

$$\bar{x}_n = \alpha x_n + (1-\alpha) \bar{x}_{n-1}$$

It can be shown by expanding the sequential form recursively that it is equivalent to the normalized exponentially weighted sum:

$$\bar{x}_n = \alpha x_n + (1-\alpha)[\alpha x_{n-1} + (1-\alpha) \bar{x}_{n-2}]$$

$$= \alpha x_n + \alpha(1-\alpha) x_{n-1} + (1-\alpha)^2 \bar{x}_{n-2}$$

$$= \alpha x_n + \alpha(1-\alpha) x_{n-1} + (1-\alpha)^2 [\alpha x_{n-2} + (1-\alpha) \bar{x}_{n-3}]$$

$$= \alpha x_n + \alpha(1+\alpha) x_{n-1} + \alpha(1-\alpha)^2 x_{n-2} + (1-\alpha)^3 \bar{x}_{n-3}$$

$$= \alpha x_n + \alpha(1-\alpha) x_{n-1} + \alpha(1-\alpha)^2 x_{n-2} + (1-\alpha)^3 [\alpha x_{n-3} + (1-\alpha) \bar{x}_{n-4}]$$

$$= \alpha x_n + \alpha(1-\alpha) x_{n-1} + \alpha(1-\alpha)^2 x_{n-2} + \ldots + \alpha(1-\alpha)^n x_0$$

Wright's Extension for Irregular Time Intervals

Wright (cited above) extended the formula for normalized exponentially weighted sum for irregular time intervals:

$$\bar{x}_{t_n} = \frac{1}{\sum_{i=0}^{n} (1-\alpha)^{(t_n-t_i)}} \sum_{i=0}^{n} (1-\alpha)^{(t_n-t_i)} x_{t_i}$$

Denoting the normalization factor by $u_{t_n}$ and the weighted sum by $A_{t_n}$:

$$u_{t_n} = \frac{1}{\sum_{i=0}^{n} (1-\alpha)^{(t_n - t_i)}}$$

$$A_{t_n} = \sum_{i=0}^{n} (1-\alpha)^{(t_n - t_i)} x_{t_i}$$

$$\overline{x}_{t_n} = u_{t_n} A_{t_n}$$

If $b_k = (1-\alpha)^{(t_k - t_{k-1})}$, then the expression $(1-\alpha)^{(t_l - t_{l-m})}$, $l > m$, can be represented by $\pi_{l,l-m} = b_l b_{l-1} \ldots b_{l-m+1}$.

$$\pi_{l,l-m} = (1-\alpha)^{(t_l - t_{l-m})}$$
$$= (1-\alpha)^{(t_l - t_{l-1}) + (t_{l-1} - t_{l-2}) + \ldots + (t_{l-m+1} - t_{l-m})}$$
$$= (1-\alpha)^{(t_l - t_{l-1})}(1-\alpha)^{(t_{l-1} - t_{l-2})} \ldots (1-\alpha)^{(t_{l-m+1} - t_{l-m})}$$
$$= b_l b_{l-1} \ldots b_{l-m+1}$$

If the time intervals are regular, $b = b_l = b_{l-1} = \ldots = b_{l-m+1}$, this expression reduces to $$\pi_{l,l-m} = (1-\alpha)^{(l,l+m)}$$
$$= b^m$$

The sequential form for the series $u_{t_n}$ can be derived:

$$\frac{1}{u_{t_n}} = \sum_{i=0}^{n} (1-\alpha)^{(t_n - t_i)}$$
$$= (1-\alpha)^{(t_n - t_n)} + (1-\alpha)^{(t_n - t_{n-1})} + (1-\alpha)^{(t_n - t_{n-2})} + \ldots + (1-\alpha)^{(t_n - t_0)}$$

Substituting $(1-\alpha)^{(t_k - t_{k-1})} = b_k$ and $(1-\alpha)^{(t_l - t_{l-m})} = b_l b_{l-1} \ldots b_{l-m+1}$:

$$\frac{1}{u_{t_n}} = 1 + b_n + b_n b_{n-1} + \ldots + b_n b_{n-1} \ldots b_1$$
$$= 1 + b_n(1 + b_{n-1} + b_{n-1} b_{n-2} + \ldots + b_{n-1} b_{n-2} \ldots b_1),$$

It can be observed that $$\frac{1}{u_{t_{n-1}}} = (1 + b_{n-1} + b_{n-1} b_{n-2} + \ldots + b_{n-1} b_{n-2} \ldots b_1).$$

Hence, $$\frac{1}{u_{t_n}} = 1 + \frac{b_n}{u_{t_{n-1}}}$$
$$= \frac{u_{t_{n-1}} + b_n}{u_{t_{n-1}}}$$

The sequential form is derived:

$$u_{t_n} = \frac{u_{t_{n-1}}}{u_{t_{n-1}} + b_n}$$

The expression for $b_n$, that will be used subsequently is:

$$b_n = \frac{u_{t_{n-1}}(1 - u_{t_n})}{u_{t_n}}$$

Similarly, the sequential form for the series $A_{t_n}$ is derived:

$$A_{t_n} = \sum_{i=0}^{n} (1-\alpha)^{(t_n - t_i)} x_{t_i}$$
$$= (1-\alpha)^{(t_n - t_n)} x_{t_n} + (1-\alpha)^{(t_n - t_{n-1})} x_{t_{n-1}} + (1+\alpha)^{(t_n - t_{n-2})} x_{t_{n-2}} + \ldots + (1-\alpha)^{(t_n - t_0)} x_{t_0}$$

Substituting $(1-\alpha)^{(t_k - t_{k-1})} = b_k$ and $(1-\alpha)^{(t_l - t_{l-m})} = b_l b_{l-1} \ldots b_{l-m+1}$:

$$A_{t_n} = x_{t_n} + b_n x_{t_{n-1}} + b_n b_{n-1} x_{t_{n-2}} + \ldots + b_n b_{n-1} \ldots b_1 x_{t_0}$$
$$= x_{t_n} + b_n(x_{t_{n-1}} + b_{n-1} x_{t_{n-2}} + b_{n-1} b_{n-2} x_{t_{n-3}} + \ldots + b_{n-1} b_{n-2} \ldots b_1 x_{t_0})$$

It can be observed that $$A_{t_{n-1}} = x_{t_{n-1}} + b_{n-1} x_{t_{n-2}} + b_{n-1} b_{n-2} x_{t_{n-3}} + \ldots + b_{n-1} b_{n-2} \ldots b_1 x_{t_0}$$

Hence the sequential form can be obtained:

$$A_{t_n} = x_{t_n} + b_n A_{t_{n-1}}$$

The sequential form for $\overline{x}_{t_n}$ can be derived $$u_{t_n} = \frac{u_{t_{n-1}}}{u_{t_{n-1}} + \rho_n^{n-1} b_n}$$

Substituting for $b_n$ $$\overline{x}_{t_n} = u_{t_n} x_{t_n} + u_{t_n} \left[ \frac{u_{t_{n-1}}(1 - u_{t_n})}{u_{t_n}} \right] A_{t_{n-1}}$$
$$= u_{t_n} x_{t_n} + (1 - u_{t_n})[u_{t_{n-1}} A_{t_{n-1}}]$$
$$= u_{t_n} x_{t_n} + (1 - u_{t_n}) \overline{x}_{t_{n-1}}$$

Hence the sequential form is obtained:

$$\overline{x}_{t_n} = u_{t_n} x_{t_n} + (1 - u_{t_n}) \overline{x}_{t_{n-1}}$$

The sequential formula converges to a fixed point if the time interval is fixed at the average time interval q:

$$u_{t_n} = \frac{u_{t_{n-1}}}{u_{t_{n-1}} + (1-\alpha)^q}$$

The fixed point of the sequence is $$u = 1 - (1-\alpha)^q$$

For numerical stability, i.e. to avoid underflow of the double precision floating point representation when $t_k-t_{k-1}$ is large, the time intervals can be scaled proportionally so that the average time interval q is scaled close to 1. If q is scaled to exactly 1, $u=\alpha$ is obtained.

The fixed point u can be used as the initial value:

$$u_{t_0} = 1-(1-\alpha)^q$$

Hanzak's Adjustment Factor for Time-Close Intervals

One can add an adjustment factor $\rho_n^i$ to the weights to tune the response of the filter:

$$\bar{x}_{t_n} = u_{t_n} A_{t_n}$$

$$u_{t_n} = \frac{1}{\sum_{i=0}^{n} \rho_n^i (1-\alpha)^{(t_n - t_i)}}$$

$$A_{t_n} = \sum_{i=0}^{n} \rho_n^i (1-\alpha)^{(t_n - t_i)} x_{t_i}$$

Expanding the series $$\frac{1}{u_{t_n}} = 1 + \rho_n^{n-1} b_n + \rho_n^{n-2} b_n b_{n-1} + \ldots + \rho_n^0 b_n b_{n-1} \ldots b_1$$

$$= 1 + \rho_n^{n-1} b_n \left( 1 + \frac{\rho_n^{n-2}}{\rho_n^{n-1}} b_{n-1} + \ldots + \frac{\rho_n^0}{\rho_n^{n-1}} b_{n-1} \ldots b_1 \right)$$

If $\rho_n^n = 1$
and $$\rho_l^m = \frac{\rho_n^m}{\rho_n^l}$$

then $$\frac{1}{u_{t_n}} = 1 + \rho_n^{n-1} b_n (1 + \rho_{n-1}^{n-2} b_{n-1} + \ldots + \rho_{n-1}^0 b_{n-1} \ldots b_1)$$

$$\frac{1}{u_{t_n}} = 1 + \frac{\rho_n^{n-1} b_n}{u_{t_{n-1}}}$$

The sequential form can be derived:

$$u_{t_n} = \frac{u_{t_{n-1}}}{u_{t_{n-1}} + \rho_n^{n-1} b_n}$$

Hanzak (cited above) added an adjustment factor $\rho_n^i$ given below that satisfies the equalities $\rho_n^n = 1$ and $$\rho_l^m = \frac{\rho_n^m}{\rho_n^l}; \quad \rho_n^i = \frac{t_i - t_{i-1}}{t_n - t_{n-1}}$$

This adjustment factor improves the robustness of the filter when the series include time-close samples, samples with time intervals much smaller than the average time interval. The factor $\rho_n^i$ increases the relative weight of a sample point $x_{t_i}$ in the past if the corresponding sampling interval $t_i - t_{i-1}$ is larger than the current sampling interval $t_n - t_{n-1}$. It compensates for higher relative intensity of noise due to the division by a random time-close interval in the rate estimates.

$$u_{t_n} = \frac{u_{t_{n-1}}}{u_{t_{n-1}} + \left(\frac{t_{n-1} - t_{n-2}}{t_n - t_{n-1}}\right) b_n}$$

The expression for $b_n$ that will be used subsequently is:

$$b_n = \frac{u_{t_{n-1}}(1 - u_{t_n})}{\rho_n^{n-1} u_{t_n}}$$

Similarly expanding the series $$A_{t_n} = x_{t_n} + \rho_n^{n-1} b_n x_{t_{n-1}} + \rho_n^{n-2} b_n b_{n-1} x_{t_{n-2}} + \ldots + \rho_n^0 b_n b_{n-1} \ldots b_1 x_{t_0}$$

$$= x_{t_n} + \rho_n^{n-1} b_n \left( x_{t_{n-1}} + \frac{\rho_n^{n-2}}{\rho_n^{n-1}} b_{n-1} x_{t_{n-2}} + \ldots + \frac{\rho_n^0}{\rho_n^{n-1}} b_{n-1} \ldots b_1 x_{t_0} \right)$$

$$= x_{t_n} + \rho_n^{n-1} b_n (x_{t_{n-1}} + \rho_{n-1}^{n-2} b_{n-1} x_{t_{n-2}} + \ldots + \rho_{n-1}^0 b_{n-1} \ldots b_1 x_{t_0})$$

$$= x_{t_n} + \rho_n^{n-1} b_n A_{t_{n-1}}$$

The sequential form is obtained:

$$A_{t_n} = x_{t_n} + \rho_n^{n-1} b_n A_{t_{n-1}}$$

$$= x_{t_n} + \left( \frac{t_{n-1} - t_{n-2}}{t_n - t_{n-1}} \right) b_n A_{t_{n-1}}$$

The sequential form for $\bar{x}_{t_n}$ is derived:

$$\bar{x}_{t_n} = u_{t_n} A_{t_n}$$

$$= u_{t_n}(x_{t_n} + \rho_n^{n-1} b_n A_{t_{n-1}})$$

Substituting for $b_n$ $$\bar{x}_{t_n} = u_{t_n} x_{t_n} + \rho_n^{n-1} u_{t_n} \left[ \frac{u_{t_{n-1}}(1 - u_{t_n})}{\rho_n^{n-1} u_{t_n}} \right] A_{t_{n-1}}$$

$$= u_{t_n} x_{t_n} + (1 - u_{t_n})[u_{t_{n-1}} A_{t_{n-1}}]$$

$$= u_{t_n} x_{t_n} + (1 - u_{t_n}) \bar{x}_{t_{n-1}}$$

Hence the sequential form is obtained:

$$\bar{x}_{t_n} = u_{t_n} x_{t_n} + (1 - u_{t_n}) \bar{x}_{t_{n-1}}$$

Notably, the parameter $\rho_n^{n-1}$ appears in the sequential form for $u_{t_n}$ but is not part of the sequential form for $\bar{x}_{t_n}$.

The initial value with the average time interval q scaled close to 1 is used:

$$\rho_0^{-1} = 1$$

$$u_{t_0} = 1 - \rho_0^{-1}(1-\alpha)^q$$

Adjustment Factors for Measurement Time and Run Time Intervals

Some classes of resource measure involve non-negligible measurement time which should be accounted for in the filters. For example, memory heap usage measurement process involves full garbage collection of the unused heap to measure the actual usage. The measurement time of the heap usage increases as the size of the heap increases. In some processes the run time does not overlap with the measurement time, which is the case for heap usage measurement when the applications in a JVM are frozen during the full garbage collection. Therefore, the time interval $(t_n-t_{n-1})$ should be split into non-overlapping run time $(t_n-t'_{n-1})$ and measurement time $(t'_{n-1}-t_{n-1})$, where $t'_n > t_n$. Here the timestamp $t_n$ denotes the start of the nth full garbage collection cycle while $t'_n$ denotes the end of the nth full garbage collection cycle:

$$t_n - t_{n-1} = (t_n - t'_{n-1}) + (t'_{n-1} - t_{n-1})$$

The rate of change of heap usage measure may have been defined as follows if it is assumed that the process excludes the measurement time interval when heap allocation activities are frozen, i.e. the denominator is the process run time interval excluding measurement time:

$$M_{t_n} = \left(\frac{\overline{X}_{t_n} - \overline{X}_{t_{n-1}}}{t_n - t'_{n-1}}\right)$$

Hence the ratio of the run times $$\frac{t_i - t'_{i-1}}{t_n - t'_{n-1}}$$

can be used in the adjustment factor:

$$\rho_n^i = \left(\frac{t_i - t'_{i-1}}{t_n - t'_{n-1}}\right)$$

Using the Adjustment Factor in Rate Filter (Avoiding Cauchy Distribution)

The Holt filter can be denoted by the parameterized linear operator $H(x_{t_i}, \beta)$ where the parameter $x_{t_i}$ is a sequence of measures, which is the sum of a signal term and an error term:

$$x_{t_i} = \hat{x}_{t_i} + \varepsilon_{x_{t_i}}$$

The estimation of measure $\overline{X}_{t_n}$ by the operator $H(x_{t_i}, \beta)$ is effective if the error term $$\varepsilon_{x_{t_i}}$$

is Gaussian:

$$\overline{X}_{t_n} = H(x_{t_i}, \beta) = H(\hat{x}_{t_i}, \beta) + H(\varepsilon_{x_{t_i}}, \beta)$$

$$\varepsilon_{\overline{X}_{t_n}} = H(\varepsilon_{x_{t_1}}, \beta) \approx 0$$

In the estimation of the growth rate $\overline{R}_{t_n}$ from the raw growth $$r_{t_n} = \frac{x_{t_n} - x_{t'_{n-1}}}{t_n - t'_{n-1}},$$

which involves a division by the random time interval $t_n - t'_{n-1}$, the error term $$\varepsilon_{r_{t_n}}$$

may be of Cauchy Distribution:

$$r_{t_i} = \hat{r}_{t_i} + \varepsilon_{r_{t_i}}$$

$$\overline{R}_{t_n} = H(r_{t_i}, \beta) = H(\hat{r}_{t_i}, \beta) + H(\varepsilon_{r_{t_i}}, \beta)$$

The following derivation shows the adjustment factor $$\rho_n^i = \left(\frac{t_i - t'_{i-1}}{t_n - t'_{n-1}}\right)$$

reduces the error term to Gaussian:

$$\overline{R}_{t_n} = v_{t_n} B_{t_n}$$

$$v_{t_n} = \frac{1}{\sum_{i=0}^{n} \rho_n^i (1-\beta)^{(t_n - t'_i)}}$$

$$B_{t_n} = \sum_{i=0}^{n} \rho_n^i (1-\beta)^{(t_n - t'_i)} r_{t_i}$$

where $$\rho_n^i = \left(\frac{t_i - t'_{i-1}}{t_n - t'_{n-1}}\right)$$

$$r_{t_i} = \frac{x_{t_i} - x_{t'_{i-1}}}{t_i - t'_{i-1}}$$

The factor $t_i - t'_{i-1}$ in the denominator of $t_i - t'_{i-1}$ and the numerator of $\rho_n^i$ cancel out, giving $$B_{t_n} = \frac{1}{(t_n - t'_{n-1})} \sum_{i=0}^{n} (1-\beta)^{(t_n - t'_i)} (x_{t_i} - x_{t'_{i-1}})$$

$$v_{t_n} = \frac{(t_n - t'_{n-1})}{\sum_{i=0}^{n} (t_i - t'_{i-1})(1-\beta)^{(t_n - t'_i)}}$$

The factor $(t_n - t'_{n-1})$ in the denominator of $B_{t_n}$ and numerator of $v_{t_n}$ cancel out, producing $$\overline{R}_{t_n} = \frac{\sum_{i=0}^{n} (x_{t_i} - x_{t'_{i-1}})(1-\beta)^{(t_n - t'_i)}}{\sum_{i=0}^{n} (t_i - t'_{i-1})(1-\beta)^{(t_n - t'_i)}}$$

If the filter parameter β approaches zero.

$$\lim_{\beta \to 0} \overline{R}_{t_n} = \frac{\sum_{i=0}^{n}(x_{t_i} - x_{t'_{i-1}})}{\sum_{i=0}^{n}(t_i - t'_{i-1})}$$

Since $x_{t_i} = x_{t'_i}$, this gives $$\lim_{\beta \to 0} \overline{R}_{t_n} = \frac{(x_{t_n} - x_{t_{n-1}}) + (x_{t_{n-1}} - x_{t_{n-2}}) + \ldots + (x_{t_1} - x_{t_0})}{(t_n - t'_{n-1}) + (t_{n-1} - t'_{n-2}) + \ldots + (t_1 - t'_0)}$$

$$= \frac{x_{t_n} - x_{t_0}}{(t_n - t_0) - \sum_{i=0}^{n}(t'_i - t_i)}$$

Here the term $\Sigma_{i=0}{}^n(t'_i - t_i)$ is the total measurement time interval. If the measurement time is negligible, the formula converges to the limit where the error term ε is Gaussian:

$$\lim_{\beta \to 0} \overline{R}_{t_n} = \frac{x_{t_n} - x_{t_0}}{t_n - t_0} + \varepsilon$$

Wright's extension for irregular time intervals alone in some cases might not be sufficient for detecting a periodic pattern. The Hanzak's adjustment factor for time-close intervals can be used to reduce the noise induced by irregular time intervals to Gaussian noise level. The clipping of outliers further improves the performance of the single (growth rate only) or double (growth rate and acceleration) filters.

Adjustment Factors

The adjustment factor for time close intervals, which is meant to compensate for higher relative intensity of noise due to a random time-close interval in the rate estimate, can inadvertently dampen the rate of change estimates if the time interval decreases monotonically during a congestion caused by memory leaks or deadlocks. In case of memory leaks, as the time interval decreases the run time decreases but the measurement time increases because the JAVA virtual machine (JVM) is frozen longer for full garbage collection (GC). If the JVM is frozen during full GC, new requests are queued up outside the JVM (with some portion redistributed to other JVMs). The backlog can accelerate the rate of change of the heap usage during the subsequent run time.

One way to compensate for this backlog is to include the ratio of measurement times $$\frac{t'_{i-1} - t_{i-1}}{t'_{n-1} - t_{n-1}}$$

in the adjustment factor:

$$\rho_n^i = \left(\frac{t_i - t'_{i-1}}{t_n - t'_{n-1}}\right)\left(\frac{t'_{i-1} - t_{i-1}}{t'_{n-1} - t_{n-1}}\right)$$

This factor decreases the relative weight of a sample point $x_{t_i}$ in the past if its measurement time (i.e. the full GC time) $t'_{i-1} - t_{i-1}$ is shorter than the measurement time $t'_{n-1} - t_{n-1}$ corresponding to the current sample point $x_{t_n}$. The ratio of measurement times $$\frac{t'_{i-1} - t_{i-1}}{t'_{n-1} - t_{n-1}} < 1$$

is expected to cancel out the ratio of run times $$\frac{t_i - t'_{i-1}}{t_n - t'_{n-1}} > 1,$$

and provide a quicker response to the trends. Hence the new adjustment factors can give more weights to the more recent sample points when the measurement time is increasing. These adjustment factors reduce to Hanzak's adjustment factor if the measurement time is a negligible constant and the time interval is comprised mostly by the run time.

Mathematically, $\rho_n{}^n = 1$ and $$\rho_l^m = \frac{\rho_n^m}{\rho_n^l},$$

and so the filter can be reduced to the desired sequential form:

$$\rho_n^n = \left(\frac{t_n - t'_{n-1}}{t_n - t'_{n-1}}\right)\left(\frac{t'_{n-1} - t_{n-1}}{t'_{n-1} - t_{n-1}}\right) = 1$$

$$\frac{\rho_n^m}{\rho_n^l} = \left[\left(\frac{t_m - t'_{m-1}}{t_n - t'_{n-1}}\right) \Big/ \left(\frac{t_l - t'_{l-1}}{t_n - t'_{n-1}}\right)\right]$$

$$\left[\left(\frac{t'_{m-1} - t_{m-1}}{t'_{n-1} - t_{n-1}}\right) \Big/ \left(\frac{t'_{l-1} - t_{l-1}}{t'_{n-1} - t_{n-1}}\right)\right]$$

$$= \left(\frac{t_m - t'_{m-1}}{t_l - t'_{l-1}}\right)\left(\frac{t'_{m-1} - t_{m-1}}{t'_{l-1} - t_{l-1}}\right)$$

$$= \rho_l^m$$

The filter parameter $v_{t_n}$ is then given by the sequential form:

$$v_{t_n} = \frac{v_{t_{n-1}}}{v_{t_{n-1}} + \rho_n^{n-1} b_n}$$

$$= \frac{v_{t_{n-1}}}{v_{t_{n-1}} + \left(\frac{t_{n-1} - t'_{n-2}}{t_n - t'_{n-1}}\right)\left(\frac{t'_{n-2} - t_{n-2}}{t'_{n-1} - t_{n-1}}\right) b_n}$$

If the measurement time is monotonically decreasing, the following adjustment factors can be used:

$$\rho_n^i = \left(\frac{t_i - t'_{i-1}}{t_n - t'_{n-1}}\right)\left(\frac{t'_{n-1} - t_{n-1}}{t'_{i-1} - t_{i-1}}\right)$$

Applying Holt's Method

Holt's double exponential moving averages include three time series: smoothed resource measure $\overline{X}_i$, locally linear trend $\overline{M}_i$, and local linear forecast $\overline{G}_i$, given the constants α, $0 < \alpha < 1$ and β, $0 < \beta < 1$:

$$\overline{X}_n = \alpha x_n + (1-\alpha)\overline{G}_n$$

$$\overline{M}_n = \beta(\overline{X}_n - \overline{X}_{n-1}) + (1-\beta)\overline{M}_{n-1}$$

$$\overline{G}_n = \overline{X}_{n-1} + \overline{M}_{n-1}$$

Winters added a third exponential moving average to Holt's double exponential moving averages to incorporate the seasonal trend. Holt-Winters' triple exponential moving averages for a seasonal period L and the constants $0<\alpha<1$, $0<\beta<1$, $0<\gamma<1$ are:

$$\overline{X}_n = \alpha \frac{x_n}{\overline{C}_{n-L}} + (1-\alpha)\overline{G}_n$$

$$\overline{M}_n = \beta(\overline{X}_n - \overline{X}_{n-1}) + (1-\beta)\overline{M}_{n-1}$$

$$\overline{C}_n = \gamma \frac{x_n}{\overline{X}_n} + (1-\gamma)\overline{C}_{n-L}$$

$$\overline{G}_n = \overline{X}_{n-1} + \overline{M}_{n-1}$$

$$\overline{F}_n = [\overline{X}_{n-1} + \overline{M}_{n-1}]\overline{C}_{n-L}$$

Here $\overline{G}_n$ represents a local linear forecast while $\overline{F}_n$ represents a combination of linear and seasonal forecast. For capacity monitoring, long term linear trend can be used for forecasting resource requirements, such as memory, thread, connection, socket, buffer, disk space, network bandwidth, etc.

Smoothed Measure

The first of the double exponential moving averages can be used to smooth out the raw resource measure. In this case Wright's formula can be used to filter the raw resource measure $x_{t_n}$ given a constant $\alpha$, $0<\alpha<1$:

$$\overline{X}_{t_n} = u_{t_n} x_{t_n} + (1 - u_{t_n})\overline{G}_{t_n}$$

$$u_{t_n} = \frac{u_{t_{n-1}}}{u_{t_{n-1}} + \rho_n^{n-1} a_n}$$

$$a_n = (1-\alpha)^{(t_n - t_{n-1})}$$

$$\rho_n^{n-1} = \left(\frac{t_{n-1} - t'_{n-2}}{t_n - t'_{n-1}}\right)\varphi_n^{n-1}$$

$$\varphi_n^{n-1} = 1$$

Other useful formulae for the factor $\phi_n^{n-1}$ (depending on whether the measurement time interval is increasing or decreasing):

$$\varphi_n^{n-1} = \begin{cases} \left(\frac{t'_{n-2} - t_{n-2}}{t'_{n-1} - t_{n-1}}\right) \\ \left(\frac{t'_{n-1} - t_{n-1}}{t'_{n-2} - t_{n-2}}\right) \end{cases}$$

Locally Linear Trend

The second of the double exponential moving averages represents locally linear rate of change of the resource measure. Since the rate of change $$\left(\frac{\overline{X}_{t_n} - \overline{X}_{t_{n-1}}}{t_n - t'_{n-1}}\right)$$

involves a division by the length of time interval $t_n - t'_{n-1}$, the adjustment factors $\rho_n^{n-1}$ can be included to filter the rate of change $\overline{M}_{t_n}$ given a constant $\beta$, $0<\beta<1$:

$$\overline{M}_{t_n} = v_{t_n}\left(\frac{\overline{X}_{t_n} - \overline{X}_{t_{n-1}}}{t_n - t'_{n-1}}\right) + (1 - v_{t_n})\overline{M}_{t_{n-1}}$$

$$v_{t_n} = \frac{v_{t_{n-1}}}{v_{t_{n-1}} + \rho_n^{n-1} b_n}$$

$$b_n = (1-\beta)^{(t_n - t_{n-1})}$$

$$\rho_n^{n-1} = \left(\frac{t_{n-1} - t'_{n-2}}{t_n - t'_{n-1}}\right)\varphi_n^{n-1}$$

$$\varphi_n^{n-1} = 1$$

The series $\overline{G}_{t_n}$ represents the local linear forecasted resource measure based on the linear trend:

$$\overline{G}_{t_n} = \overline{X}_{t_{n-1}} + \overline{M}_{t_{n-1}}(t_n - t_{n-1})$$

The initial values of $X_{t_0}$ and $\overline{M}_{t_0}$ are computed:

$$\overline{X}_{t_0} = x_{t_0}$$

$$\overline{M}_{t_0} = \frac{x_{t_0} - x_{t_{-q}}}{t_0 - t_{-q}},$$

$$(t_0 - t_{-q}) > 15 \text{ minutes.}$$

This linear equation can be used to predict the time t after $t_n$ when the resource measure (heap usage or thread or stack segment intensity) might cross the threshold $X_{max}$:

$$X_{max} = \overline{X}_{t_n} + \overline{M}_{t_n}(t - t_n)$$

$$t = t_n + \frac{X_{max} - \overline{X}_{t_n}}{\overline{M}_{t_n}}$$

Growth Rate and Acceleration of Resource Measure

Double exponential moving averages can be applied to the first derivative and second derivative of the resource measure to monitor accelerating resource congestions (due to memory leaks or thread deadlocks).

The rate of change of resource measure $r_{t_n}$ can be filtered in the first of the double exponential moving averages. This filter can monitor the long term gradual growth in resource measure. Since the rate of change $$r_{t_n} = \frac{x_{t_n} - x_{t_{n-1}}}{t_n - t'_{n-1}}$$

involves a division by the length of time interval $t_n - t'_{n-1}$, adjustment factors $\mu_n^{n-1}$ can be included to filter the rate of change:

$$r_{t_n} = \frac{x_{t_n} - x_{t_{n-1}}}{t_n - t'_{n-1}}$$

$$\overline{R}_{t_n} = v_{t_n} r_{t_n} + (1 - v_{t_n})\overline{G}_{t_n}$$

$$v_{t_n} = \frac{v_{t_{n-1}}}{v_{t_{n-1}} + \mu_n^{n-1} b_n}$$

-continued $$b_n = (1 - \beta)^{(t_n - t_{n-1})}$$

$$\mu_n^{n-1} = \left(\frac{t_{n-1} - t'_{n-2}}{t_n - t'_{n-1}}\right)$$

The second derivative $s_{t_n}$ (rate of rate of change) also involves a division by length of time interval $t_n - t_{n-1}$.

$$s_{t_n} = \frac{\overline{R}_{t_n} - \overline{R}_{t_{n-1}}}{t_n - t_{n-1}}$$

The Hanzak adjustment factor $\sigma_n^{n-1}$ can be included to filter the rate of rate of change:

$$\overline{S}_{t_n} = w_{t_n} s_{t_n} + (1 + w_{t_n})\overline{S}_{t_{n-1}}$$

$$w_{t_n} = \frac{w_{t_{n-1}}}{w_{t_{n-1}} + \sigma_n^{n-1} c_n}$$

$$c_n = (1 - \kappa)^{(t_n - t_{n-1})}$$

$$\sigma_n^{n-1} = \left(\frac{t_{n-1} - t_{n-2}}{t_n - t_{n-1}}\right)$$

The series $\overline{G}_{t_n}$ represents the forecasted rate of change of resource measure based on the linear trend in rate of change:
$$\overline{G}_{t_n} = \overline{R}_{t_{n-1}} + \overline{S}_{t_{n-1}}(t_n - t_{n-1})$$

The forecasted resource measure $\overline{F}_{t_n}$ is given by:

$$\overline{F}_{t_n} = x_{t_{n-1}} + \overline{R}_{t_{n-1}}(t_n - t_{n-1})$$

The smoothed rate $\overline{R}_{t_n}$ can be used to predict the time t after $t_n$ when the resource measure might cross the threshold $X_{max}$ as follows:

$$X_{max} = x_{t_n} + \overline{R}_{t_n}(t - t_n)$$

$$t = t_n + \frac{X_{max} - x_{t_n}}{\overline{R}_{t_n}}$$

Outlier Detection and Clipping

On top of the double and triple exponential moving averages, two more exponential moving averages can be introduced to filter the series for residual error $\overline{E}_{t_n}$ and absolute deviation $\overline{D}_{t_n}$. Given one step linear with or without seasonal factor forecasted resource measure $\overline{F}_{t_n}$ based on the trend $\overline{M}_{t_n}$ (in algorithm 1 for monitoring measure and rate) or $\overline{R}_{t_n}$ (in algorithm 2 for monitoring rate and acceleration):

$$\overline{F}_{t_n} = \begin{cases} \overline{X}_{t_{n-1}} + \overline{M}_{t_{n-1}}(t_n - t_{n-1}) \\ [\overline{X}_{t_{n-1}} + \overline{M}_{t_{n-1}}(t_n - t_{n-1})]\overline{C}_{t_n - L} \\ x_{t_{n-1}} + \overline{R}_{t_{n-1}}(t_n - t_{n-1}) \end{cases}$$

The residual error of forecasted resource measure can be calculated:

$$e_{t_n} = \overline{F}_{t_n} - x_{t_n}$$

$$\overline{E}_{t_n} = \psi_{t_n} e_{t_n} + (1 - \psi_{t_n})\overline{E}_{t_{n-1}}$$

$$\overline{D}_{t_n} = \psi_{t_n} |e_{t_n}| + (1 - \psi_{t_n})\overline{D}_{t_{n-1}}$$

Significantly, $\overline{D}_{t_n} \geq \overline{E}_{t_n}$ for each n. Wright's formula can be used to update the filter parameters given a constant $\delta$, $0 < \delta < 1$:

$$\psi_{t_n} = \frac{\psi_{t_{n-1}}}{\psi_{t_{n-1}} + d_n}$$

$$d_n = (1 - \delta)^{(t_n - t_{n-1})}$$

The normalized residual is given by $$\left|\frac{e_{t_n} - \overline{E}_{t_{n-1}}}{\overline{D}_{t_{n-1}}}\right|$$

The sample $x_{t_n}$ is identified as an outlier if the corresponding normalized residual is greater than a cutoff value Q, i.e.

$$\left|\frac{e_{t_n} - \overline{E}_{t_{n-1}}}{\overline{D}_{t_{n-1}}}\right| > Q,$$

$$Q > 1$$

In certain embodiments, the normalized residual cutoff value Q can be adjusted proportionally to the time interval if the interval is greater than a threshold $\alpha$, $\alpha \geq 1$, i.e. given a default cutoff value $Q_{def}$, the normalized residual cutoff value Q is computed:

$$Q = \begin{cases} (t_n - t_{n-1})Q_{def}, & (t_n - t_{n-1}) > a \\ Q_{def}, & (t_n - t_{n-1}) \leq a \end{cases}$$

This formula for adjusting the normalized residual cutoff value effectively increasing the tolerance for the outlier measurement as the forecast horizon extends out, i.e. as $t_n - t_{n-1}$ increases. It is an expression of how the confidence level of a forecasted measure can decrease as the forecast horizon extends out.

If $x_{t_n}$ is identified as an outlier, then the sample can be clipped to a value $x_{t'_n}$, $x_{max} \geq x_{t'_n} \geq x_{min}$, according to the following rules:
If $\overline{E}_{t_{n-1}} < 0$ and $e_{t_n} < \overline{E}_{t_{n-1}}$ and $|e_{t_n} - \overline{E}_{t_{n-1}}| > Q \overline{D}_{t_{n-1}}$,
then $x'_{t_n} = \text{MIN}(\overline{F}_{t_n} - \overline{E}_{t_{n-1}} Q \overline{D}_{t_{n-1}} x_{max})$.
If $\overline{E}_{t_{n-1}} < 0$ and $\overline{E}_{t_{n-1}} < e_{t_n} < 0$,
then $|e_{t_n} - \overline{E}_{t_{n-1}}| < Q \overline{D}_{t_{n-1}}$ so $x_{t_n}$ is not an outlier.
If $\overline{E}_{t_{n-1}} < 0$ and $0 < e_{t_n}$,
then $x'_{t_n} = \text{MAX}(\overline{F}_{t_n} - \overline{E}_{t_{n-1}} - Q \overline{D}_{t_{n-1}}, x_{min})$.
If $0 < \overline{E}_{t_{n-1}}$ and $\overline{E}_{t_{n-1}} < e_{t_n}$ and $|e_{t_n} - \overline{E}_{t_{n-1}}| > Q \overline{D}_{t_{n-1}}$,
then $x'_{t_n} = \text{MAX}(\overline{F}_{t_n} - \overline{E}_{t_{n-1}} Q \overline{D}_{t_{n-1}}, x_{min})$.
If $0 < \overline{E}_{t_{n-1}}$ and $0 < e_{t_n} < \overline{E}_{t_{n-1}}$,
then $|e_{t_n} < \overline{E}_{t_{n-1}}|Q \overline{D}_{t_{n-1}}$ so $x_{t_n}$ is not an outlier.
If $0 < \overline{E}_{t_{n-1}}$ and $e_{t_n} < 0$,
then $x'_{t_n} = \text{MIN}(\overline{F}_{t_n} - \overline{E}_{t_{n-1}} + Q \overline{D}_{t_{n-1}}, x_{max})$.

These conditions are summarized in:

$$x'_{t_n} := \begin{cases} \text{MIN}(\overline{F}_{t_n} - \overline{E}_{t_{n-1}} + Q\overline{D}_{t_{n-1}}, x_{max}) & \text{when } e_{t_n} < \text{MIN}(\overline{E}_{t_{n-1}}, 0) \\ \text{MAX}(\overline{F}_{t_n} - \overline{E}_{t_{n-1}} + Q\overline{D}_{t_{n-1}}, x_{min}) & \text{when } e_{t_n} > \text{MAX}(\overline{E}_{t_{n-1}}, 0) \end{cases}$$

In these expressions the smoothed residual error term $\overline{E}_{t_n}$ represents the bias of the filter. This bias information is compensated by the centered forecast $F_n = \overline{F}_n - \overline{E}t_{n-1}$.

$$e_{t_n} - \overline{E}_{t_{n-1}} = \overline{F}_{t_n} - x_{t_n} - \overline{E}_{t_{n-1}} = \overline{F}'_{t_n} - x_{t_n}$$

Hence the normalized residual $|e_{t_n} - \overline{E}_{t_{n-1}}| > Q \,\overline{D}_{t_{n-1}}$ is equivalent to the residual of centered forecast $|\overline{F}'_{t_n} - x_{t_n}| > Q \,\overline{D}_{t_{n-1}}$. The clipped outlier measure $x'_{t_n}$ is given by shifting the centered forecast $\overline{F}'_{t_n}$ by $\pm Q \,\overline{D}_{t_{n-1}}$.

The bias represents level change. A short duration spike or dip of bias represents permanent level shift. A bias that spikes and dips in succession represents level spikes or temporary level shifts. A persistent negative bias represents upward level drift and a persistent positive bias represents downward level drift. A persistent large absolute deviation represents high variance change. Bias, absolute deviation (representing 1-sigma and 2-sigma), and outliers can be plotted as a Shewhart control chart. Persistent level drift, high variance change, and clusters of outliers, which can be clearly visible in a Shewhart control chart and can be detected by simple rule-based classification schemes, usually represent anomalies in the system. The anomalies can be identified and raised to be diagnosed by higher level classification and assessment schemes.

Seasonal Trend

When monitoring the heap usage or thread or stack segment intensity, weekend and weekday seasons can be tracked separately. This is based on the rationale that the seasonal peaks occur only in the weekdays while some trends may spill into the weekends when the users are distributed in different time zones (such as for multinational organizations). The length of the weekend seasons should be 48 hours and the length of the weekday seasons should be 24 hours. The seasonal factors $\overline{B}_{t_n}$ can be used when updating the moving averages in the weekends and seasonal factors $\overline{C}_{t_n}$ can be used when updating the moving averages in the weekdays. If a resolution of 15 minutes is used, i.e. the seasonal index is integer multiples of 15 minutes, to track the seasonal factors $\overline{B}_{t_n}$ (for 48 hours) and $\overline{C}_{t_n}$ (for 24 hours), then this produces T=192 and T=96 indices, respectively, for the seasonal factors. When the time is advanced from $t_{n-1}$ to $t_n$, the seasonal index shall be advanced in multiples of 15 minutes, i.e. index $\tau_n = [[(t_n - t_{12\,AM}) \text{ div } 15 \text{ minutes}] \text{ mod } T]$, assuming t is given in minutes. Generally the seasonal index is a map parameterized by resolution $\Delta_\tau$ and period T:

$$\tau_n = \tau(t_n) = [[(t_n - t_{12\,AM}) \text{ div } \Delta_\tau] \text{ mod } T]$$

The exponential moving averages of seasonal factors for a constant $\gamma$, $0 < \gamma < 1$, are given for the weekends and weekdays. In the weekends, the seasonal factor is tracked by the following filter where K (set to 192 if $\Delta_\tau$ is 15 minutes) is the periodicity of the weekend seasons:

$$\overline{B}_{\tau_n} \leftarrow \gamma \frac{x_{t_n}}{\overline{X}_{t_n}} + (1 - \gamma) \overline{B}_{\tau_n}$$

$$\tau_n = \tau(t_n) = [[(t_n - t_{12AM}) div \Delta_\tau] mod K]$$

In the weekdays, the seasonal factor is tracked by the following filter where L (set to 96 if $\Delta_\tau$ is 15 minutes) is the periodicity of the weekday seasons:

$$\overline{C}_{\tau_n} \leftarrow \gamma \frac{x_{t_n}}{\overline{X}_{t_n}} + (1 - \gamma) \overline{C}_{\tau_n}$$

$$\tau_n = \tau(t_n) = [[(t_n - t_{12AM}) div \Delta_\tau] mod L]$$

The above two filters track the percentage deviation of the raw sample $x_{t_n}$ above or below the deseasonalized average $\overline{X}_{t_n}$. The seasonal factors shall be renormalized at the end of each weekday or weekend season so that the average of the factors over one week cycle is 1, i.e. divide each weekend factor $\overline{B}_k$ and weekday factor $\overline{C}_l$ by the normalization factor:

$$\frac{1}{K + 5L} \left( \sum_{k=0}^{K-1} \overline{B}_k + 5 \sum_{l=0}^{L-1} \overline{C}_l \right)$$

Optionally, we can fit a smooth spline to the seasonal factors at the end of each season to smoothen the seasonal trend. At the end of each weekday or weekend season, we can rebalance the relative magnitudes of weekend and weekday seasonal factors by dividing each seasonal factor $\overline{B}_i$ and $\overline{C}_j$ by the average daily measure:

$$\frac{1}{5 + (2*2)} \left( \sum_{d=0}^{4} J_d + 2 * \sum_{e=0}^{1} I_e \right)$$

When the raw value $x_{t_n}$ is divided by the corresponding seasonal factor $\overline{B}_{\tau_n}$ or $\overline{C}_{\tau n}$ (tracking of the previous seasons and current season), the updating process for $\overline{X}_{t_n}$ effectively deseasonalizes the average $\overline{X}_{t_n}$. $\overline{X}_{t_n}$ is updated by one of the two filters depending on whether the sample is in the weekends or weekdays.

The initial values of the weekend seasonal factors $\overline{B}_k$, for $k = 0, 1, \ldots, K-1$, are determined by first computing the average over each weekend:

$$I_e = \frac{1}{N_e} \sum_{i=1}^{N_e} x_{t_i}, e = 0, 1$$

Here the samples $x_{t_1}, \ldots, x_{t_m}$ are those that fall within the corresponding weekend.

Secondly, compute the averages $\overline{y}_k$ of the samples that fall within the 15 minutes time interval corresponding to the weekend seasonal index k:

$$\overline{y}_k = \frac{1}{N_k} \sum_{i=1}^{N_k} x_{t_i},$$

$$k = 0, 1, \ldots, 383$$

Here the values $\overline{y}_k$ are the averages of the samples that fall within the 15 minutes time interval corresponding to the weekend seasonal index (k mod 192) of the weekend e=(k div 192).

|   | Weekend 1 | Weekend 2 |
|---|---|---|
| 0 | $\overline{y}_0/I_0$ | $\overline{y}_{192}/I_1$ |
| 1 | $\overline{y}_1/I_0$ | $\overline{y}_{193}/I_1$ |

-continued

|  | Weekend 1 | Weekend 2 |
|---|---|---|
| 2 | $\bar{y}_2/I_0$ | $\bar{y}_{194}/I_1$ |
| ... | | |
| 191 | $\bar{y}_{191}/I_0$ | $\bar{y}_{383}/I_1$ |

Then compute the weekend seasonal factors by averaging each row:

$$\bar{B}_0 = \frac{1}{2}(\bar{y}_0/I_0 + \bar{y}_{192}/I_1)$$

$$\bar{B}_1 = \frac{1}{2}(\bar{y}_1/I_0 + \bar{y}_{193}/I_1)$$

$$\bar{B}_2 = \frac{1}{2}(\bar{y}_2/I_0 + \bar{y}_{194}/I_1)$$

...

$$\bar{B}_{191} = \frac{1}{2}(\bar{y}_{191}/I_0 + \bar{y}_{383}/I_1)$$

The initial values of the weekday seasonal factors $\bar{C}_l$, for l=0, 1, . . . , L−1, are determined as follows:

First compute the averages of 5 workdays (Monday, Tuesday, Wednesday, Thursday, Friday):

$$J_d = \frac{1}{N_d}\sum_{i=1}^{N_d} x_{t_i},$$

$$d = 0, 1, \ldots, 4$$

Here the samples $x_{t_1}, \ldots, x_{t_m}$ are those that fall within the corresponding day.

Second, divide the sample averages by the daily average for each seasonal index

|  | Monday | Tuesday | Wednesday | Thursday | Friday |
|---|---|---|---|---|---|
| 0 | $\bar{z}_0/J_0$ | $\bar{z}_{96}/J_1$ | $\bar{z}_{192}/J_2$ | $\bar{z}_{288}/J_3$ | $\bar{z}_{384}/J_4$ |
| 1 | $\bar{z}_1/J_0$ | $\bar{z}_{97}/J_1$ | $\bar{z}_{193}/J_2$ | $\bar{z}_{289}/J_3$ | $\bar{z}_{385}/J_4$ |
| 2 | $\bar{z}_2/J_0$ | $\bar{z}_{98}/J_1$ | $\bar{z}_{194}/J_2$ | $\bar{z}_{290}/J_3$ | $\bar{z}_{386}/J_4$ |
| ... | | | | | |
| 95 | $\bar{z}_{95}/J_0$ | $\bar{z}_{191}/J_1$ | $\bar{z}_{287}/J_2$ | $\bar{z}_{383}/J_3$ | $\bar{z}_{479}/J_4$ |

Here the values $\bar{z}_l$ are the averages of the samples that fall within the 15 minutes time interval corresponding to the weekday seasonal index (l mod 96) of the day d=(l div 96):

$$z_l = \frac{1}{N_l}\sum_{i=1}^{N_l} x_{t_i},$$

$$l = 0, 1, \ldots, 479$$

Third, the weekday seasonal factors are computed by averaging each row:

$$\bar{C}_0 = \frac{1}{5}(\bar{z}_0/J_0 + \bar{z}_{96}/J_1 + \bar{z}_{192}/J_2 + \bar{z}_{288}/J_3 + \bar{z}_{384}/J_4)$$

$$\bar{C}_1 = \frac{1}{5}(\bar{z}_1/J_0 + \bar{z}_{97}/J_1 + \bar{z}_{193}/J_2 + \bar{z}_{289}/J_3 + \bar{z}_{385}/J_4)$$

$$\bar{C}_2 = \frac{1}{5}(\bar{z}_2/J_0 + \bar{z}_{98}/J_1 + \bar{z}_{194}/J_2 + \bar{z}_{290}/J_3 + \bar{z}_{386}/J_4)$$

...

$$\bar{C}_{95} = \frac{1}{5}(\bar{z}_{95}/J_0 + \bar{z}_{191}/J_1 + \bar{z}_{287}/J_2 + \bar{z}_{383}/J_3 + \bar{z}_{479}/J_4)$$

To rebalance the relative magnitudes of weekend and weekday seasonal factors, we divide each seasonal factor $\bar{B}_i$ and $\bar{C}_j$ by the average daily measure:

$$\frac{1}{5+(2*2)}\left(\sum_{d=0}^{4} J_d + 2*\sum_{e=0}^{1} I_e\right)$$

Moving average is updated in the weekends using:

$$\bar{X}_{t_n} = u_{t_n}\frac{x_{t_n}}{\bar{B}_{t_n}} + (1-u_{t_n})\bar{G}_{t_n}$$

Moving average is updated in the weekdays using:

$$\bar{X}_{t_n} = u_{t_n}\frac{x_{t_n}}{\bar{C}_{t_n}} + (1-u_{t_n})\bar{G}_{t_n}$$

In each case, the local linear forecast is:

$$\bar{G}_{t_n} = \bar{X}_{t_{n-1}} + \bar{M}_{t_{n-1}}(t_n - t_{n-1})$$

The initial value of $\bar{X}_{t_0}$, if $t_0$ falls in a weekend, is:

$$\bar{X}_{t_0} = \bar{y}_{\tau_0}$$

$$\tau_0 = \tau(t_0) = [(t_0 - t_{12\,AM})\,div\,\tau_\tau]\,mod\,K$$

If $t_0$ falls in a weekday:

$$\bar{X}_{t_0} = \bar{z}_{\tau_0}$$

$$\tau_0 = \tau(t_0) = [(t_0 - t_{12\,AM})\,div\,\Delta_\tau]\,mod\,L$$

The initial value of the linear trend $\bar{M}_{t_0}$ is computed from two seasons of samples, i.e. between two consecutive weekdays or between two consecutive weekends, depending on whether $t_0$ falls in a weekend or on a weekday.

If $t_0$ falls in a weekend:

$$\bar{M}_{t_0} = \frac{\bar{y}_{\tau_0+K} - \bar{y}_{\tau_0}}{K+5L}$$

If $t_0$ falls on a weekday:

$$\bar{M}_{t_0} = \frac{\bar{z}_{\tau_0+L} - \bar{z}_{\tau_0}}{L}$$

When a projection is made of the resource measure at time t after $t_n$ by combining the smoothed resource measure, locally linear trend, and multiplicative seasonal factor, the seasonal index can be projected by [(t−$t_n$) div 15 minutes], assuming t is given in minutes. Denoting the projection of seasonal index by Δ, the linear and seasonal forecast $F_t$ is obtained to time t using one of the following two formulae depending on whether $(\tau_n+\Delta)$ falls in the weekends or weekdays.

If both $\tau_n$ and $(\tau_n+\Delta)$ fall in a weekend:

$$F_t = [\overline{X}_{t_n} + \overline{M}_{t_n}(t-t_n)]\overline{B}_{((\tau_n+\Delta) \bmod K)}$$

If both $\tau_n$ and $(\tau_n+\Delta)$ fall among the consecutive weekdays:

$$F_t = [\overline{X}_{t_n} + \overline{M}_{t_n}(t-t_n)]\overline{C}_{((\tau_n+\Delta) \bmod L)}$$

A slightly more complex modulo arithmetic can be used if $\tau_n$ and $(\tau_n+\Delta)$ fall in different seasons.

Multivariate Regression

The mean square error (MSE) residual and mean absolute deviation (MAD) of h-step forecasts can be defined as functions of independent variables $\alpha, \beta, \kappa, \gamma, \delta$, and tz for a given time series $x_t$. The parameter tz, $-12<tz<12$, is the time zone offset from the east coast standard time (EST). After shifting by the time zone offset, the start of the weekends shall correspond to Saturday 12 AM and the end of the weekends shall correspond to Monday 12 AM. The time zone offset can be optimized when the peaks and troughs of weekday activities across multiple time zones are superimposed and the level in the middle of the weekends needs to be centered in the weekend season.

Non-linear multivariate regression can be applied to determine the values of $\alpha$, $\beta$, $\kappa$, $\gamma$, $\delta$, and tz that minimize the MSE or MAD for data spanning 9 consecutive days or longer.

$$MSE = f(\alpha, \beta, \kappa, \gamma, \delta, tz, x_t) = \left(\frac{1}{N}\sum_{n=1}^{N}(e_{h,t_n})^2\right)^{1/2}$$

$$MAD = f(\alpha, \beta, \kappa, \gamma, \delta, tz, x_t) = \frac{1}{N}\sum_{n=1}^{N}|e_{h,t_n}|$$

In all expressions, the time stamps are shifted by tz offset and proportionally scaled. The scaling factor is determined such that the average time interval q is scaled close to 1.

The expected average time interval can be denoted by $\nabla$:

$$\nabla = E[T_k - T_{k-1}]$$

$$t_n = \frac{1}{\nabla}(T_n + tz)$$

$$q = \frac{1}{\nabla}\left(\frac{1}{N}\sum_{k=1}^{N} T_k - T_{k-1}\right) \approx 1$$

Simple Extended Holt-Winter Seasonal Filter

For capacity monitor, the residual error series is $$e_{h,t_n} = \overline{F}_{h,t_n} - x_{t_n}$$

Here h-step forecast $\overline{F}_{h,t_n}$ is based on the smoothed measure $\overline{X}_{t_{n-h}}$, the linear trend $\overline{M}_{t_{n-h}}$, and the seasonal factors $\overline{B}_{\tau_n}$ or $\overline{C}_{\tau_n}$ depending on whether $t_n$ falls in a weekend or on a weekday:

$$\overline{F}_{h,t_n} = [\overline{X}_{t_{n-h}} + \overline{M}_{t_{n-h}}(t_n - t_{n-h})]\overline{B}_{\tau_n}$$

$$\overline{F}_{h,t_n} = [\overline{X}_{t_{n-h}} + \overline{M}_{t_{n-h}}(t_n - t_{n-h})]\overline{C}_{\tau_n}$$

Equation set for the first exponential moving average (as derived in the previous sections) for the observed measure is given as follows.

Moving average of deseasonalized measure is updated in the weekends using:

$$\overline{X}_{t_n} = u_{t_n}\frac{x_{t_n}}{\overline{B}_{\tau_n}} + (1-u_{t_n})\overline{G}_{t_n}$$

Moving average of deseasonalized measure is updated in the weekdays using:

$$\overline{X}_{t_n} = u_{t_n}\frac{x_{t_n}}{\overline{C}_{\tau_n}} + (1-u_{t_n})\overline{G}_{t_n}$$

Note that the time $t_n$ is shifted by the tz offset before scaling. The weekend formula is used if $t_n$ is between 12 AM Saturday and 12 AM Monday.

The filter parameters are:

$$u_{t_n} = \frac{u_{t_{n-1}}}{u_{t_{n-1}} + \rho_n^{n-1}a_n}$$

$$a_n = (1-\alpha)^{(t_n - t_{n-1})}$$

$$\rho_n^{n-1} = \left(\frac{t_{n-1} - t'_{n-2}}{t_n - t'_{n-1}}\right)$$

The initial value of $\overline{X}_{t_0}$, if $t_0$ falls in a weekend:

$$\overline{X}_{t_0} = \overline{y}_{\tau_0}$$

$$\tau_0 = \tau(t_0) = [(t_0 - t_{12\,AM}) \text{ div } \Delta_\tau] \bmod K$$

If $t_0$ falls in a weekend:

$$\overline{X}_{t_0} = \overline{z}_{\tau_0}$$

$$\tau_0 = \tau(t_0) = [(t_0 - t_{12\,AM}) \text{ div } \Delta_\tau] \bmod L$$

The initial value of $u_{t_0}$ where q is the average time interval (which is scaled to 1):

$$q \approx 1$$

$$u_{t_0} = 1 - (1-\alpha)^q$$

Equation set for the second exponential moving average for locally linear trend:

$$\overline{M}_{t_n} = v_{t_n}\left(\frac{\overline{X}_{t_n} - \overline{X}_{t_{n-1}}}{t_n - t'_{n-1}}\right) + (1-v_{t_n})\overline{M}_{t_{n-1}}$$

$$v_{t_n} = \frac{v_{t_{n-1}}}{v_{t_{n-1}} + \rho_n^{n-1}b_n}$$

$$b_n = (1-\beta)^{(t_n - t_{n-1})}$$

$$\rho_n^{n-1} = \left(\frac{t_{n-1} - t'_{n-2}}{t_n - t'_{n-1}}\right)$$

The initial value of $\overline{M}_{t_0}$:

$$\overline{M}_{t_0} = \frac{1}{L}\left(\frac{\overline{z}_L - \overline{z}_0}{L} + \frac{\overline{z}_{L+1} - \overline{z}_1}{L} + \ldots + \frac{\overline{z}_{2L-1} - \overline{z}_{L-1}}{L}\right)$$

The initial value of $v_{t_0}$ where q is the average time interval (which is scaled to 1):

$$q \approx 1$$

$$v_{t_0} = 1 - (1-\beta)^q$$

Deseasonalized local linear forecast $\overline{G}_{t_n}$ provides the coupling between the first and second exponential moving averages:

$$\overline{G}_{t_n} = \overline{X}_{t_{n-1}} + \overline{M}_{t_{n-1}}(t_n - t_{n-1})$$

Equation set for the third exponential moving average for weekend and weekday seasonal factors are as follows.

In the weekends:

$$\overline{B}_{\tau_n} \leftarrow \gamma \frac{x_{t_n}}{\overline{X}_{t_n}} + (1-\gamma)\overline{B}_{\tau_n}$$

$$\tau_n = \tau(t_n) = [(t_n - t_{12AM}) \text{div } \Delta_\tau] \bmod K$$

In the weekdays:

$$\overline{C}_{\tau_n} \leftarrow \gamma \frac{x_{t_n}}{\overline{X}_{t_n}} + (1-\gamma)\overline{C}_{\tau_n}$$

$$\tau_n = \tau(t_n) = [(t_n - t_{12AM}) \text{div } \Delta_\tau] \bmod L$$

Either at the end of each season or after each update of $\overline{B}_{\tau_n}$ or $\overline{C}_{\tau_n}$ (the former method is more efficient and the latter may be too compute intensive), divide each weekend factor $\overline{B}_k$ and weekday factor $\overline{C}_l$ by the normalization factor:

$$\frac{1}{K+5L}\left(\sum_{k=0}^{K-1}\overline{B}_k + 5\sum_{l=0}^{L-1}\overline{C}_l\right)$$

The initial values of $\overline{B}_k$:

$$I_e = \frac{1}{N_e}\sum_{i=1}^{N_e} x_{t_i},$$

e=0, 1 and $N_e$ is the number of samples in weekend e $$\overline{y}_k = \frac{1}{N_k}\sum_{i=1}^{N_k} x_{t_i},$$

k=0, 1, . . . , 383 and $N_k$ is the number of samples in interval k $$\overline{B}_k = \frac{1}{2}(\overline{y}_k/I_0 + \overline{y}_{k+192}/I_1),$$

k=0, 1, . . . , 191

The initial values of $\overline{C}_l$:

$$J_d = \frac{1}{N_d}\sum_{i=1}^{N_d} x_{t_i},$$

d=0, 1, . . . , 4 and $N_d$ is the number of samples on day d $$\overline{z}_l = \frac{1}{N_l}\sum_{i=1}^{N_l} x_{t_i},$$

l=0, 1, . . . , 479 and $N_l$ is the number of samples in interval l $$\overline{C}_l = \frac{1}{5}(\overline{z}_l/J_0 + \overline{z}_{l+96}/J_1 + \overline{z}_{l+192}/J_2 + \overline{z}_{l+288}/J_3 + \overline{z}_{l+384}/J_4),$$

l=0, 1, . . . , 95

To rebalance the relative magnitudes of weekend and weekday seasonal factors, we divide each seasonal factor $\overline{B}_i$ and $\overline{C}_j$ by the average daily measure:

$$\frac{1}{5+(2*2)}\left(\sum_{d=0}^{4} J_d + 2*\sum_{e=0}^{1} I_e\right)$$

Equation set for the fourth and fifth exponential moving averages for outlier detection (Note that $e_{t_n}$ is one-step forecast error residual, setting h=1):

$$\overline{E}_{t_n} = \psi_{t_n} e_{t_n} + (1-\psi_{t_n})\overline{E}_{t_{n-1}}$$

$$\overline{D}_{t_n} = \psi_{t_n}|e_{t_n}| + (1-\psi_{t_n})\overline{D}_{t_{n-1}}$$

$$\psi_{t_n} = \frac{\psi_{t_{n-1}}}{\psi_{t_{n-1}} + d_n}$$

$$d_n = (1-\delta)^{(t_n - t_{n-1})}$$

The initial value of $\overline{E}_{t_0}$ and $\overline{D}_{t_0}$ is 0.
The initial value of $\psi_{t_0}$ where q is the average time interval (which is scaled to 1):

$$q \approx 1$$

$$\psi_{t_0} = 1 - (1-\delta)^q$$

Expression for detecting the outlier when the normalized residual is larger than Q:

$$\left|\frac{e_{t_n} - \overline{E}_{t_{n-1}}}{\overline{D}_{t_{n-1}}}\right| > Q,$$

$$Q > 1$$

Clipping of an outlier sample point $x_{t_n}$:

$$x'_{t_n} = \begin{cases} \text{MIN}(\overline{F}_{t_n} - \overline{E}_{t_{n-1}} + Q\overline{D}_{t_{n-1}}, x_{max}) & \text{when } e_{t_n} < \text{MIN}(\overline{E}_{t_{n-1}}, 0) \\ \text{MAX}(\overline{F}_{t_n} - \overline{E}_{t_{n-1}} - Q\overline{D}_{t_{n-1}}, x_{min}) & \text{when } e_{t_n} > \text{MAX}(\overline{E}_{t_{n-1}}, 0) \end{cases}$$

If the sample is an outlier, the clipped value should be used instead of the outlier value to update the average using one of the following formulae depending whether the time falls in a weekend or on a weekday:

$$\overline{X}_{t_n} = u_{t_n} \frac{x'_{t_n}}{\overline{B}_{\tau_n}} + (1 - u_{t_n})\overline{G}_{t_n}$$

$$\overline{X}_{t_n} = u_{t_n} \frac{x'_{t_n}}{\overline{C}_{\tau_n}} + (1 - u_{t_n})\overline{G}_{t_n}$$

Extended Holt-Winter Seasonal Filter Including Acceleration of Change of Measure For congestion monitoring, such as memory leaks and deadlocks, the following set of equations can be used (as derived in the previous sections).

The residual error series is $$e_{h,t_n} = \overline{F}_{h,t_n} - x_{t_n}$$

The h-step forecasted measure $\overline{F}_{h,t_n}$ is given by:

$$\overline{F}_{h,t_n} = x_{t_{n-h}} + \overline{R}_{t_{\lceil n-\frac{h}{2} \rceil}}(t_n - t_{n-h})$$

To include seasonal trend in the h-step forecast $\overline{F}_{h,t_n}$, the deseasonalized measure forecast can be multiplied with the seasonal factors $\overline{B}_{\tau_n}$ or $\overline{C}_{\tau_n}$ depending on whether $t_n$ falls in a weekend or on a weekday:

$$\overline{F}_{h,t_n} = \left[ \frac{\overline{X}_{t_{n-h}}}{\overline{B}_{\tau_{n-h}-K}} + \overline{R}_{t_{\lceil n-\frac{h}{2} \rceil}}(t_n - t_{n-h}) \right] \overline{B}_{\tau_n}$$

$$\overline{F}_{h,t_n} = \left[ \frac{\overline{X}_{t_{n-h}}}{\overline{C}_{\tau_{n-h}-L}} + \overline{R}_{t_{\lceil n-\frac{h}{2} \rceil}}(t_n - t_{n-h}) \right] \overline{C}_{\tau_n}$$

$\overline{X}_{t_{n-h}}$ is the deaseasonalized measure. Deseasonalized measure is updated in the weekends using:

$$\overline{X}_{t_n} = u_{t_n} \frac{x_{t_n}}{\overline{B}_{\tau_n}} + (1 - u_{t_n})[\overline{X}_{t_{n-1}} + \overline{R}_{t_{n-1}}(t_n - t_{n-1})]$$

Deseasonalized measure is updated in the weekdays using:

$$\overline{X}_{t_n} = u_{t_n} \frac{x_{t_n}}{\overline{C}_{\tau_n}} + (1 - u_{t_n})[\overline{X}_{t_{n-1}} + \overline{R}_{t_{n-1}}(t_n - t_{n-1})]$$

The deseasonalized measure filter parameters are:

$$u_{t_n} = \frac{u_{t_{n-1}}}{u_{t_{n-1}} + \rho_n^{n-1} a_n}$$

$$a_n = (1-\alpha)^{(t_n - t_{n-1})}$$

$$\rho_n^{n-1} = \theta_n^{n-1} \varphi_n^{n-1}$$

$$\theta_n^{n-1} = \left( \frac{t_{n-1} - t'_{n-2}}{t_n - t'_{n-1}} \right)$$

$$\varphi_n^{n-1} = 1$$

Other useful formulae for the factor $\phi_n^{n-1}$ (depending on whether the measurement time interval is increasing or decreasing):

$$\varphi_n^{n-1} = \begin{cases} \left( \frac{t'_{n-2} - t_{n-2}}{t'_{n-1} - t_{n-1}} \right) \\ \left( \frac{t'_{n-1} - t_{n-1}}{t'_{n-2} - t_{n-2}} \right) \end{cases}$$

The initial value of $\overline{X}_{t_0}$, if $t_0$ falls in a weekend:

$$\overline{X}_{t_0} = \overline{y}_{\tau_0}$$

$$\tau_0 = \tau(t_0) = [(t_0 - t_{12\ AM})\ \text{div}\ \Delta_\tau]\ \text{mod}\ K$$

If $t_0$ falls in a weekend:

$$\overline{X}_{t_0} = \overline{z}_{\tau_0}$$

$$\tau_0 = \tau(t_0) = [(t_0 - t_{12\ AM})\ \text{div}\ \Delta_\tau]\ \text{mod}\ L$$

$$\overline{R}_{t_{\lceil n-\frac{h}{2} \rceil}}$$

is the average deseasonalized growth rate within the interval $[t_{n-h}, t_n]$ given by:

$$\overline{R}_{t_{\lceil n-\frac{h}{2} \rceil}} = \overline{R}_{t_{n-h}} + \overline{S}_{t_n}\left( \frac{t_n - t_{n-h}}{2} \right)$$

Raw measure is the growth rate (first derivative):

$$r_{t_n} = \frac{x_{t_n} - x_{t_{n-1}}}{t_n - t'_{n-1}}$$

Equation set for the first exponential moving average for the measured growth rate depends on the seasonal trending factors. The original expression without seasonal trending is $$\overline{R}_{t_n} = v_{t_n} r_{t_n} + (1 - v_{t_n})\overline{G}_{t_n}$$

If two seasonal trends (for weekends and weekdays) are introduced, then the deseasonalized measurements can be used, depending on which season $t_{n-1}$ and $t_n$ fall in.

$$\Delta x_{t_n} =$$

$$\begin{cases} \frac{x_{t_n}}{\overline{B}_{\tau_n}} - \frac{x_{t_{n-1}}}{\overline{B}_{\tau_{n-1}}}, & t_{n-1} \text{ and } t_n \text{ fall in a weekend season} \\ \frac{x_{t_n}}{\overline{C}_{\tau_n}} - \frac{x_{t_{n-1}}}{\overline{C}_{\tau_{n-1}}}, & t_{n-1} \text{ and } t_n \text{ fall in a weekday season} \\ \frac{x_{t_n}}{\overline{B}_{\tau_n}} - \frac{x_{t_{n-1}}}{\overline{C}_{\tau_{n-1}}}, & t_{n-1} \text{ falls on a weekday and } t_n \text{ falls in a weekend} \\ \frac{x_{t_n}}{\overline{C}_{\tau_n}} - \frac{x_{t_{n-1}}}{\overline{B}_{\tau_{n-1}}}, & t_{n-1} \text{ falls in a weekend and } t_n \text{ falls on a weekday} \end{cases}$$

The deseasonalized raw growth rate is given by:

$$r_{t_n} = \frac{\Delta x_{t_n}}{t_n - t'_{n-1}}$$

The moving average is updated using:

$$\overline{R}_{t_n} = v_{t_n} \mathscr{r}_{t_n} + (1 - v_{t_n}) \overline{G}_{t_n}$$

The filter parameters are adjusted by the following formulae:

$$v_{t_n} = \frac{v_{t_{n-1}}}{v_{t_{n-1}} + \mu_n^{n-1} b_n}$$

$$b_n = (1 - \beta)^{(t_n - t_{n-1})}$$

$$\mu_n^{n-1} = \left(\frac{t_{n-1} - t'_{n-2}}{t_n - t'_{n-1}}\right)$$

If seasonal trending is not employed, the initial value of the smoothed growth rate is $$\overline{R}_{t_0} = \frac{x_{t_0} - x_{t_{-p}}}{t_0 - t_{-p}},$$

$$(t_0 - t_{-p}) > 15 \text{ minutes}$$

The initial value of $v_{t_0}$ where q is the average time interval (which is scaled to 1):

$$q \approx 1$$

$$v_{t_0} = 1 - (1 - \beta)^q$$

Equation set for the second exponential moving average for acceleration of growth rate:

$$s_{t_n} = \frac{\overline{R}_{t_n} - \overline{R}_{t_{n-1}}}{t_n - t_{n-1}}$$

$$\overline{S}_{t_n} = w_{t_n} s_{t_n} + (1 - w_{t_n}) \overline{S}_{t_{n-1}}$$

$$w_{t_n} = \frac{w_{t_{n-1}}}{w_{t_{n-1}} + \sigma_n^{n-1} c_n}$$

$$c_n = (1 - \kappa)^{(t_n - t_{n-1})}$$

$$\sigma_n^{n-1} = \left(\frac{t_{n-1} - t_{n-2}}{t_n - t_{n-1}}\right)$$

If seasonal trending is not employed, the initial value of the smoothed growth acceleration is $$\overline{S}_{t_0} = \frac{\overline{R}_{t_0} - \overline{R}_{t_{-q}}}{t_0 - t_{-q}},$$

$$(t_0 - t_{-q}) > 29 \text{ minutes}$$

The initial value of $w_{t_0}$ where q is the average time interval (which is scaled to 1):

$$q \approx 1$$

$$w_{t_0} = 1 - (1 - \kappa)^q$$

The deseasonalized forecasted rate of change based on the linear trend in rate of change:

$$\overline{G}_{t_n} = \overline{R}_{t_{n-1}} + \overline{S}_{t_{n-1}}(t_n - t_{n-1})$$

Equation set for the third exponential moving average for weekend and weekday seasonal factors are as follows.

Seasonal multiplicative factors are updated in the weekends:

$$\overline{B}_{\tau_n} \leftarrow \gamma \frac{x_{t_n}}{\overline{X}_{t_n}} + (1 - \gamma) \overline{B}_{\tau_n}$$

$$\tau_n = \tau(t_n) = [(t_n - t_{12AM}) \, div \, \Delta_\tau] \, \text{mod} \, K$$

Seasonal multiplicative factors are updated in the weekdays:

$$\overline{C}_{\tau_n} \leftarrow \gamma \frac{x_{t_n}}{\overline{X}_{t_n}} + (1 - \gamma) \overline{C}_{\tau_n}$$

$$\tau_n = \tau(t_n) = [(t_n - t_{12AM}) div \Delta_\tau] \text{mod} L$$

Either at the end of each season or after update of $\overline{B}_{\tau_n}$ or $\overline{C}_{\tau_n}$ (the former method is more efficient and the latter may be too compute intensive), divide each weekend factor $\overline{B}_k$ and weekday factor $\overline{C}_l$ by the normalization factor:

$$\frac{1}{K + 5L}\left(\sum_{k=0}^{K-1} \overline{B}_k + 5 \sum_{l=0}^{L-1} \overline{C}_l\right)$$

The initial values of $\overline{B}_k$:

$$I_e = \frac{1}{N_e} \sum_{i=1}^{N_e} x_{t_i},$$

e=0, 1 and $N_e$ is the number of samples in weekend e $$\overline{y}_k = \frac{1}{N_k} \sum_{i=1}^{N_k} x_{t_i},$$

k=0, 1, ..., 383 and $N_k$ is the number of samples in interval k $$\overline{B}_k = \frac{1}{2}(\overline{y}_k / I_0 + \overline{y}_{k+192} / I_1),$$

k=0, 1, ..., 191

The initial values of $\overline{C}_l$:

$$J_d = \frac{1}{N_d} \sum_{i=1}^{N_d} x_{t_i},$$

d=0, 1, ..., 4 and $N_d$ is the number of samples on day d $$\bar{z}_l = \frac{1}{N_l} \sum_{i=1}^{N_l} x_{t_i},$$

l=0, 1, . . . , 479 and $N_l$ is the number of samples in interval l $$\bar{C}_l = \frac{1}{5}(\bar{z}_l / J_0 + \bar{z}_{l+96} / J_1 + \bar{z}_{l+192} / J_2 + \bar{z}_{l+288} / J_3 + \bar{z}_{l+384} / J_4),$$

l=0, 1, . . . , 95

To rebalance the relative magnitudes of weekend and weekday seasonal factors, we divide each seasonal factor $\bar{B}_i$ and $\bar{C}_j$ by the average daily measure:

$$\frac{1}{5 + (2*2)} \left( \sum_{d=0}^{4} J_d + 2 * \sum_{e=0}^{1} I_e \right)$$

Equation set for the exponential moving averages for outlier detection (Note that $e_{t_n}$ is one-step forecast error residual, setting h=1):

$$\bar{E}_{t_n} = \psi_{t_n} e_{t_n} + (1 - \psi_{t_n}) \bar{E}_{t_{n-1}}$$

$$\bar{D}_{t_n} = \psi_{t_n} |e_{t_n}| + (1 - \psi_{t_n}) \bar{D}_{t_{n-1}}$$

$$\psi_{t_n} = \frac{\psi_{t_{n-1}}}{\psi_{t_{n-1}} + d_n}$$

$$d_n = (1 - \delta)^{(t_n - t_{n-1})}$$

The initial value of $\bar{E}_{t_0}$ and $\bar{D}_{t_0}$ is 0.

The initial value of $\psi_{t_0}$ where q is the average time interval (which is scaled to 1):

$$q \approx 1$$

$$\psi_{t_0} = 1 - (1 - \delta)^q$$

Expression for detecting the outlier when the normalized residual is larger than Q:

$$\left| \frac{e_{t_n} - \bar{E}_{t_{n-1}}}{\bar{D}_{t_{n-1}}} \right| > Q,$$

$$Q > 1$$

Clipping of an outlier sample point $x_{t_n}$:

$$x'_{t_n} := \begin{cases} \text{MIN}(\bar{F}_{t_n} - \bar{E}_{t_{n-1}} + Q\bar{D}_{t_{n-1}}, x_{max}) & \text{when } e_{t_n} < \text{MIN}(\bar{E}_{t_{n-1}}, 0) \\ \text{MAX}(\bar{F}_{t_n} - \bar{E}_{t_{n-1}} - Q\bar{D}_{t_{n-1}}, x_{min}) & \text{when } e_{t_n} > \text{MAX}(\bar{E}_{t_{n-1}}, 0) \end{cases}$$

If the current sample is clipped, the rate should be recalculated:

$$r'_{t_n} = \begin{cases} r_{t_n} & \text{not an outlier} \\ \frac{x'_{t_n} - x_{t_{n-1}}}{t_n - t'_{n-1}} & \text{an outlier} \end{cases}$$

The value $r'_{t_n}$ should be used to update the average, if seasonal trending is not employed:

$$\bar{R}_{t_n} = v_{t_n} r'_{t_n} + (1 - v_{t_n}) \bar{G}_{t_n}$$

If seasonal trending is employed, use one of the following formulae depending on whether the times fall in a weekend or on a weekday:

$$\Delta x'_{t_n} = \begin{cases} \dfrac{x'_{t_n}}{\bar{B}_{\tau_n}} - \dfrac{x_{t_{n-1}}}{\bar{B}_{\tau_{n-1}}}, & t_{n-1} \text{ and } t_n \text{ fall in the weekend season} \\ \dfrac{x'_{t_n}}{\bar{C}_{\tau_n}} - \dfrac{x_{t_{n-1}}}{\bar{C}_{\tau_{n-1}}}, & t_{n-1} \text{ and } t_n \text{ fall in the weekday season} \\ \dfrac{x'_{t_n}}{\bar{B}_{\tau_n}} - \dfrac{x_{t_{n-1}}}{\bar{C}_{\tau_{n-1}}}, & t_{n-1} \text{ falls on a weekday and } t_n \text{ falls in a weekend} \\ \dfrac{x'_{t_n}}{\bar{C}_{\tau_n}} - \dfrac{x_{t_{n-1}}}{\bar{B}_{\tau_{n-1}}}, & t_{n-1} \text{ falls in a weekend and } t_n \text{ falls on a weekday} \end{cases}$$

The deseasonalized raw growth rate is given by:

$$r'_{t_n} = \frac{\Delta x'_{t_n}}{t_n - t'_{n-1}}$$

The moving average is updated using:

$$\bar{R}_{t_n} = v_{t_n} r'_{t_n} + (1 - v_{t_n}) \bar{G}_{t_n}$$

Hardware Overview

Figure 10:
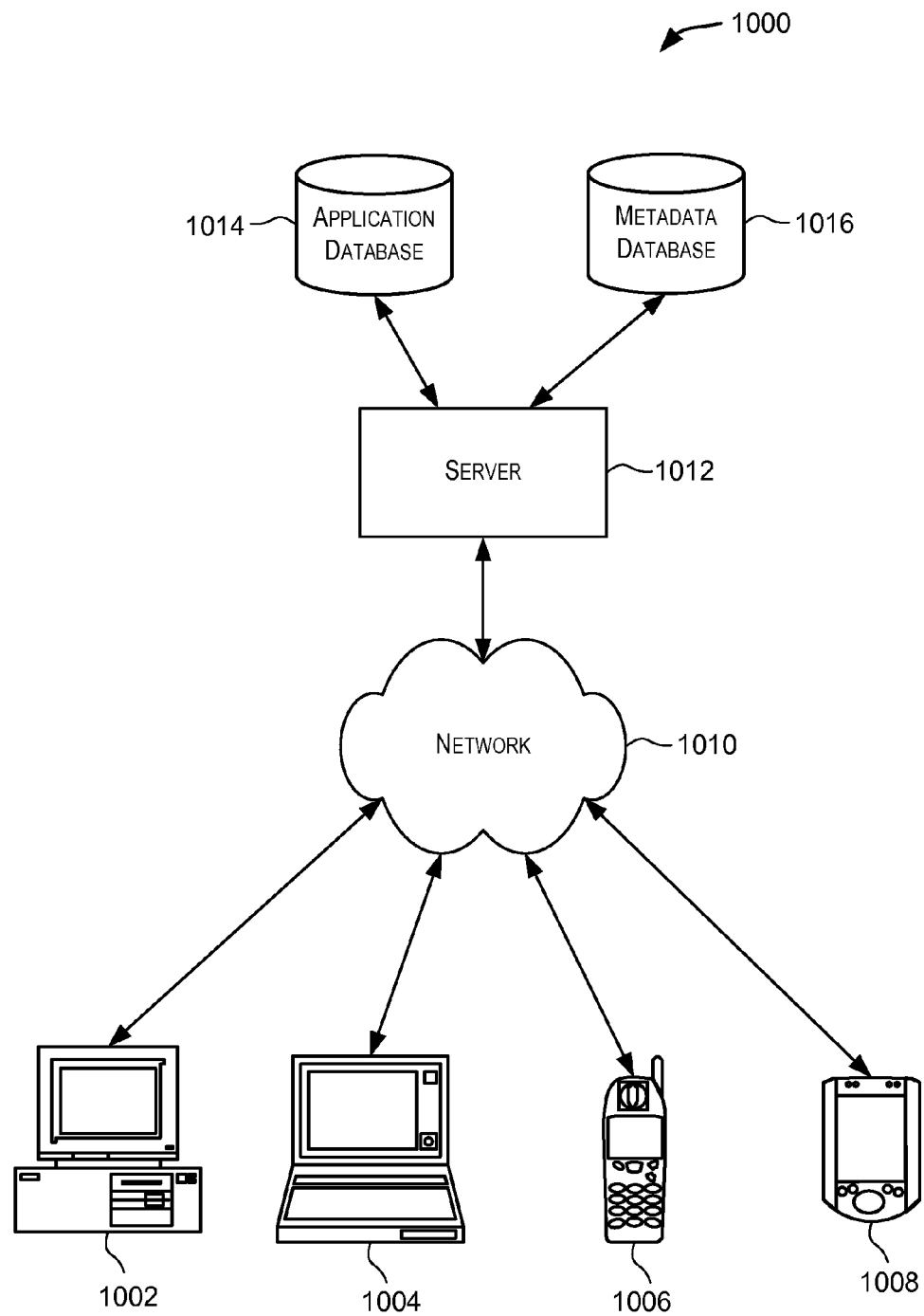
FIG. 10 is a simplified block diagram illustrating components of a system environment that may be used in accordance with an embodiment of the present invention.

FIG. 10 is a simplified block diagram illustrating components of a system environment 1000 that may be used in accordance with an embodiment of the present invention. As shown, system environment 1000 includes one or more client computing devices 1002, 1004, 1006, 1008, which are configured to operate client applications including native client applications and possibly other applications such as a web browser, or the like. In various embodiments, client computing devices 1002, 1004, 1006, and 1008 may interact with a server 1012.

Client computing devices 1002, 1004, 1006, 1008 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1002, 1004, 1006, and 1008 may be any other electronic device, such as a thin-client computer, Internet-enabled gaming system, and/or personal messaging device, capable of communicating over a network (e.g., network 1010 described below). Although exemplary system environment 1000 is shown with four client computing devices, any number of client computing devices may be supported. Other devices such as devices with sensors, etc. may interact with server 1012.

System environment 1000 may include a network 1010. Network 1010 may be any type of network familiar to those skilled in the art that can support data communications using any of a variety of commercially-available protocols, including without limitation TCP/IP, SNA, IPX, AppleTalk, and the like. Merely by way of example, network 1010 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1000 also includes one or more server computers 1012 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 1012 may be adapted to run one or more services or software applications.

Server 1012 may run an operating system including any of those discussed above, as well as any commercially available server operating system. Server 1012 may also run any of a variety of additional server applications and/or mid-tier applications, including HTTP servers, FTP servers, CGI servers, JAVA servers, database servers, and the like. Exemplary database servers include without limitation those commercially available from Oracle, Microsoft, Sybase, IBM and the like.

System environment 1000 may also include one or more databases 1014, 1016. Databases 1014, 1016 may reside in a variety of locations. By way of example, one or more of databases 1014, 1016 may reside on a non-transitory storage medium local to (and/or resident in) server 1012. Alternatively, databases 1014, 1016 may be remote from server 1012, and in communication with server 1012 via a network-based or dedicated connection. In one set of embodiments, databases 1014, 1016 may reside in a storage-area network (SAN) familiar to those skilled in the art. Similarly, any necessary files for performing the functions attributed to server 1012 may be stored locally on server 1012 and/or remotely, as appropriate. In one set of embodiments, databases 1014, 1016 may include relational databases, such as databases provided by Oracle, which are adapted to store, update, and retrieve data in response to SQL-formatted commands.

Figure 11:
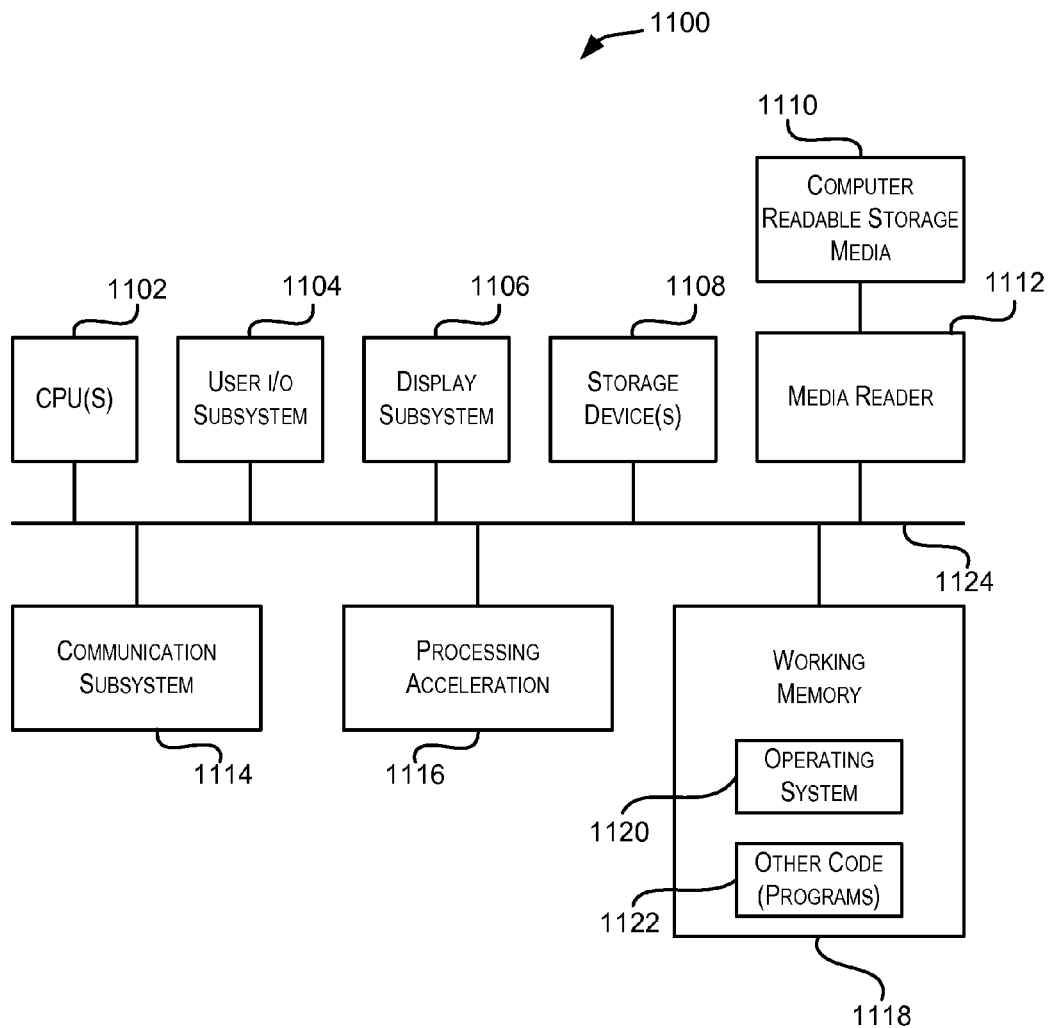
FIG. 11 is a simplified block diagram of a computer system that may be used in accordance with embodiments of the present invention.

FIG. 11 is a simplified block diagram of a computer system 1100 that may be used in accordance with embodiments of the present invention. For example server 1012 or clients 1002, 1004, 1006, or 1008 may be implemented using a system such as system 1100. Computer system 1100 is shown comprising hardware elements that may be electrically coupled via a bus 1124. The hardware elements may include one or more central processing units (CPUs) 1102, one or more input devices 1104 (e.g., a mouse, a keyboard, etc.), and one or more output devices 1106 (e.g., a display device, a printer, etc.). Computer system 1100 may also include one or more storage devices 1108. By way of example, the storage device(s) 1108 may include devices such as disk drives, optical storage devices, and solid-state storage devices such as a random access memory (RAM) and/or a read-only memory (ROM), which can be programmable, flash-updateable and/or the like.

Computer system 1100 may additionally include a computer-readable storage media reader 1112, a communications subsystem 1114 (e.g., a modem, a network card (wireless or wired), an infra-red communication device, etc.), and working memory 1118, which may include RAM and ROM devices as described above. In some embodiments, computer system 1100 may also include a processing acceleration unit 1116, which can include a digital signal processor (DSP), a special-purpose processor, and/or the like.

Computer-readable storage media reader 1112 can further be connected to a computer-readable storage medium 1110, together (and, optionally, in combination with storage device(s) 1108) comprehensively representing remote, local, fixed, and/or removable storage devices plus storage media for temporarily and/or more permanently containing computer-readable information. Communications system 1114 may permit data to be exchanged with network 1010 and/or any other computer described above with respect to system environment 1000.

Computer system 1100 may also comprise software elements, shown as being currently located within working memory 1118, including an operating system 1120 and/or other code 1122, such as an application program (which may be a client application, Web browser, mid-tier application, RDBMS, etc.). In an exemplary embodiment, working memory 1118 may include executable code and associated data structures used for trend forecasting as described above. It should be appreciated that alternative embodiments of computer system 1100 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A computer-implemented method comprising:
obtaining a series of thread dump samples by generating a separate thread dump during each particular time interval in a series of time intervals;
generating a set of stack segment classifications based on the series of thread dump samples, wherein generating the set of stack segment classifications comprises;
identifying a first set of stack frames within a first stack segment each of the first set of stack frames having a corresponding intensity value;
determining that the corresponding intensities of the first set of stack frames within the first stack segment diverge over time beyond a specified threshold;
splitting the first stack segment into multiple constituent stack segments, based on the determination that the corresponding intensities of the first set of stack frames within the first stack segment diverge over time beyond the specified threshold; and
generating a new stack segment classification for each of the multiple constituent stack segments;
for each particular thread represented in the series of thread dump samples, selecting, from the set of stack segment classifications, a particular stack segment classification for the particular thread based at least in part on a number of invocations of a code block in the particular stack segment multiplied by an execution time of the code block;
determining a trend for each stack segment classification in the set of stack segment classifications, thereby generating a set of trends;
determining a set of anomalies based at least in part on the set of trends; and
generating output based at least in part on the set of anomalies;
wherein said set of anomalies includes at least one of: a level spike, a level shift, a level drift, a variance change, a saturation, a stuck thread, a lingering thread, a deadlock condition, a congestion upstream, a congestion downstream, a congestion in resource pool, a convoy effect, an impedance mismatch, an outlying measurement, or a burst of outlying measurements.

2. The method of claim 1, further comprising:
determining whether a thread name, an Execution Context ID (ECID), or an epoch counter of a thread represented in a first thread dump is the same as, respectively, a thread name, an Execution Context ID (ECID), or an epoch counter of a thread represented in a second thread dump;
in response to determining that the thread name, Execution Context ID (ECID), or epoch counter of the thread represented in the first thread dump is the same as, respectively, the thread name, Execution Context ID (ECID), or epoch counter of the thread represented in the second thread dump, preventing the thread represented in the second thread dump from being counted for intensity statistics.

3. The method of claim 2, further comprising:
determining that a CPU time of the thread represented in the first thread dump is same as a CPU time of a thread represented in the second thread dump; and in response to determining that the thread name, Execution Context ID (ECID), or epoch counter of the thread represented in the first thread dump is the same as, respectively, the thread name, Execution Context ID (ECID), or epoch counter of the thread represented in the second thread dump and that the CPU time of the thread represented in the first thread dump is same as the CPU time of a thread represented in the second thread dump, identifying the same thread represented in the first and second thread dump as a stuck thread.

4. The method of claim 1, further comprising:
determining, based at least in part on a lack of change in a plurality of CPU times of a first thread within separate thread dump samples in the series of thread dump samples, that the first thread is stuck.

5. The method of claim 1, further comprising:
determining that a CPU time of a thread represented in a first thread dump is different from a CPU time of the thread represented in a second thread dump; and
in response to determining that the CPU time of the thread represented in the first thread dump is different from the CPU time of a thread represented in the second thread dump, identifying the same thread represented in the first and second thread dump as a lingering thread.

6. The method of claim 5, further comprising:
determining, based at least in part on a lack of change in a plurality of the thread name, Execution Context ID (ECID), or epoch counter of a first thread within separate thread dump samples in the series of thread dump samples, that a first thread is lingering.

7. The method of claim 1, further comprising:
maintaining a first intensity statistics of a first sampling interval for thread dumps in the series of thread dumps;
adjusting a second intensity statistics of a second sampling interval for thread dumps in the series of thread dumps in response to a determination that a particular thread is determined to be stuck or lingering over a first and second sampling intervals, wherein a second sampling interval avoids duplicate counting of a stuck or lingering thread.

8. The method of claim 1, wherein selecting, from the set of stack segment classifications, a particular stack segment classification for the particular thread comprises:
determining an intensity value for a particular stack frame in a particular stack trace;
determining an intensity value for a predecessor stack frame that occurs immediately before the particular stack frame in the particular stack trace;
determining an intensity value for a successor stack frame that occurs immediately after the particular stack frame in the particular stack trace;
in response to determining that the intensity value for the particular stack frame is within a predetermined threshold of the intensity value for the predecessor stack frame, assigning a particular classification to both the particular stack frame and the predecessor stack frame; and
in response to determining that the intensity value for the particular stack frame is the same as the intensity value for the successor stack frame, assigning the particular classification to both the particular stack frame and the successor stack frame.

9. The method of claim 1, further comprising:
creating a new stack segment information item;
assigning the new stack segment information item to a value of a current stack segment information item;

generating a new seasonal trend information item in response to a classification of the new stack segment information item; and setting a value of a trend attribute of the current stack segment information item to be the new seasonal trend information item.

10. The method of claim 1, further comprising:

splitting a coalesced stack segment into a first new stack segment and a second new stack segment;

creating a first clone of a seasonal trend information item of the coalesced stack segment;

creating a second clone of the seasonal trend information item of the coalesced stack segment;

setting a value of a trend attribute of the first new stack segment to be the first clone; and setting a value of a trend attribute of the second new stack segment to be the second clone.

11. The method of claim 1, further comprising:

generating a set of thread classifications based at least in part on a chain of stack segment classifications; and generating a classification of a chain of threads based at least in part on one of an invocation chain, a dependency chain, and a client-server chain among threads.

12. The method of claim 1, further comprising:

organizing the set of stack segment classifications by assigning one or more stack segment classifications to a dimension;

setting a name of the particular stack segment classification; and setting a name of a particular dimension.

13. The method of claim 12, further comprising:

drilling down into a class hierarchy of the particular stack segment classification by taking a cross product of the dimensions to which the particular stack segment classification is assigned.

14. The method of claim 12, further comprising:

assigning the one or more stack segment classifications to a dimension based at least in part on tacit knowledge, to at least one of the domain dimension, the server dimension, the channel dimension, the application dimension, the library dimension, and the operation dimension.

15. The method of claim 14, further comprising:

setting a name of the particular stack segment classification based at least in part on the tacit knowledge;

setting a name of a particular dimension based at least in part on the tacit knowledge; and assigning the particular stack segment classification to a dimension based at least in part on tacit knowledge, to at least one of the domain dimension, the server dimension, the channel dimension, the application dimension, the library dimension, and the operation dimension.

16. The method of claim 1, further comprising:

classifying one or more stack segments based on human tacit knowledge; and assigning one or more classifications to one or more dimensions based at least in part on the human tacit knowledge.

17. The method of claim 1, further comprising:

based at least in part on an inductive learning process, assigning one or more of the stack segment classifications to one or more dimensions that were defined prior to the generation of the one or more of the stack segment classifications.

18. The method of claim 1, further comprising:

storing a generalized dependency relation that includes multiple subclasses of dependency relations that each include a client part and a server part;

drilling down a generalized client part of a particular subclass dependency relation to a client part that is a higher intensity than a generalized server part of the particular subclass; and drilling down a generalized server part of the particular subclass dependency relation to a server part that is a higher intensity than a generalized client part of the particular subclass.

19. The method of claim 1, further comprising:

generating a knowledge base of thread dependency relations based at least in part on tacit knowledge; and based at least in part on the thread dependency relations, correlating at least one incidence across a pair of serving entities as a part of analyzing a root cause of a problem;

wherein the pair of serving entities are at least one of a pair of client and server, a pair of servers, or a pair of clients.

20. The method of claim 19, further comprising:

performing impedance matching based at least in part on channels between the pair of serving entities;

wherein the channels support a client-server dependency relation between a class of stack segments for a first serving entity in the pair and a class of stack segments for the second serving entity in the pair.

21. The method of claim 1, further comprising:

determining a stack segment intensity of the particular stack segment classification based on a composition of stack segment intensities of sub-classifications of stack segments; and segmenting an expected response time of a stack segment of the particular stack segment classification into response times of stack segments of the sub-classifications of stack segments;

wherein segmenting an expected response time is based at least in part to a composition of stack segment intensities.

22. A non-transitory computer-readable storage memory storing instructions when, when executed by one or more processors, cause the one or more processors to perform operations comprising:

obtaining a series of thread dump samples by generating a separate thread dump during each particular time interval in a series of time intervals;

generating a set of stack segment classifications based on the series of thread dump samples, wherein generating the set of stack segment classifications comprises:

identifying a first set of stack frames within a first stack segment, each of the first set of stack frames having a corresponding intensity value;

determining that the corresponding intensities of the first set of stack frames within the first stack segment diverge over time beyond a specified threshold;

splitting the first stack segment into multiple constituent stack segments, based on the determination that the corresponding intensities of the first set of stack frames within the first stack segment diverge over time beyond the specified threshold, and generating a new stack segment classification for each of the multiple constituent stack segments;

for each particular thread represented in the series of thread dump samples, selecting, from the set of stack segment classifications, a particular stack segment classification for the particular thread based at least in part on a number of invocations of a code block in the particular stack segment multiplied by an execution time of the code block;

determining a trend for each stack segment classification in the set of stack segment classifications, thereby generating a set of trends;

determining a set of anomalies based at least in part on the set of trends; and generating output based at least in part on the set of anomalies;

wherein said set of anomalies includes at least one of: a level spike, a level shift, a level drift, a variance change, a saturation, a stuck thread, a lingering thread, a deadlock condition, a congestion upstream, a congestion downstream, a congestion in resource pool, a convoy effect, an impedance mismatch, an outlying measurement, or a burst of outlying measurements.

23. A system comprising:

a processing unit comprising one or more processors; and memory coupled with and readable by the processing unit and storing therein a set of instructions which, when executed by the processing unit, causes the processing unit to:

obtain a series of thread dump samples by generating a separate thread dump during each particular time interval in a series of time intervals;

generate a set of stack segment classifications based on the series of thread dump samples, wherein generating the set of stack segment classifications comprises:

identifying a first set of stack frames within a first stack segment, each of the first set of stack frames having a corresponding intensity value;

determining that the corresponding intensities of the first set of stack frames within the first stack segment diverge over time beyond a specified threshold;

splitting the first stack segment into multiple constituent stack segments, based on the determination that the corresponding intensities of the first set of stack frames within the first stack segment diverge over time beyond the specified threshold; and generating a new stack segment classification for each of the multiple constituent stack segments;

for each particular thread represented in the series of thread dump samples, select, from the set of stack segment classifications, a particular stack segment classification for the particular thread based at least in part on a number of invocations of a code block in the particular stack segment multiplied by an execution time of the code block;

determine a trend for each stack segment classification in the set of stack segment classifications, thereby generating a set of trends;

determine a set of anomalies based at least in part on the set of trends; and generate output based at least in part on the set of anomalies;

wherein said set of anomalies includes at least one of: a level spike, a level shift, a level drift, a variance change, a saturation, a stuck thread, a lingering thread, a deadlock condition, a congestion upstream, a congestion downstream, a congestion in resource pool, a convoy effect, an impedance mismatch, an outlying measurement, or a burst of outlying measurements.

24. The system of claim 1, the memory storing therein further instructions which, when executed by the processing unit, causes the processing unit to:

determine a stack segment intensity of the particular stack segment classification based on a composition of stack segment intensities of sub-classifications of stack segments; and segment an expected response time of a stack segment of the particular stack segment classification into response times of stack segments of the sub-classifications of stack segments;

wherein segmenting an expected response time is based at least in part to a composition of stack segment intensities.

* * * * *